(12) United States Patent
Sabapathy

(10) Patent No.: US 12,508,277 B2
(45) Date of Patent: Dec. 30, 2025

(54) CANCER THERAPEUTIC TARGETING USING MUTANT P53-SPECIFIC SIRNAS

(71) Applicant: Singapore Health Services PTE LTD, Singapore (SG)

(72) Inventor: Kanaga Sabapathy, Singapore (SG)

(73) Assignee: Singapore Health Services PTE LTD, Singapore (SG)

( * ) Notice: Subject to any disclaimer, the term of this patent is extended or adjusted under 35 U.S.C. 154(b) by 352 days.

(21) Appl. No.: 16/971,626

(22) PCT Filed: Feb. 21, 2019

(86) PCT No.: PCT/SG2019/050099
§ 371 (c)(1),
(2) Date: Aug. 20, 2020

(87) PCT Pub. No.: WO2019/164451
PCT Pub. Date: Aug. 29, 2019

(65) Prior Publication Data
US 2020/0397813 A1 Dec. 24, 2020

(30) Foreign Application Priority Data
Feb. 21, 2018 (SG) ............................ 10201801432S

(51) Int. Cl.
*C12N 15/11* (2006.01)
*A61K 31/7105* (2006.01)
*A61P 35/00* (2006.01)
*C12N 15/113* (2010.01)
*C12Q 1/6886* (2018.01)

(52) U.S. Cl.
CPC .......... *A61K 31/7105* (2013.01); *A61P 35/00* (2018.01); *C12N 15/1135* (2013.01); *C12Q 1/6886* (2013.01); *C12Q 2600/106* (2013.01); *C12Q 2600/156* (2013.01); *C12Q 2600/178* (2013.01)

(58) Field of Classification Search
None
See application file for complete search history.

(56) References Cited

U.S. PATENT DOCUMENTS

2005/0215497 A1 9/2005 Harel-Bellan et al.

FOREIGN PATENT DOCUMENTS

WO WO-2019/164451 A1 8/2019

OTHER PUBLICATIONS

Lisowiec-Wachnicka, "Contribution of 3'T and 3'TT overhangs to the thermodynamic stability of model siRNA duplexes," Biophysical Chemistry 246 (2019): 35-39.
Chen et al., "Selective Inhibition of p53 Dominant Negative Mutation by shRNA Resulting in Partial Restoration of p53 Activity," J Med Sci, 29(4): 179-185 (2009).
International Search Report and Written Opinion for International Application No. PCT/SG2019/050099 dated May 15, 2019.
Iyer et al., "Allele-specific silencing of mutant p53 attenuates dominant 1-23 negative and gain-of-function activities," Oncotarget, 7(5): 5401-5415 (2015).
Martinez et al., "Synthetic small inhibiting RNAs: Efficient tools to inactivate oncogenic mutations and restore p53 pathways," PNAS, 99(23): 14849-14854 (2002).
Muller et al., "Mutant p53 in Cancer: New Functions and Therapeutic Opportunities," Cancer Cells, 25(3): 304-317 (2014).
Ubby et al., "Cancer therapeutic targeting using mutant-p53-specific siRNAs," Oncogene, 38: 3415-3427 (2019).
Xie et al., "Therapeutic potential of antisense oligodeoxynucleotides in downregulating p53 oncogenic mutations in cancers," Biotechnology Letters, 33: 221-228 (2011).
Taxman et al., "Criteria for effective design, construction, and gene knockdown by shRNA vectors," BMC Biotechnology, 6: Article No. 7 pp. 1-16 (2006).
Hu et al., "Therapeutic siRNA: state of the art", Signal transduction and targeted therapy 5.1: 101 (2020).

*Primary Examiner* — Ekaterina Poliakova-Georgantas
(74) *Attorney, Agent, or Firm* — Foley Hoag LLP; David P. Halstead

(57) ABSTRACT

Provided herein are nucleic acid sequences for targeting one or more single point mutations within a target gene, wherein the target gene is one or more tumour suppressor genes; wherein the tumour suppressor gene is p53; and methods of treating cancer in a subject comprising administering the same.

14 Claims, 31 Drawing Sheets

Specification includes a Sequence Listing.

*R175H*
5'— AUG ACG GAG GUU GUG AGG CGC UGC CCC CAC CAU GAG —3' P53 WT
5'— AUG ACG GAG GUU GUG AGG CAC UGC CCC CAC CAU GAG —3' P53 MUT-R175H
5'— UG ACG GAG GUU GUG AGG CaC U —3' Si-1-R175H
5'— AGG CaC UGC CCC CAC CAU GA —3' Si-2-R175H

*R248W*
5'— UGC AUG GGC GGC AUG AAC CGG AGG CCC AUC CUC —3' P53 WT
5'— UGC AUG GGC GGC AUG AAC UGG AGG CCC AUC CUC —3' P53 MUT-R248W
5'— GC AUG AAC UGG AGG CCC AU —3' Si-3-R248W
5'— GC GGC AUG AAC UGG AGG CCC —3' Si-4-R248W

*R249S*
5'— UGC AUG GGC GGC AUG AAC CGG AGG CCC AUC CUC ACC —3' P53 WT
5'— UGC AUG GGC GGC AUG AAC CGG AGU CCC AUC CUC ACC —3' P53 MUT-R249S
5'— G AAC CGG AGU CCC AUC CUC —3' Si-5-R249S
5'— AAC CGG AGU CCC AUC CUC A —3' Si-6-R249S

*R273H*
5'— AGC UUU GAG GUG CGU GUU UGU GCC UGU CCU —3' P53 WT
5'— AGC UUU GAG GUG CAU GUU UGU GCC UGU CCU —3' P53 MUT-R273H
5'— AG GUG CAU GUU UGU GCC UGU —3' Si-7-R273H
5'— GAG GUG CaU GUU UGU GCC UGU —3' Si-8-R273H

5'— CAC UGC CCC CAC CAU GAG CG —3' si-p53

5'— UUC UCC GAA CGT GUC ACG U —3' si-scr

FIG. 1A

- CDDP

+ CDDP

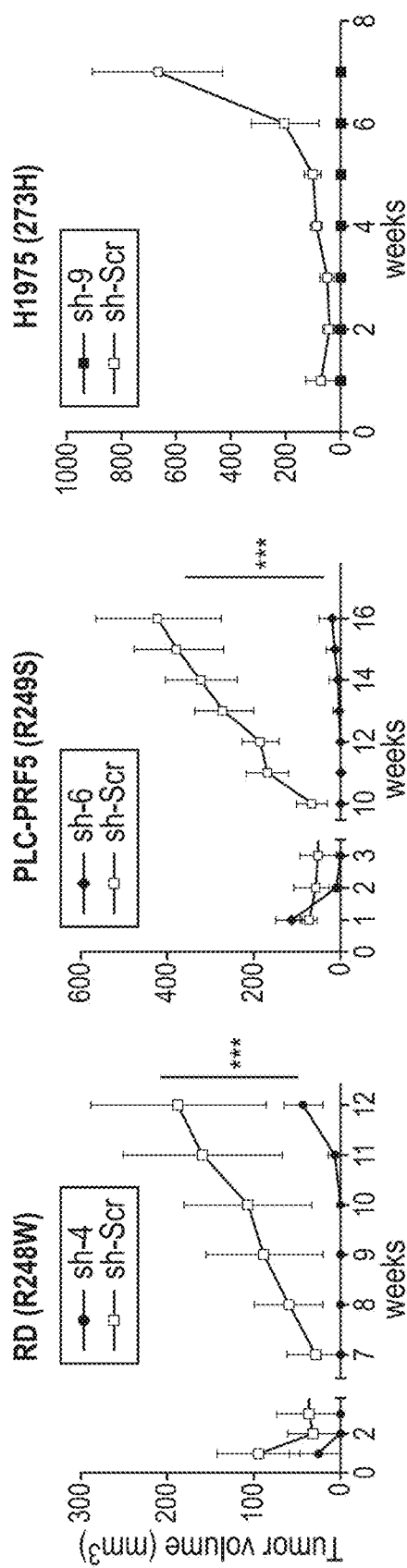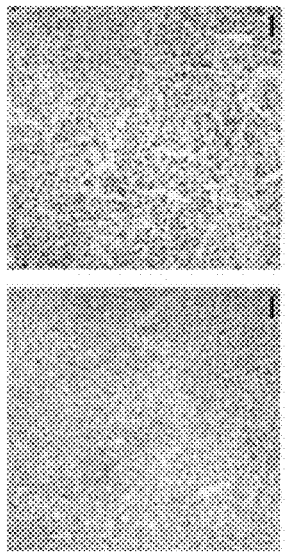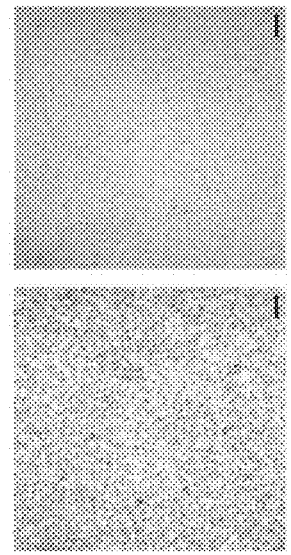
FIG. 7A
FIG. 7B

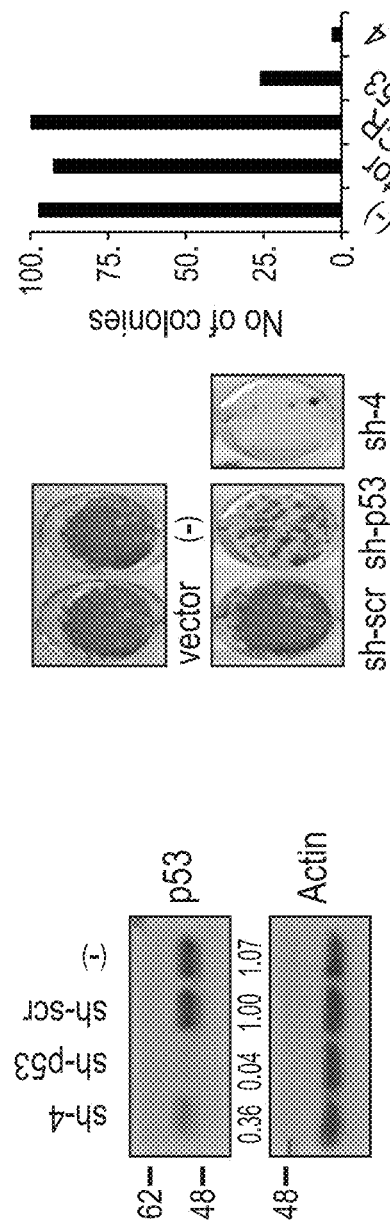
FIG. 12B
FIG. 12C
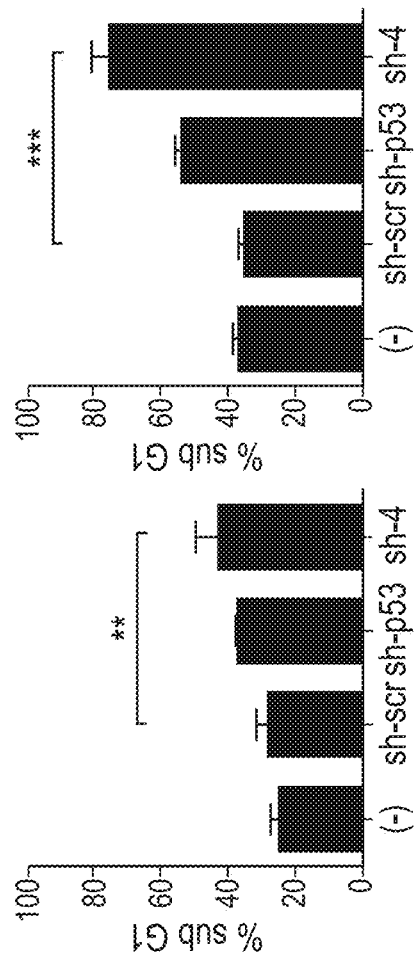
FIG. 12D

− CDDP

+ CDDP

P53 R249 (si-6)

| R249 | Codon |
|---|---|
| wt | AGG |
| R249 - S | AGT |
| R249 - G | GGG |
| R249 - M | ATG |

FIG. 14A

P53 R273 (si-8)
| R273 | Codon |
|------|-------|
| wt | CGU |
| R273 - H | CAU |
| R273 - L | CUU |
FIG. 15A
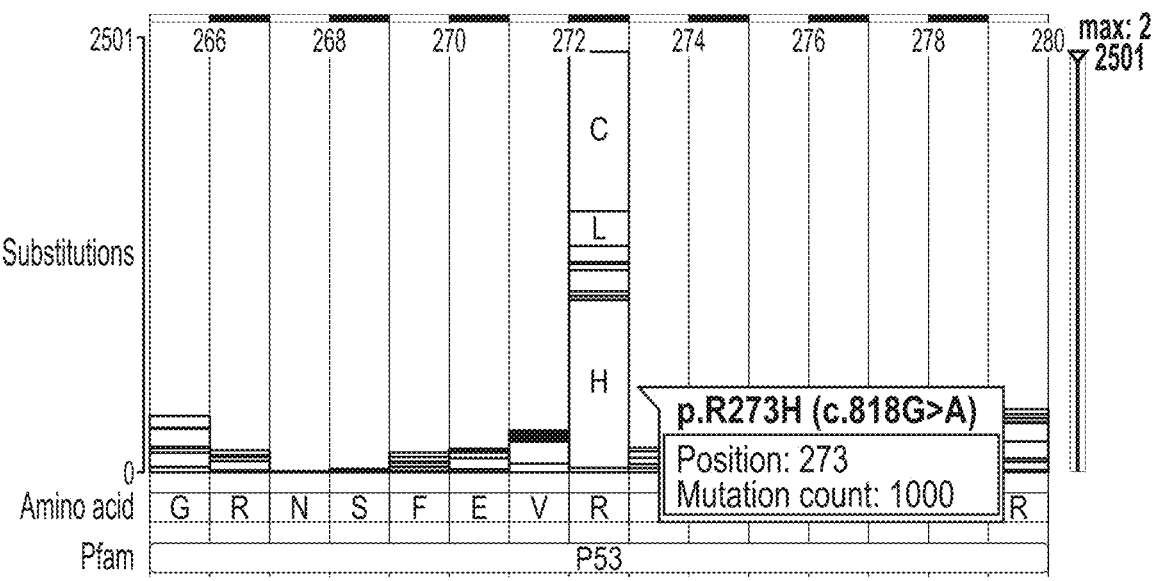
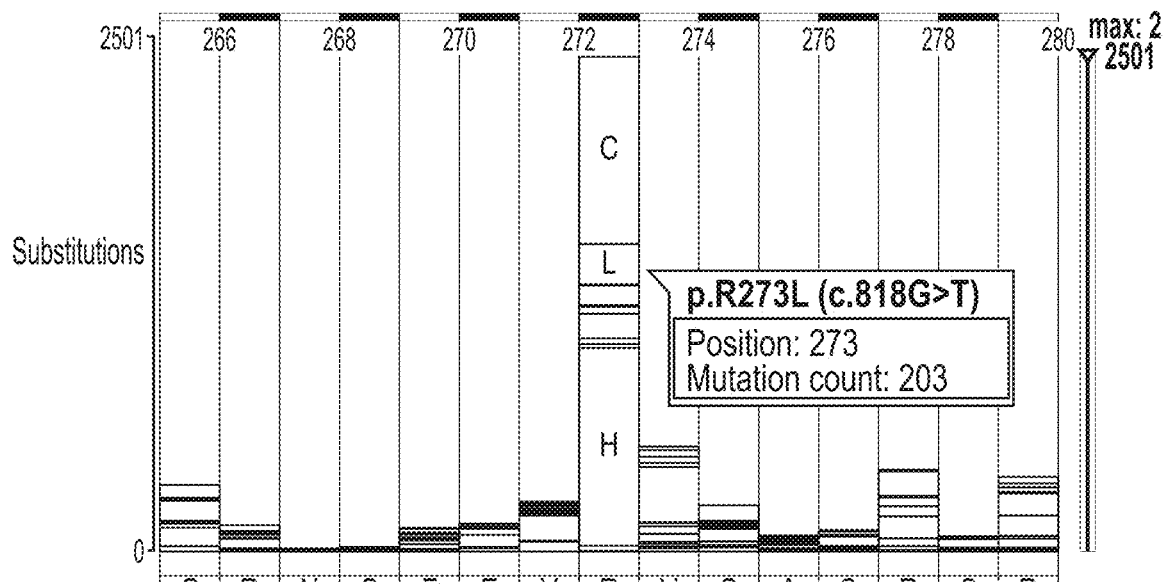
FIG. 15B H1299 cells - 48 hrs after transfection of mutant cdnas

| R248 | Codon | si-4 |
|---|---|---|
| wt | CGG | - |
| R248 - W | UGG | Y |
| R248 - Q | CAG | Y |

| R249 | Codon | si-6 |
|---|---|---|
| wt | AGG | - |
| R249 - S | AGU | Y |
| R249 - G | GGG | Y |
| R249 - M | AUG | Y |

| R273 | Codon | si-8 |
|---|---|---|
| wt | CGU | - |
| R273 - H | CAU | Y |
| R273 - L | CUU | Y |

FIG. 17

CANCER THERAPEUTIC TARGETING USING MUTANT P53-SPECIFIC SIRNAS

CROSS-REFERENCE TO RELATED APPLICATIONS

This application is the 371 National Stage of International Patent Application No. PCT/SG2019/050099, filed Feb. 21, 2019 which claims the benefit of priority of Singapore provisional application Ser. No. 10201801432S, filed on Feb. 21, 2018, the contents of both of which being hereby incorporated by reference in their entirety for all purposes.

SEQUENCE LISTING

The instant application contains a Sequence Listing which has been filed electronically in ASCII format and is hereby incorporated by reference in its entirety. Said ASCII copy, created on Jul. 27, 2020, is named Sequence Listing as Filed_8925051.txt and is 39,549 bytes in size.

FIELD OF THE INVENTION

The present invention relates generally to the field of molecular biology. In particular, the present invention relates to the use of biomarkers for the detection and diagnosis, and siRNAs for the treatment of cancer.

BACKGROUND OF THE INVENTION

A large number of genomic alterations have been identified across almost all cancer types, through the pan-cancer genome sequencing efforts. This has led to the identification and association of many of these mutations as potential drivers that are casually involved cancer development. Some of the identified alterations in oncogenes have been subjected to therapeutic targeting through the development of inhibitory molecules or blocking antibodies, which have had huge initial success in the treatment of cancers bearing these mutations, forming the basis of precision medicine in oncology. However, one challenge of such an approach of using inhibitors or blocking antibodies for therapeutic targeting is that they are not entirely specific for the mutant form of the protein, but rather, are much effective in mutant protein expressing cells due to the elevated activity or expression of the mutant protein over its wild-type (WT) counterpart. As a result, this has the potential to lead to undesirable side effects on the multiple cell types that express the WT protein.

An ideal drug against a mutated protein would therefore be one that will only affect the functioning of the mutant form, without any effects on the WT version. However, up till now, there are no drugs or molecules that have been generated that are capable of such high specificity. Nonetheless, no routine technology to generate "mutant-only"-specific reagents has been available to date.

The era of precision medicine has promoted the development of many drugs that are specific for the highly active mutant forms of proteins. While spectacular results have initially been achieved, two major issues with specificity remain. Firstly, the drugs generated against a particular protein (often a kinase) have almost always an impact on other cellular targets. Moreover, many of these drugs, though very effective on the mutant and active forms of the proteins, also have significant impact on the wild-type counterparts, as has been shown for c-Kit. Hence, though effective, the impact of these inhibitors on the wild-type form or other closely related targets will unabatedly lead to unwanted side effects, reducing the promise of these reagents.

Hence, there is a need for reagents that are highly specific for the mutated versions of the protein, with little or no cross-reactivity to the wild-type form for use in treating hyperproliferative disease.

SUMMARY OF THE INVENTION

In one aspect, the present invention refers a nucleic acid sequence for targeting a single point mutation within a target gene, wherein the target gene is one or more tumour suppressor genes; wherein the tumour suppressor gene is p53, and wherein the site of the point mutation is selected from the group consisting of R249 (p53), R248 (p53), R273 (p53) and R175 (p53).

In another aspect, the present invention refers to a method of treating cancer in a subject, the method comprising administering to the subject one or more nucleic acid sequences as disclosed herein, wherein the nucleic acid sequences target one or more point mutations sites within a target gene, wherein the target gene is a tumour suppressor gene.

In yet another aspect, the present invention refers to a method of identifying a subject susceptible to treatment, wherein the method comprises i) identifying one or more single point mutations within a target gene, wherein the target gene is one or more tumour suppressor genes; wherein the tumour suppressor gene is p53, and wherein the site of the one or more point mutations is selected from the group consisting of R249 (p53), R248 (p53), R273 (p53) and R175 (p53); ii) administering to the subject one or more nucleic acid sequences as disclosed herein, wherein the nucleic acid sequences target one or more point mutations sites within the target gene, wherein the presence of the one or more point mutations in the target gene indicate that the subject is susceptible to treatment.

BRIEF DESCRIPTION OF THE DRAWINGS

The invention will be better understood with reference to the detailed description when considered in conjunction with the non-limiting examples and the accompanying drawings, in which:

FIG. 7 presents data showing that mutant p53-specific silencing retards tumour growth in vivo. Mutant p53-specific silencing retards tumour growth in vivo. (A) & (B) RD, PLC-PRFS, and H1975 cell lines were transduced with scrambled or the indicated mutant-p53-specific shRNAs and were collected 3 days later, and cells [RD (4×10$^6$), PLC-PRFS (3×10$^6$) and H1975 (5×10$^6$)] as a mixture of 75 µl cells in PBS and 75 µl Matrigel were injected into the flanks of SCID mice, and tumour growth was monitored regularly. Sizes of tumours are indicated in the graphs (A). Tumours harvested at end point in each case were used for H&E or anti-p53 staining on RD tumours (B). Values represent mean+SD. n=4 (per group for RD and H1975 cells) and n=5 (for PLC cells). *** indicates p value of <0.001.

FIG. 17 shows a table summarising the efficacy of mutant p53-specific siRNAs on mutations within the same amino acid. Y: represents yes (in other words, siRNA is effective in targeting the listed mutant).

DETAILED DESCRIPTION OF THE PRESENT INVENTION

Figure 1B:
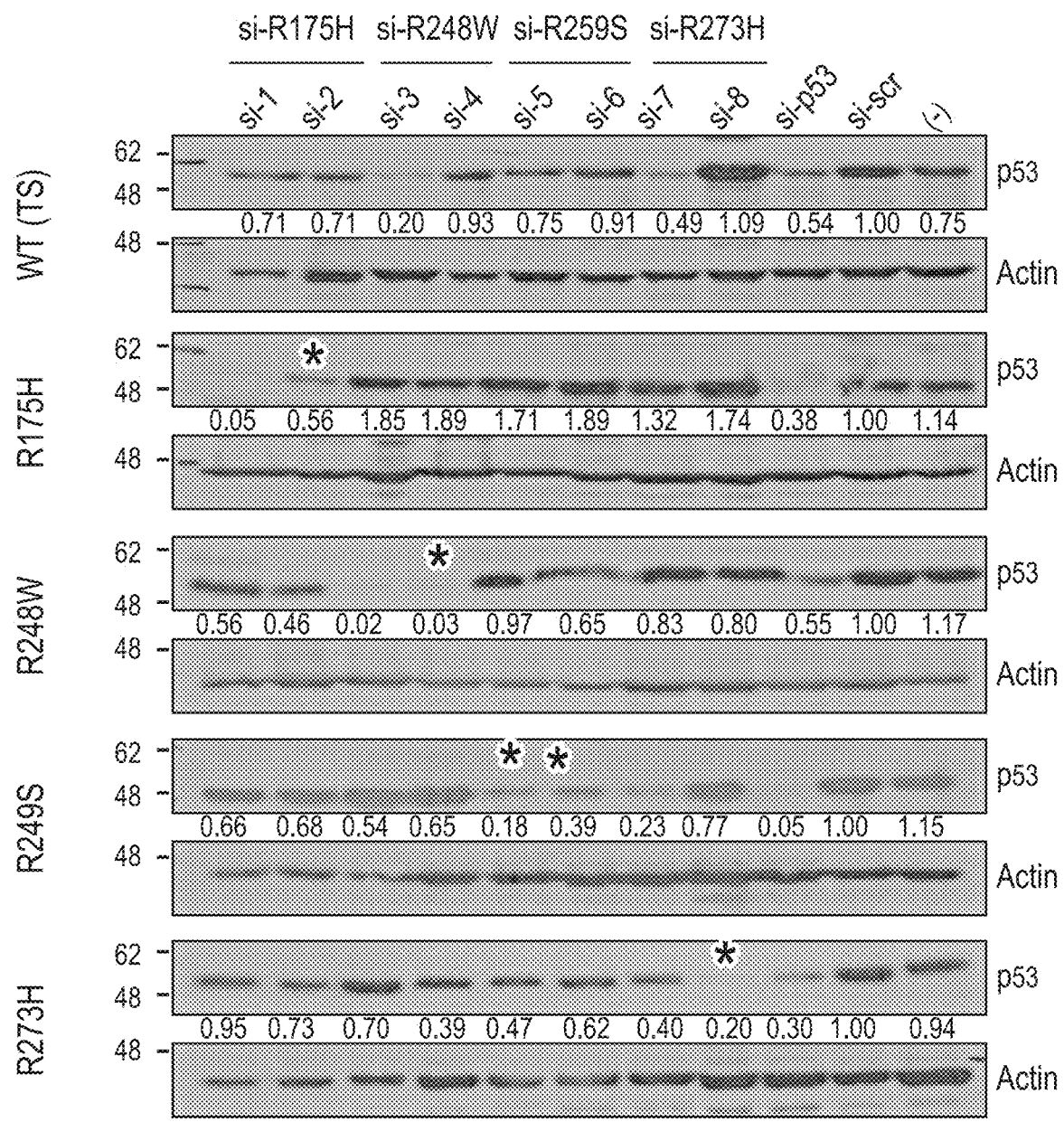
FIG. 1 provides data showing siRNA sequences selected by siRNA walk to specifically target various p53 hot-spot mutants. (A) shows the nucleotide sequence of wild-type (WT) and the respective p53 mutants (i.e. R175H; R248W; R249S and R273H) are indicated in each case, followed by the p53 allele-specific siRNA sequences shortlisted to target each mutant. Both the WT and the mutated nucleotide residue are highlighted in bold. The pan-p53 siRNA (si-p53) and the scrambled (scr) siRNA (si-scr) sequences are indicated at the bottom. (B) shows images of immunoblots performed for each siRNA shown in (A). Each siRNA was transfected into isogenic H1299 cell lines stably expressing the indicated p53 mutants. The cell lysate was then analysed for p53 expression by immunoblotting, 72 hours post-transfection, using anti-p53 antibody (DO-1). Temperature sensitive (TS) WT p53 expressing cells were used as a WT control. The mutant-specific siRNAs that showed specific and improved knock-down activity are indicated with an asterisk ("*"). One representative blot of at least three independent experiments is shown. Actin is shown as loading control, and (-) represent cells only without any siRNA transfection. For each sample, the ratio of p53 to Actin band intensity was calculated and normalized to the ratio of si-scr control. Values represent normalized fold change.

Mutations in Tp53 compromise therapeutic response, due either to the dominant-negative effect over the functional wild-type allele; or as a result of the survival advantage conferred by mutant p53 to which cancer cells become addicted. Thus, targeting mutant p53 represents an effective therapeutic targeting of over half of all cancers. A series of small-interfering-RNAs, capable of targeting p53 hot-spot mutants, have been generated. These mutant-p53-sepcific siRNAs (MupSi) are highly specific in silencing the expression of the intended mutants without affecting wild-type p53. Without being bound by theory, it is thought that functionally, these MupSis induce cell death by abrogating both the addiction to mutant p53 and the dominant-negative effect; and retard tumour growth in xenografts when administered in a therapeutic setting.

Thus, in one example, there is disclosed a nucleic acid sequence for targeting a single point mutation within a target gene. In another example, the target gene is one or more tumour suppressor genes. In yet another example, the tumour suppressor gene is p53.

Functionally, and without being bound by theory, these mutant-p53-specific siRNAs induce cell death by abrogating both the addiction to mutant p53 and the dominant-negative effect; and retard tumour growth in xenografts when administered in a therapeutic setting, demonstrating that mutation-specific siRNAs can be generated and effectively used to improve therapeutic response, a strategy that could be widely applicable.

In one example, the nucleic acid sequence results in any one or more of the following effects, which are, but are not limited to, cell death, abrogation of addiction, activation of any one or more of the target genes, relief of a dominant negative effect, increased sensitivity to one or more anti-cancer agents, and retardation or halting of tumour growth. In another example, the nucleic acid sequence is capable of substantially silencing mutant tumour suppressor gene alleles. In another example, the nucleic acid sequence as disclosed herein silences mutant suppressor gene alleles. In yet another example, the nucleic acid sequence as disclosed herein silences mutant suppressor gene alleles, without affecting the corresponding wild-type allele.

As used herein, the term "mutation" or "mutated" or "genetic alteration" refers to a natural or artificial modification, or genetic alteration of the genome or part of a nucleic acid sequence of any biological organism, virus or extra-chromosomal genetic element. This mutation can be induced artificially using, but not limited to, chemicals and radiation, but can also occur spontaneously during nucleic acid replication in cell division. Mutations may or may not produce discernible changes in the observable characteristics (phenotype) of an organism. There are various types of mutations known, which can either be small-scale mutations or large-scale mutations. Examples of small-scale mutations are, but are not limited to, substitution mutations, silent mutations, missense mutations, nonsense mutations, insertions, and deletions. Examples of large-scale mutations are, but are not limited to, amplifications, deletions, chromosomal translocations, interstitial deletions, chromosomal inversions and mutations that result in a loss of heterozygosity. Mutations can also be grouped by their effect on the function of the resulting product. These include, but are not limited to, loss-of-function (inactivating) mutations, gain-of-function (activating) mutations, dominant-negative (antimorphic) mutations, lethal mutations and back or reverse mutations. Point mutations, for example, also known as single base modification, are a type of mutation that causes a single nucleotide base substitution, insertion, or deletion of the genetic material, DNA or RNA. The term "frame-shift mutation" indicates the addition or deletion of a base pair.

As used herein, the term "hot spot mutation" refers to a region or site within a DNA sequence that shows a statistically high propensity to mutate. Such highly frequent mutations can be found in, for example, the p53 gene across all cancer types. As an example, there are six sites found within the p53 gene. These hot spot mutation sites include R175, R248, R249, and R273. In one example, the site of the point mutation is but is not limited to, R249 (p53), R248 (p53), R273 (p53) and R175 (p53).

Thus, in one example, the mutation is a point mutation. In another example, the point mutation is a substitution mutation. In yet another example, the mutation is a hot spot mutation.

In another example, the point mutation is, but is not limited to, R175H (p53), R248W (p53), R273H (p53), R249S (p53), and combinations thereof. In another example, the point mutation is, but is not limited to, R249S (p53), R249G (p53), R249M (p53), R248W (p53), R248Q (p53), R273H (p53), R273L (p53) and R175H (p53).

Among the mutated genes in cancers, mutations in the tumour suppressor gene Tp53 (hereinafter referred to as p53) occur with the highest frequency, cementing its position as the critical gate-keeper gene whose functions have to be abrogated for cancers to develop. Mutations in p53 can occur almost on all of its 393 residues, and these mutations impact tumourignesis in multiple ways. Firstly, mutations in p53 in the germ-line lead to cancer pre-disposition, as exemplified in the Li-Fraumeni syndrome, and in many model organisms. In addition, mutations in p53 have been associated with poor response to therapy, due often to the dominant-negative (DN) effects of the mutant protein over the remaining wild-type protein, which could be ameliorated by reducing the expression of the mutant form. Finally, cancer cells are often addicted to the presence of mutant p53 for survival and metastasis, and abrogation of many of the acquired gain-of-functions (GOF) of mutant p53 can reduce addiction and metastasis, thereby inducing tumour cell death and tumour load in vivo. However, GOF in itself appears not to be a universal phenomenon among all p53 mutants.

From the therapeutic perspective, mutant p53 would therefore be expected to be the prime target to treat cancers. However, the lack of interest to develop reagents to target mutant p53 stems from the fact that p53 is considered to be an "undruggable" transcription factor. This belief has hampered progress in the development of p53 targeting agents. Moreover, it was recently shown that not all mutants are equal in form and function, and that targeting mutant p53 would require a plethora of molecules, as opposed to a single agent capable of selectively targeting the various p53 mutants. Furthermore, in order to be effective, all of these molecules should not affect the functioning of the wild-type form. Thus, current technologies used in drug development have not been applied nor have they been successful in targeting mutant p53.

Small-interfering RNAs (siRNA) have been developed for many targets to silence their expression successfully, and as shown herein, can be seen as an avenue to target the various mutant p53. However, siRNAs that are capable of recognizing a single nucleotide change have not been generated routinely, due mainly to the inability to achieve specificity to target a single nucleotide change, without affecting the wild-type counterparts of the intended targets. These technologies have not been utilized routinely to generate reagents for multiple genetic alterations on the same gene. Therefore, the possibility of generating siRNAs that are specific for six hot-spot mutations, for example of p53 has been explored. Data provided herein demonstrates the generation of such mutant p53-specific siRNAs (referred to as MupSi), and demonstrate their utility in selectively silencing the expression of the intended mutant p53 forms, without cross-reactivity against other mutants or against the wild-type protein. Furthermore, these siRNAs have been used to demonstrate the amelioration of the dominant negative (DN) activity of mutant p53 over the wild-type form, thereby sensitizing tumour cells to therapeutic treatment. Moreover, they also abrogate the addiction of cancer cells to mutant p53 for survival, leading to cell death of tumour cells expressing mutant p53. Finally, it is shown that siRNAs can be used as therapeutic agents, and are capable of retarding tumour growth in vivo without having any side effects or organ toxicity (data not shown). The generation of such mutant p53-specific siRNAs (referred to as MupSi) is shown herein. Furthermore, their ability in selectively silencing the expression of the intended mutant p53 forms is demonstrated, without cross-reactivity against other mutants or against the wild-type protein. Furthermore, these RNAs have shown to ameliorate of the dominant negative (DN) activity of mutant p53 over the wild-type form, thereby resulting in a sensitisation of mutant tumour cells to therapeutic treatment. Moreover, these RNAs are also shown to abrogate the addiction of cancer cells to mutant p53 for survival, leading to cell death of tumour cells expressing mutant p53. Finally, it is shown that these RNAs can be used as therapeutic agents, and are capable of retarding tumour growth in vivo without resulting in any side effects or organ toxicity. Together, this data demonstrates that mutation-specific RNAs, for example siRNAs can be routinely generated and that these mutant specific siRNA are effective in treating cancer.

The term "RNAi" refers to RNA interference, a process in which RNA molecules inhibit gene function. This interference is based on the ability of double-stranded RNA to interfere with, or suppress, the expression of a gene with a corresponding base sequence. For example, two types of small ribonucleic acid (RNA) molecules—microRNA (miRNA) and small interfering RNA (siRNA)—are important to RNA interference. RNA molecules (or RNAs) are the direct products of genes, and these small RNAs can bind, for example, to other specific messenger RNA (mRNA) molecules, thereby either increase or decrease their activity, for example by preventing an mRNA from producing a protein.

As used herein, the term "RNA", that is "ribonucleic acid" refers to an organic molecule consisting of along chain of nucleotides in which the sugar is ribose (or variations thereof) and the bases are adenine, cytosine, guanine, and uracil. In the present disclosure, the term "siRNA" and "shRNA" refer to a class of double-stranded RNA molecules that operate using the concept of RNA interference (RNAi). The difference between siRNA and shRNA is their secondary structure, as shRNAs are so named for the presence of tight hairpin turns in their secondary structure.

Thus, in one example, the nucleic acid sequence disclosed herein is a short interfering RNA (siRNA) sequence or a short hairpin RNA (shRNA) sequence. In another example, the nucleic acid sequence is siRNA. In yet another example, the nucleic acid sequence is shRNA.

In one example, the siRNA sequence is between 15 to 150 base pairs, between 60 to 100 base pairs, between 70 to 120 base pairs, about 60 base pairs, about 65 base pairs, about 70 base pairs, about 75 base pairs, about 80 base pairs, about 85 base pairs, about 90 base pairs, about 95 base pairs, about 100 base pairs, about 105 base pairs, or about 110 base pairs in length. In another example, the siRNA sequence is at least 15 base pairs, at least 20 base pairs, at least 25 base pairs, at least 30 base pairs, at least 35 base pairs, at least 40 base pairs, at least 45 base pairs, or at least 50 base pairs in length.

In another example, the shRNA sequence comprises stems with the length of between 15 to 30 base pairs, between 19 to 29 base pairs, between 15 to 20 base pairs, between 20 to 30 base pairs, about 18 base pairs, about 19 base pairs, about 20 base pairs, about 21 base pairs, about 22 base pairs, about 23 base pairs, about 24 base pairs, about 25 base pairs, about 26 base pairs, about 27 base pairs, about 28 base pairs, about 29 base pairs, or about 30 base pairs.

In yet another example, the nucleic acid sequence disclosed comprises one of the sequences of SEQ ID NO. 2, SEQ ID NO. 3, SEQ ID NO. 4, SEQ ID NO. 5, SEQ ID NO. 36, SEQ ID NO. 37, SEQ ID NO. 38, SEQ ID NO. 39, SEQ ID NO. 7, SEQ ID NO. 8, SEQ ID NO. 9, SEQ ID NO. 11, SEQ ID NO. 44, SEQ ID NO. 12, SEQ ID NO. 13, SEQ ID NO. 15, SEQ ID NO. 45, SEQ ID NO. 46, SEQ ID NO. 16, SEQ ID NO. 17, SEQ ID NO. 19, SEQ ID NO. 47, SEQ ID NO. 20, SEQ ID NO. 21, SEQ ID NO. 26, SEQ ID NO. 27, SEQ ID NO. 28, SEQ ID NO. 29, SEQ ID NO. 30, SEQ ID NO. 31, SEQ ID NO. 32, or SEQ ID NO. 33.

Collectively, the data shown herein, for example in FIG. 2A-D as disclosed herein, shows that it is possible to generate siRNAs reproducibly that are highly specific and selective for single nucleotide changes, with extensive screening. Thus, in one example, the nucleic acid sequence disclosed herein comprises one of the sequences of SEQ ID NO. 9, SEQ ID NO. 13, SEQ ID NO. 16, SEQ ID NO. 17, or SEQ ID NO. 21.

In one example, the nucleic acid sequence disclosed herein comprises one of the sequences of SEQ ID NO. 8 (R175H Si-1-R175H), SEQ ID NO. 9 (R175H Si-2-R175H), SEQ ID NO. 12 (R248W/Q Si-3-R248W/R248Q), SEQ ID NO. 13 (R248W/Q Si-4-R248W/R248Q), SEQ ID NO. 16 (R249S/M/G Si-5-R249S/R249M/R249G), SEQ ID NO. 17 (R249S/M/G Si-6-R249S/R249M/R249G), SEQ ID NO. 20 (R273H/L Si-7-R273H/R273L), or SEQ ID NO. 21 (R273H/L Si-8-R273H/R273L).

In yet another example, nucleic acid sequence disclosed herein comprises one of the sequences of SEQ ID NO.26, SEQ ID NO. 27, SEQ ID NO.28, SEQ ID NO.29, SEQ ID NO. 30, SEQ ID NO. 31, SEQ ID NO. 32, or SEQ ID NO. 33.

In another example, the nucleic acid sequence disclosed herein comprises one of the sequence pairs of SEQ ID NO. 26 and SEQ ID NO.27; SEQ ID NO. 28 and SEQ ID NO. 29; SEQ ID NO. 30 and SEQ ID NO. 31; or SEQ ID NO. 32 and SEQ ID NO. 33.

In a further example, in one example, the nucleic acid sequence disclosed herein comprises one of the sequences of SEQ ID NO. 9, SEQ ID NO. 13, SEQ ID NO. 16, SEQ ID NO. 17, or SEQ ID NO. 21.

In one example, the nucleic acid sequence is SEQ ID NO. 2. In another example, the nucleic acid sequence is SEQ ID NO. 3. In one example, the nucleic acid sequence is SEQ ID NO. 4. In one example, the nucleic acid sequence is SEQ ID NO. 5. In one example, the nucleic acid sequence is SEQ ID NO. 36. In one example, the nucleic acid sequence is SEQ ID NO. 37. In one example, the nucleic acid sequence is SEQ ID NO. 38. In one example, the nucleic acid sequence is SEQ ID NO. 39. In one example, the nucleic acid sequence is SEQ ID NO. 7. In one example, the nucleic acid sequence is SEQ ID NO. 8. In one example, the nucleic acid sequence is SEQ ID NO. 9. In one example, the nucleic acid sequence is SEQ ID NO. 11. In one example, the nucleic acid sequence is SEQ ID NO. 44. In one example, the nucleic acid sequence is SEQ ID NO. 12. In one example, the nucleic acid sequence is SEQ ID NO. 13. In one example, the nucleic acid sequence is SEQ ID NO. 15. In one example, the nucleic acid sequence is SEQ ID NO. 45. In one example, the nucleic acid sequence is SEQ ID NO. 46. In one example, the nucleic acid sequence is SEQ ID NO. 16. In one example, the nucleic acid sequence is SEQ ID NO. 17. In one example, the nucleic acid sequence is SEQ ID NO. 19. In one example, the nucleic acid sequence is SEQ ID NO. 47. In one example, the nucleic acid sequence is SEQ ID NO. 20. In one example, the nucleic acid sequence is SEQ ID NO. 21. In one example, the nucleic acid sequence is SEQ ID NO. 26. In one example, the nucleic acid sequence is SEQ ID NO. 27. In one example, the nucleic acid sequence is SEQ ID NO. 28. In one example, the nucleic acid sequence is SEQ ID NO. 29. In one example, the nucleic acid sequence is SEQ ID NO. 30. In one example, the nucleic acid sequence is SEQ ID NO. 31. In one example, the nucleic acid sequence is SEQ ID NO. 32. In one example, the nucleic acid sequence is SEQ ID NO. 33.

In one example, the nucleic acid sequence comprises SEQ ID NO. 24 (AAGCTTT), SEQ ID NO. 40 (TTCAAGAGA) and SEQ ID NO. 41 (TTTTTTA), whereby the nucleic acid sequence has the following structure: 5'-AAGCTTTN$_{(19-29)}$ (sense sequence)TTCAAGAGAN$_{(19-29)}$(antisense sequence)TTTTTTA-3'. This is an exemplary shRNA upper oligonucleotide, whereby (other than the siRNA sequence which is referred to as N$_{(19-29)}$) the nucleotides indicated at the front and end of each oligonucleotide are for the restriction enzyme cutting site. The middle sequence (in this example TTCAAGAGA) is for the formation of a stem loop.

In another example, the nucleic acid sequence comprises SEQ ID NO. 25 (AGCTTAAAAA), SEQ ID NO. 42 (TCTCTTGAA) and SEQ ID NO. 43 (GGG), whereby the nucleic acid sequence has the following structure: 5'-AGCTTAAAAAN$_{(19-29)}$(sense sequence)TCTCTTGAAN$_{(19-29)}$ (antisense sequence)GGG-3'. This is an exemplary shRNA lower oligonucleotide, whereby (other than the siRNA sequence which is referred to as N$_{(19-29)}$) the nucleotides indicated at the front and end of each oligonucleotide are for the restriction enzyme cutting site. The middle sequence (in this example TCTCTTGAA) is for the formation of a stem loop.

The results presented here demonstrate that siRNAs that are highly-specific and capable of distinguishing one nucleotide change can indeed be regularly generated, and highlight their utility in targeting four p53 hot-spot mutants. These four p53 mutants account for about 20% of all p53 mutations found in cancers, and thus represent the possibility of targeting about 10% of all cancers. Targeting mutant p53 resulted in improved chemo-sensitivity, as it had no effects on the wild-type p53 protein in the heterozygous cells, allowing it to function to induce cell death. Furthermore, abrogation of mutant p53 expression in cancer cells expressing only mutant p53, as often seen in later stages of cancers where the wild-type p53 allele is lost due to loss-of-heterozygosity, resulted in retardation of tumour growth in vivo even when used as a mono-therapy. This data highlights the therapeutic use of these p53 mutant-specific siRNAs, whose effects could be further enhanced in combination with other chemotherapeutic agents or radiotherapy. Hence, these data provide the impetus to target mutant p53 directly for clinical benefit, which could be translated to the clinical settings soon.

Mutant p53 were chosen to demonstrate the nucleotide-specific siRNAs, as it is the most mutated gene across all cancers, and importantly, not all mutants behave similarly, thus, requiring selective agents to target each of them. Moreover, targeting mutant p53 represents a huge untapped route to retard tumour cell growth and metastasis, and to improve sensitivity to general cytotoxic agents, and would therefore find applicability against most cancer types. Similarly, targeting other driver oncogenes with specific siRNAs in conjunction with mutant p53 is thought to enhance the therapeutic effects, and therefore, use of a cocktail of siRNAs against the major genetic alterations in each cancer type is also possible in a clinical setting.

Thus, in one example, there is disclosed a method of treating cancer in a subject. In another example, the method comprises administering to the subject one or more nucleic acid sequences as described in the present application. In yet another example, the nucleic acid sequences target one or more point mutations within a target gene. In another example, the target gene is one or more tumour suppressor genes. In yet another example, the method comprises administering to the subject one or more nucleic acid sequences as disclosed herein, wherein the nucleic acid sequences target one or more point mutations within a target gene, wherein the target gene is a tumour suppressor gene. Also disclosed herein is use of one or more nucleic acid sequences as disclosed herein in the manufacture of a medicament for treating cancer in a subject. Further disclosed herein is the use of one or more of the nucleic acid sequences disclosed herein in therapy. In another example, the nucleic acid sequences disclosed herein are for use in therapy.

The term "treat" or "treating" as used herein is intended to refer to providing a pharmaceutically or therapeutically effective amount of, for example, a nucleic acid, a protein, or a respective pharmaceutical composition or medicament thereof, sufficient to act prophylactically to prevent the development of a weakened and/or unhealthy state; and/or providing a subject with a sufficient amount of the pharmaceutical composition or medicament thereof so as to alleviate or eliminate a disease state and/or the symptoms of a disease state, and a weakened and/or unhealthy state. As is known in the art, the pharmaceutically effective amount of a given composition will also depend on the administration route. In general the required amount will be higher, if the administration is through, for example, the gastrointestinal tract (e.g. by suppository, rectal, or by an intragastric probe), and lower if the route of administration is parenteral, e.g. intravenously.

The generation and characterization of siRNAs that are highly specific for the various p53 mutants that are highly represented in human cancers has been shown. This data translates directly for clinical evaluation with the appropriate delivery mechanisms.

In one example, administration of the one or more of the nucleic acid sequences results in one or more of the following effects, including but not limited to, cell death, abrogation of addiction to any one or more of the target genes, a dominant negative effect, increased sensitivity to one or more anti-cancer agents, and retardation or halting of tumour growth. In another example, the nucleic acid sequences disclosed are administered with a therapeutic agent.

As used herein, the term "therapeutic agent" refers to a chemical compound or composition capable of inducing a desired therapeutic effect when properly administered to a subject. For example, an anti-diabetic agent is considered a therapeutic agent, in the sense that it is administered to treat, for example, diabetes in a subject. Thus, in one example, the method disclosed herein comprises administration of a therapeutic agent. In another example, the therapeutic agent is an anti-cancer agent. In another example, the anti-cancer agent is selected from the group consisting of 10-hydroxy-camptothecin, abraxane, acediasulfone, aclarubicine, aklavine hydrochloride, ambazone, amsacrine, aminoglutethimide, anastrozole, ancitabine hydrochloride, L-asparaginase, azathioprine, bleomycin, bortezomib, busulfan, calcium folinate, carbop latin, carpecitabine, carmustine, celecoxib, chlorambucil, cisplatin, cladribine, colchicine, cyclophosphamide, cytarabine, dacarbazine, dactinomycin dapsone, daunorubicin, dibrompropamidine, diethylstilbestrole, docetaxel, doxorubicin, emetine, enediynes, epirubicin, epothilone B, epothilone D, estramucin phosphate, estrogen, ethinylestradiole, etoposide, epirubicin hydrochloride, faslodex, flavopiridol, floxuridine, fludarabine, fluorouracil, 5-fluorouracil, fluoxymesterone, flutamide fosfestrol, furazolidone, gambogic acid amide, gambogic acid, gemcitabine, gonadotropin releasing hormone analog, herceptin, hexamethylmelamine, hydroxycarbamide, hydroxymethylnitrofurantoin, hydroxyprogesteronecaproat, hydroxyurea, idarubicin, idoxuridine, ifosfamide, interferon gamma (INF-γ), irinotecan, imatinib, irinotecan, letrozole, leuprolide, lomustine, lurtotecan, mafenide sulfate olamide, mechlorethamine, medroxyprogesterone acetate, megastrolacetate, melphalan, mepacrine, mercaptopurine, methotrexate, metronidazole, mitomycin C, mitoxanthrone hydrochloride, mitopodozide, mitotane, mitoxantrone, mithramycin, nalidixic acid, nifuratel, nifuroxazide, nifuralazine, nifurtimox, nimustine, ninorazole, nitrofurantoin, nitrogen mustards, oleomucin, oxolinic acid, oxaliplatin, ouabain, pentamidine, pentostatin, phenazopyridine, phthalylsulfathiazole, phenylmercuric acetate, picropodophyllotoxin, pipobroman, prednimustine, prednisone, preussin, pristimerin, procarbazine, pyrimethamine, quinacrine hydrochloride, raltitrexed, rapamycin, rotenone, rofecoxib, rosiglitazone, raloxifen, salazosulfapyridine, scriflavinium chloride, semustine streptozocine, sulfacarbamide, sulfacetamide, sulfachlopyridazine, sulfadiazine, sulfadicramide, sulfadimethoxine, sulfaethidole, sulfafurazole, sulfaguanidine, sulfaguanole, sulfamethizole, sulfamethoxazole, co-trimoxazole, sulfamethoxydiazine, sulfamethoxypyridazine, sulfamoxole, sulfanilamide, sulfaperin, sulfaphenazole, sulfathiazole, sulfisomidine, staurosporin, tamoxifen, taxol, temozolimide, teniposide, teniposide, testolactone, testosteronpropionate, thimerosal, thioguanine, thiotepa, imidazole, topotecan, trastuzumab, triaziquone, treosulfan, trimethoprim, trofosfamide, UCN-01, vinblastine, vinblastine sulfate, vincristine, vincristine sulfate, vindesine, vinorelbine, and zorubicin, or their respective derivatives or analogues thereof. In one example, the chemotherapeutic agent is, but is not limited to, cisplatin, etoposide, abraxane, trastuzumab, gemcitabine, imatinib, irinotecan, oxaliplatin, bortezomib, methotrexate, chlorambucil, doxorubicin, dacarbazine, cyclophosphamide, paclitaxel, 5-fluorouracil, gemcitabine, vincristine, docetaxel, vinorelbine, epothilone B, gefitinib, and combinations thereof. In another example, the anti-cancer agent is, but is not limited to, cisplatin, etoposide, abraxane, trastuzumab, gemcitabine, imatinib, irinotecan, oxalipiatin, bortezomib, methotrexate, chlorambueil, doxo-rubicin, dacarbazine, cyclophosphamide, paclitaxel, 5-fluo-rouracil, gemcitabine, vincristine, docetaxel, vinoreibine, gefitinib, epothilone B, and combinations thereof.

Thus, the methods disclosed herein can be used to treat a hyperproliferative disease, for example, cancer. In one example, the cancer is found to be in, or originates from, organs and areas of a mammal body, including, but not limited to the oesophagus, upper respiratory tract, skin, epithelial, central nervous system, ovarian, breast, gastro-intestinal, large intestines, small intestines, colorectal, liver, adenocarcinoma, adrenal adenocarcinoma, thyroid, lung, pancreas, kidney, endometrial, hematopoietic, muscles, connective tissue (such as tendon or cartilage), bone, soft tissue, lymphoid tissue, lymph and the immune system. In another example, the type of cancer is, but is not limited to, melanomas, myelomas, carcinomas, sarcomas, lymphomas, blastomas and germ cell tumours. In another example, the cancer is, but is not limited to, lung carcinoma, malignant melanoma, colon carcinoma, breast carcinoma, endometrial adenocarcinoma, rhabdomyosarcoma, kidney adenocarci-noma, colon adenocarcinoma, hepatocellular carcinoma, bronchial squamous cancer, ovarian carcinoma and pancre-atic adenocarcinoma.

In another example, the cancer is a cancer cell line including, but not limited to, A549, A375, HCT116, RKO, AU565, SKBR3, HCC1395, HEC 1A, RD, 786-O, COLO-320DM, PLC-PRF/5, KNS-62, BT549, ASPC1, WiDR1 and H1975. In another example, the cancer is dependent on one or more of the tumour suppressor genes. In yet another example, the tumour suppressor gene is p53. In a further example, the cancer is dependent on the tumour suppressor gene, wherein the tumour suppressor gene is p53.

The results presented herein demonstrate that siRNAs that are specific and capable of distinguishing one nucleotide change can indeed be regularly generated, and highlight their utility in targeting four p53 hot-spot mutants. The four p53 mutants disclosed herein account for about 20% of all p53 mutations found in cancers, and targeting them represents the possibility of targeting about 10% of all cancers. Targeting mutant p53 resulted in improved chemo-sensitivity, as it had negligible or no effects on the wild-type p53 protein in the heterozygous cells, allowing the latter to function to induce cell death. Furthermore, abrogation of mutant p53 expression in cancer cells expressing only mutant p53, as often seen in later stages of cancers where the wild-type p53 allele is lost due to loss-of-heterozygosity, resulted in retardation of tumour growth in vivo even when used as a mono-therapy. This data highlights the therapeutic potential provided by the RNA constructs as disclosed herein, whose effects could be further enhanced in combination with other chemotherapeutic agents or radiotherapy. Hence, the data shown herein also demonstrates that targeting mutant p53 directly has clinical benefits and would translate into a clinical setting.

RNAs, for example siRNAs, have been generated successfully to silence gene expression and has been extensively used in research, and also been translated to the clinical setting. Most of these siRNAs target the whole gene (protein), without cross-reactivity to other related genes. However, only few examples exist for the generation of siRNAs that are capable of discerning single nucleotide changes found in the disease states. The ones that have been generated with some specificity for single nucleotides include those against R248W mutant p53. These have been shown to be relatively specific in reporter assays and in overexpression systems, though some level of cross-reactivity with the wild-type protein is often noted. Moreover, many of the siRNA have not been tested in a large number of cell lines to establish their specificity unequivocally. These factors highlight the enormous challenges in obtaining siRNAs that show specificity at the nucleotide level, and which can be used on critical genes that affect a multitude of process in normal physiology, like p53. The data shown herein has revealed that a large library of siRNAs has to be tested prior to obtaining highly specific ones, especially since the effects of the addition or subtraction of a few nucleotides in the siRNA sequences can make a huge difference. Very subtle changes in the sequences of the siRNA significantly can affect the specificity and lead to marked differences in selectivity, and highlights that one cannot intuitively predict the effects of the various sequences. Though it is relatively possible to obtain siRNAs that appear to be nucleotide specific, especially when assayed against one or two cell lines or using transfection systems, analyses against a large panel of cellular systems is essential to ensure that they are specific. This is crucial when these siRNAs are intended for use in the clinical setting. The set of siRNA/shRNA sequences presented herein represents a unique set of RNAs that are capable of specifically targeting almost 20% of all cancers with mutations in p53, supporting the notion that with sufficient screening, nucleo-tide-specific siRNAs/shRNAs can be generated and evaluated in clinical trials.

The mutant p53 has been chosen to demonstrate the ability to generate nucleotide-specific siRNAs, as it is the most mutated gene across all cancers. Importantly, not all p53 mutants behave similarly, and thus, targeting mutant p53 requires selective agents to target each of them individually. Moreover, targeting mutant p53 represents an untapped route to retard tumour cell growth and metastasis, and to improve sensitivity to general cytotoxic agents, and would therefore find applicability against most cancer types. As highlighted earlier, mutant p53 can exist either with the wild-type allele in the earlier stages of tumorigenesis, or by itself after the loss of the wild-type allele due to LOH in later stages. In the earlier stages, mutant p53 inhibits the WT protein through the dominant-negative (DN) effect, and at the later stages, the mutant provides a survival advantage independent of the wild-type allele. The data shown herein demonstrates that the mutant p53-specific siRNAs are capable of relieving both the dominant-negative (DN) effect, as well as the addiction of cancer cells to mutant p53, and can therefore be used widely as long as the mutation is present in the tumours. Similarly, targeting other driver oncogenes with specific siRNAs in conjunction with mutant p53 is understood to enhance the therapeutic effects, and it is thought that a cocktail of siRNAs (or other RNA capable of silencing target gene expression) against the major genetic alterations in each cancer type will be clinically beneficial, with the aim of minimizing cross-reactivity, and thus, reducing side effects associated with many of today's cancer drugs.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

As used in this application, the singular form "a," "an," and "the" include plural references unless the context clearly dictates otherwise. For example, the term "a genetic marker" includes a plurality of genetic markers, including mixtures and combinations thereof.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Materials and Methods

Cell Culture

Cell lines were obtained from ATCC and JCRB and were cultured under standard conditions (37° C., 5% $CO_2$) with the following media: DMEM with 4.5 g/L glucose and 10% FBS (Hyclone) for H1299, RKO, HCT116, A549, A375, SKBR3, RD, PLC-PRF-5, KNS-62 and HEC1A cell lines; RPMI-1640 and 10% FBS (Hyclone) for AU565, HCC1395, COLO-320DM, 786-O, ASPC-1, WiDR and H1975; RPMI-1640 with 0.023 IU/ml insulin and 10% FBS (Hyclone) for BT-549; RKO p53+/− and +/R248W and HCT p53+/− and +/R248W.

siRNA Design

A large library of siRNAs were designed to target p53 hot-spot mutations (R175H, R248W, R249S and R273H), and from these, 8 were shortlisted for the four mutants for further characterization (si-1-8). An siRNA against all p53 alleles generated in our screen was used as a positive control for pan-p53 targeting. Control scrambled siRNA had no bio-informatically predicted sequence target in the human genome and was used as a negative control.

Transfection of p53 siRNA/shRNA, and RNA and Protein Analyses $2.5\times10^5$ cells per well were seeded in a 6-well plate 24 hours before transfection. The cells were transfected with 80 nM siRNA or 1 µg of the pRetroSuper-shRNAs using Lipofectamine™ 2000 reagent (Invitrogen) as per the manufacturer's description. Each transfection was performed in triplicate and the cells were harvested with 1 mL of TRIzol reagent (Invitrogen) 72 hours after transfection. For co-transfection with p53 cDNAs, the latter were transfected 24 hours after the siRNA transfection and cells were analysed 48 post cDNA transfection (i.e. 72 hours post-siRNA transfection).

Total RNA isolation was performed using Invitrogen's standard protocol, and cDNA was prepared using Superscript II reverse transcription (Invitrogen). Quantitative and semi-quantitative reverse transcriptase (RT)-PCR analysis was performed on the following p53 target genes: p21, pig3, mdm2, noxa and gapdh, as described.

Cell extracts were prepared in lysis buffer (0.7% NP40; Tris·Cl, pH 7.4; 70 mM EDTA; 200 nM NaCl on ice for 10 minutes). After protein quantitation, 30-50 µg of lysate was loaded on SDS-polycrylamide gel (12%) electrophoresis (SDS-PAGE), and the resolved proteins were transferred electrophoretically to polyvinylidene fluoride (PVDF) membranes (Invitrogen, Breda, The Netherlands). The detection of the protein was done with ECL (GE Healthcare, Waukesha, WI, USA). p53 was detected with a mouse anti-p53 monoclonal antibody (DO-1 from Santa Cruz Biotechnology, #SC126) and actin was detected with a rabbit anti-actin antibody (Sigma, #82061). Parallel gels were run with equal amounts of lysates and probed with the various antibodies separately, in cases where background from the first antibody was high. Quantification of western blots was done using the ImageJ software by lane plotting and peal labelling (signal intensity quantification). For each sample, the ratio of p53 to Actin band intensity was calculated and normalized to the ratio of si-scr/sh-scr control. Values represent normalized fold change.

Cell Death Assays

Cells were transfected with 80 nM siRNA and harvested 72 hours post-transfection, including floating cells in the medium. Cells were washed 2× in PBS and were fixed in 70% ethanol overnight and were treated with RNase for 20 minutes before addition of 5 μg/ml propidium iodide (PI) and flow cytometric analysis by flow cytometry (BD Biosciences FACScalibur), to measure apoptosis (sub-G1 DNA content).

Design of shRNA Template Oligonucleotides and Construction of Plasmid shRNA target sequences were designed to be homologous to the siRNA sequences afore-described. The pRetro-Super vector contains a human H1 polymerase-III (pol-III) promoter for shRNA expression. Each shRNA insert was designed as a synthetic duplex with overhanging ends identical to those created by restriction enzyme (RE) digestion (BamHI at the 5' and HindIII at the 3'). The coding region for each hairpin is nested within a single oligonucleotide (upper oligonucleotide: 5'-AAGCTTTN$_{(19-29)}$ (sense sequence) TTCAAGAGAN$_{(19-29)}$ (antisense sequence) TTTTTTA-3'; comprising SEQ ID NOS. 24, 40, and 41, respectively; wherein the siRNA sequence is referred to as N$_{(19-29)}$) and its complementary equivalent (lower oligonucleotide: 5'-AGCTTAAAAAN$_{(19-29)}$ (sense sequence) TCTCTTGAAN$_{(19-29)}$ (antisense sequence) GGG-3'; comprising SEQ ID NOS. 25, 42, and 43, respectively; wherein the siRNA sequence is referred to as N$_{(19-29)}$). These ranged in size from 60-100 bases (for hairpins with 19-29 bp stems). Each duplex contained a transcription initiation base, the shRNA encoding region (sense stem, loop sequence and anti-sense stem), a termination spacer and a pol-III termination signal consisting of a run of at least 4 'T's. The transcription initiation base was an 'A' or 'G' (required for efficient pol-III transcription initiation) and was only included if the first base of the hairpin stem was not a purine. The termination spacer was any base but 'T' and was included only if the last base of the anti-sense stem was 'T' so as to prevent premature termination via an early run of 'T's. Oligonucleotides were ordered at the minimal synthesis and purification scales (0.05 μM and desalt, Sigma-Aldrich). Each oligonucleotide was re-suspended in water at a 100 μM concentration and 10 μl from each was added to 20 μl of 2× annealing buffer (200 mM Potassium acetate, 60 mM HEPES KOH PH 7.4, 4 mM Mg-acetate), heated to 95° C. for 10 minutes, slowly equilibrated to room temperature and diluted 1:1000 fold for ligation. The insert and vector were ligated, and transformed into TOP10 or DH5α competent cells. Clones with the shRNA insert were selected and purified before transfection.

Colony Formation Assay

The indicated cell lines were transfected with the indicated shRNA plasmids containing oligonucleotide sequences for silencing the various mutant p53 and were selected for 2 weeks on 15 μg/ml of blasticidine (Sigma, USA). Colonies were stained with crystal violet solution (Merck), as described.

Generation of shRNA Expressing Cell Lines for In Vivo Tumour Growth Analysis

Viruses for p53 mutant-specific shRNAs were produced using pCL-Ampho amphotropic virus packaging plasmid in HEK293T cells. Briefly, retroviruses were prepared by transfection of HEK293T cells with the 1.5 μl g of the appropriate shRNA and 1.0 μg of the packaging plasmid using lipofectamine 2000™. Retroviral supernatants were harvested at 24h after transfection, filtered through 0.45 μM syringe filter, aliquoted and flash frozen. 3.5 ml of retroviral supernatant was used to transduce 5×10$^5$ cells in a 10 cm dish in the presence of 8 μg/ml of polybrene (Sigma) in triplicates in 6 cm dish. A second transduction was performed the following day. The cells were selected using 10 μg/ml of blasticidine for 48h after the second transduction, and harvested for in vivo xenograft studies. Parallel cultures were used for immunoblots analysis to assess the efficiency of p53 knockdown.

Cell lines expressing the respective shRNA were harvested, and mixed with 50% Matrigel on ice (Corning®Matrigel® basement membrane matrix) (Sigma), and subcutaneously injected in the right flank of female C.B-17 SCID mice (6-8 weeks of age), and cells transduced with the scrambled shRNA were injected on the left flanks of each mice. Tumour volume was assessed with a caliper twice per week and values were taken down as soon as tumours became palpable. Calculation of tumour volume was done according to $V=\frac{1}{2}*(length*width^2)$. Values are plotted as means with standard deviation. Statistical significance between grow curves was calculated with PRISM software (GraphPad Prism Software Inc., San Diego, CA) using unpaired (two-tailed) t-test. Four-five mice were used for each treatment, in each group.

When mice were sacrificed, tumour tissues were excised and fixed in 10% formalin over-night, dehydrated and embedded in paraffin and 5 μm sections were prepared. Anti-p53 staining was done using p53 1C12 Mouse monoclonal antibody (Cell Signaling Technology, #2524) with a concentration of 1:1500. Staining signal was developed using Dako REAL™ EnVision™ Detection System, Peroxidase/DAB+, Rabbit/Mouse (#5007). All the animal experiments were conducted as approved by the Institution's Animal Care and Ethics Committee.

Results

Design and Selection of Allele-Specific siRNAs for Hot-Spot p53 Mutants

Starting point for the generation of siRNAs was that these siRNA will be capable of only silencing the mutant p53 alleles, without having an impact on WT p53 expression. To this end, a library of a large number of siRNAs was generated by performing sequence walks, such that the position of the mutant nucleotide was varied with respect to the entire siRNA strand. All the siRNAs were transfected in a series of H1299-based isogenic cell lines which stably expressed the various p53 mutants, or the temperature-sensitive (TS) WT p53, and data from representative siRNAs that show specific activity against for the four hot-spot mutants: R175H, R248W, R249S and R273H are shown (FIG. 1A). These were among the few shortlisted siRNAs that had specific activity for the respective p53 mutants. All the indicated siRNAs were transiently transfected in all the isogenic cell lines, which were harvested for analysis of the p53 protein expression 24 hours later, by immunoblotting. As shown in FIG. 1B, si-p53, which targets all p53 indiscriminately, was capable of reducing the expression of p53 in all cell lines, compared to scrambled siRNA or cells that were not transfected (last 3 lanes on the right of the gel images). Most of the mutation-specific siRNAs showed specificity and were able to discriminate the intended mutants, with minimal to negligible effects on other mutants or the WT p53: for instance, si-1 and si-2, which are specific for R175H mutant p53, were capable of reducing R175H expression, but had minimal impact on the other p53 mutants and WT p53. Similarly, si-3 and si-4 which are specific for R248W mutant p53 were capable of markedly reducing the expression of R248W mutant, without impacting other mutants. On the other hand, however, si-3 which also targets the R248W mutant, though capable of reducing the expression of its intended mutation, also led to a decrease in the expression of WT p53. Similarly, while si-8 which targets R273H was very specific, si-7 also had some effects on both WT p53 and the R249S mutant. This data indicates that evaluation of multiple siRNAs generated against the same mutation on multiple cell systems is crucial to obtain highly mutant-specific reagents.

Mutation-Specific siRNA-Mediated Silencing of Endogenous Mutant p53 Expression

Figure 2A:
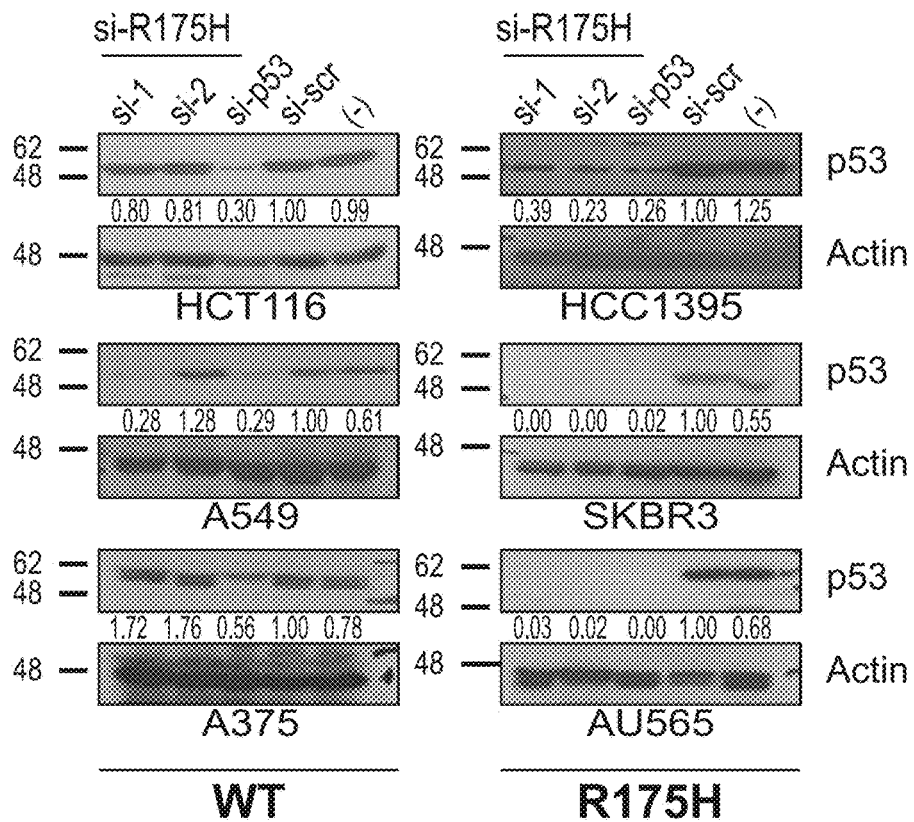
FIG. 2 depicts immunoblot data showing the silencing efficacy of mutant-specific siRNAs on endogenous mutant p53. Panels (A) to (D) show immunoblot results of siRNAs against R175H, R248W, R249S and R273H, respectively. Mutant siRNAs were transfected in the three cell lines with WT p53 expression, and in three cell lines expressing the indicated p53 mutants. Silencing efficacy was evaluated by immunoblotting as described above. One representative blot of at least three independent experiments is shown. Mutant p53 status of cell lines is highlighted below the blots and described in Table 1.
Figure 2B:
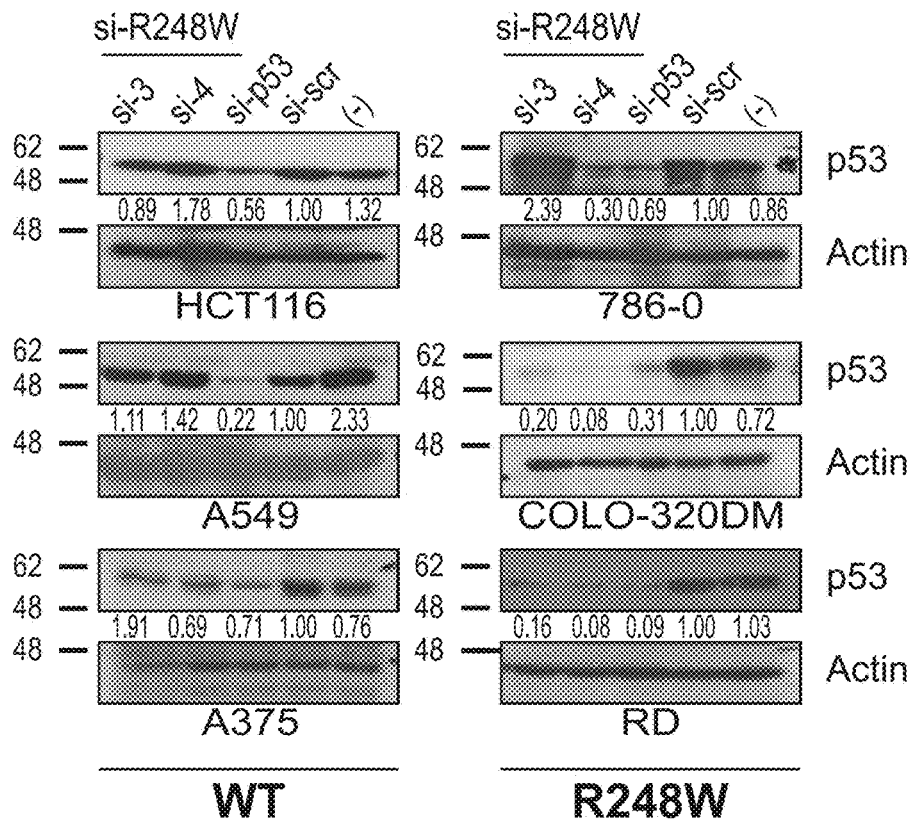
Figure 2C:
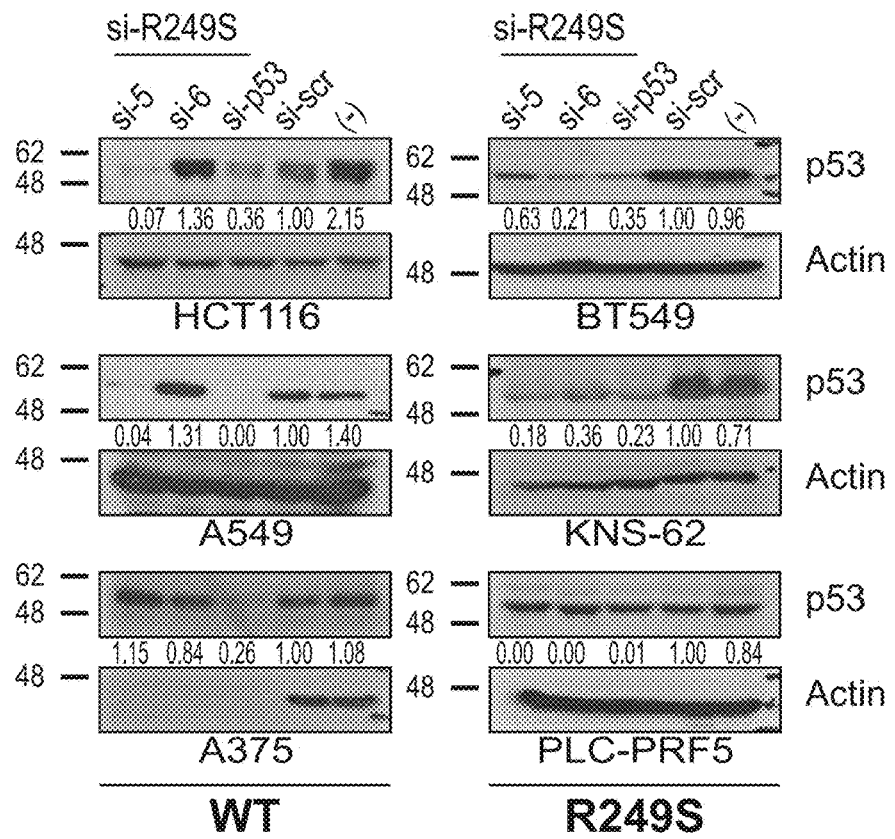
Figure 2D:
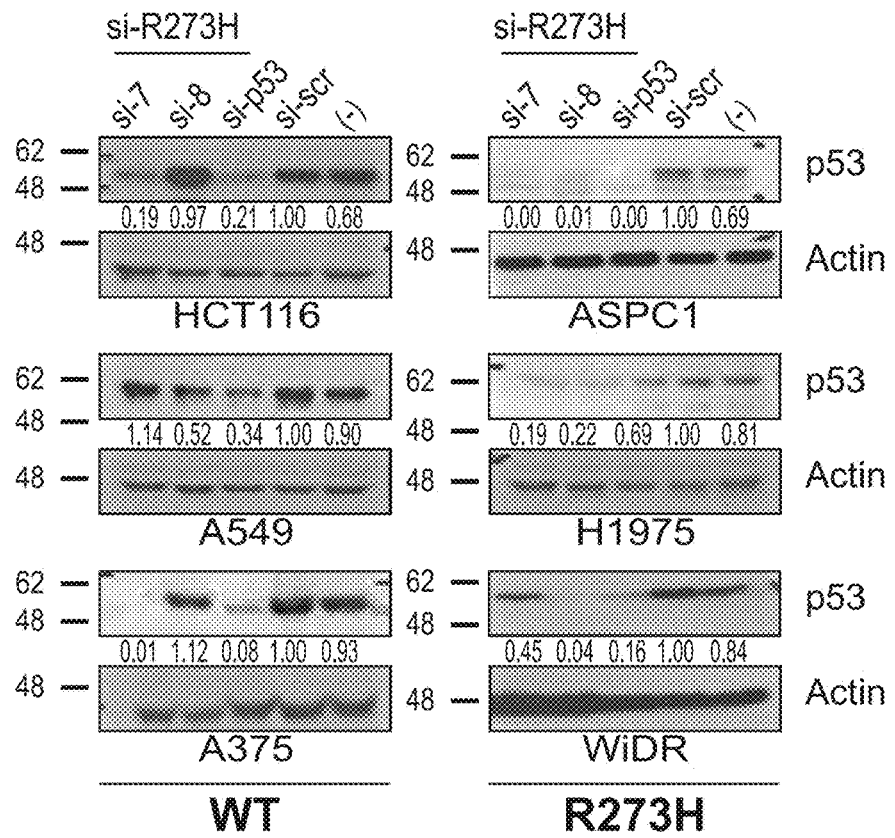
Figure 8:
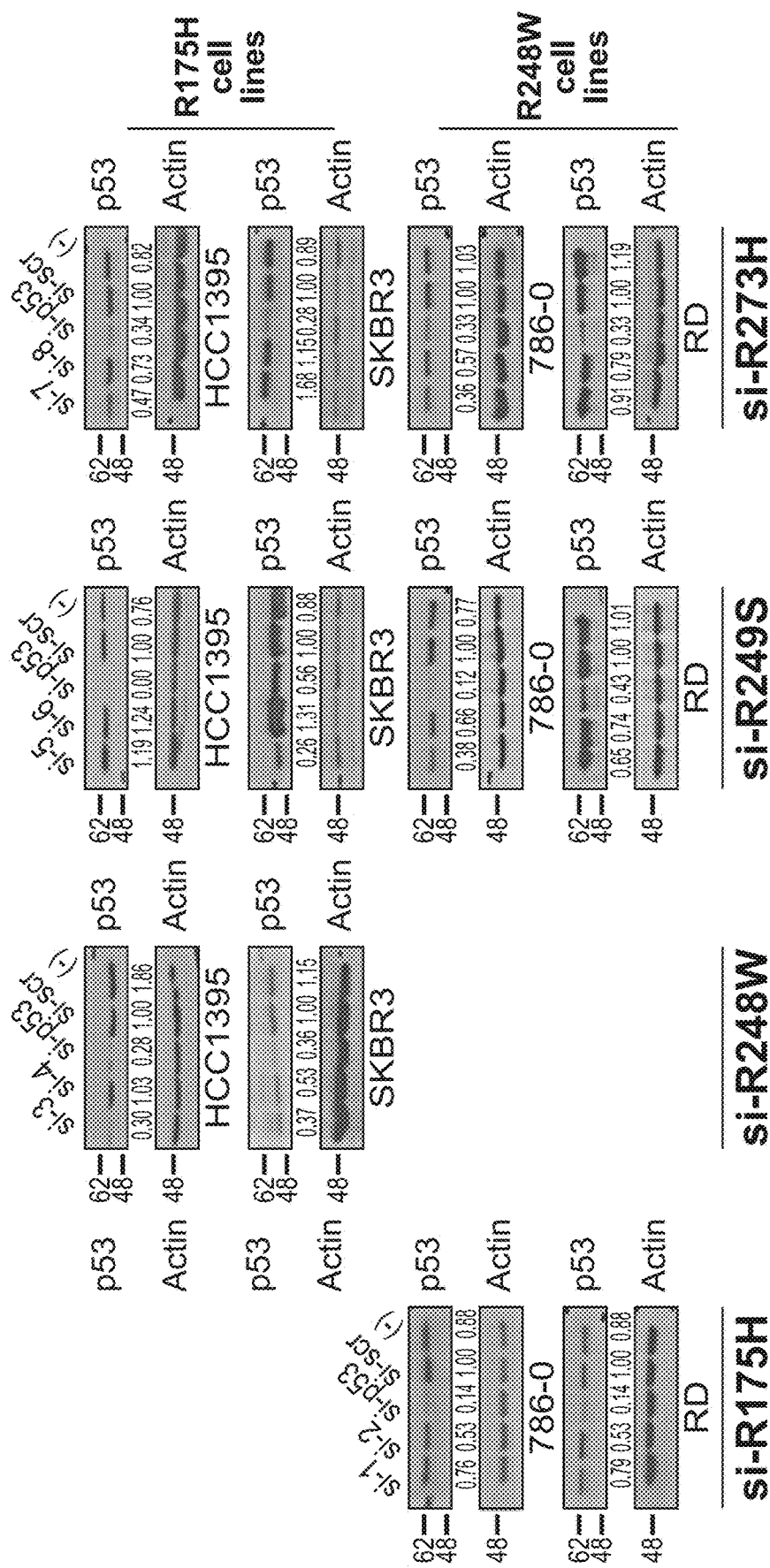
FIG. 8 shows immunoblot data on the silencing efficacy of mutant-specific siRNAs on endogenous mutant p53 expression. siRNAs against R175H (si-1 & 2), R248W (si-3 & 4), R249S (si-5 & 6) and R273H (si-7 & 8), were transfected in the indicated cell lines expressing the indicated p53 mutants, and the silencing efficacy was evaluated by immunoblotting as described. One representative blot of at least two independent experiments is shown. Mutation p53 status of cell lines is highlighted below the blots and described in Table 1. For each sample, the ratio of p53 to Actin band intensity was calculated and normalized to the ratio of si-scr control. Values represent normalized fold change
Figure 8:
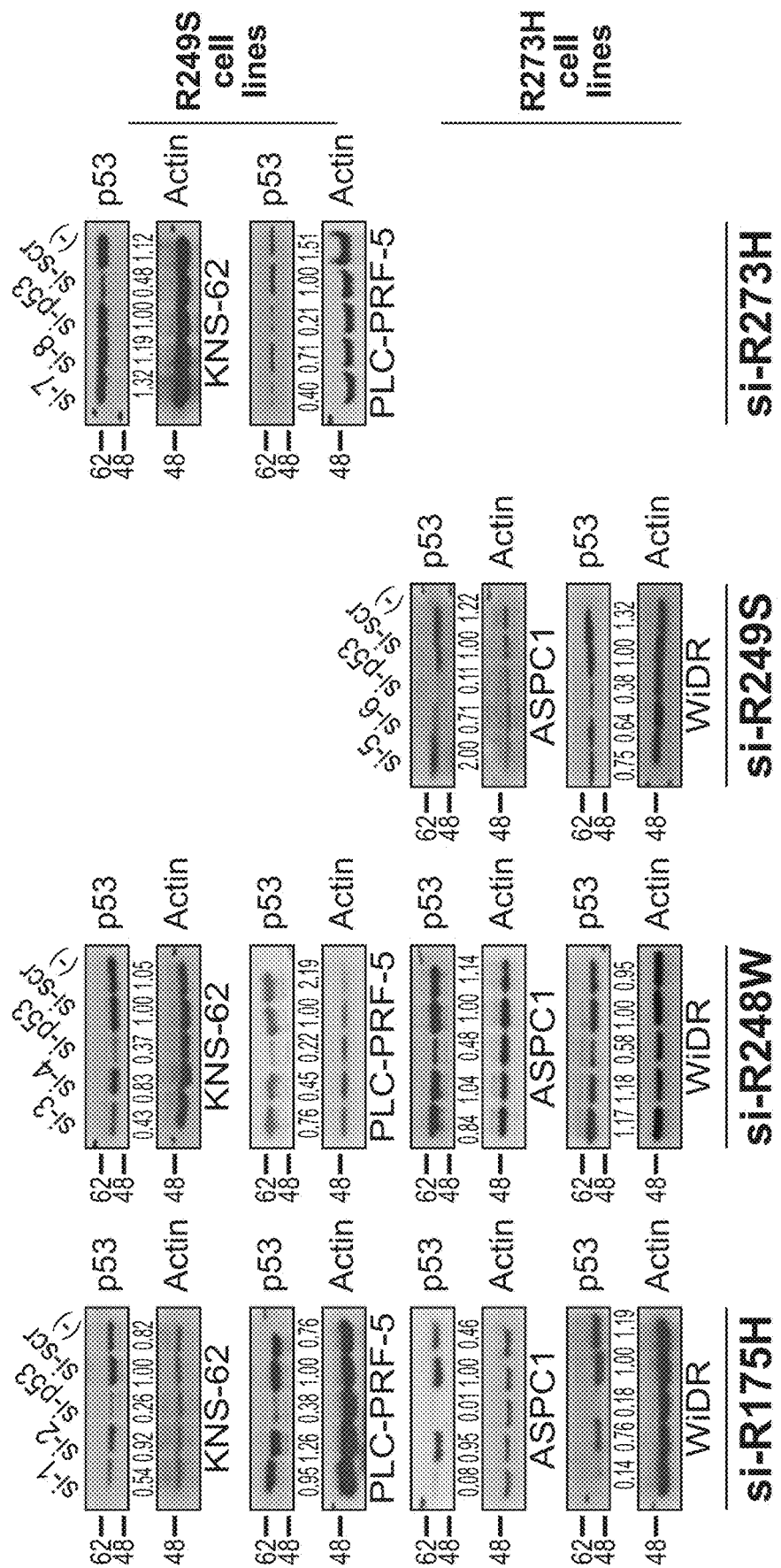

The efficacy and specificity of the selected siRNAs were evaluated on a panel of 17 different cancer cell lines that express either WT or the various mutant p53 (Table 1). Similar to the H1299 isogenic cell lines, these cells were transfected with the specific siRNAs or the positive control si-p53 which indiscriminately suppresses the expression of both WT and mutant p53 (FIG. 2A-D). As noted earlier with the H1299-isogenic cell settings, the si-2 was able to specifically down-regulate the expression of the R175H mutant in cells expressing this mutant (i.e. HCC1395, SKBR3 and AU565), without having an impact on the expression of WT p53 in three cell lines (i.e. HCT116, A549 and A375) (FIG. 2A). Similarly, si-4, which is specific for the R248W mutant p53, efficiently inhibited p53 expression in COLO-320DM, 786-O and RD cells expressing the R248W mutant (FIG. 2B), with no appreciable impact on WT p53 expression in the other cell lines. Similar results were obtained with si-6 which is selective for the R249S mutant (in BT549, KNS-62 and PLC-PRFS cells), and si-8 which is specific for R273H in R273H-expressing ASPC1, H1975 and WIDR cells (FIGS. 2C and D). The other siRNAs against the specific mutants, si-1, si-3, si-5 and si-7, were also specific for the intended mutants, occasionally displaying slight effects on WT p53. Therefore, the specificity of the each of the mutant p53-specific siRNAs was also evaluated on various other mutant p53-expressing cells. As shown in FIG. 8, si-2, si-4, si-6 and si-8 were highly specific and did not affect the expression of the other mutant p53 in all cell lines tested. However, and as noted earlier on the H1299-isogenic cell system, si-1, si-3, si-5 and si-7 had occasional impact on other mutants in some cell lines. It is noteworthy that si-3 against R248W is similar to the siRNA published to target this specific mutation (Martinez, L. A., Naguibneva, I., Lehrmann, H., Vervisch, A., Tchěnio, T., Lozano, G., and Harel-Bellan, A. (2002). Synthetic small inhibiting RNAs: efficient tools to inactivate oncogenic mutations and restore p53 pathways. PNAS; 99; 14849-14854). However, extensive analysis indicates that while the siRNA as published in Martinez et al. indeed targets R248W, it also has some non-specific activity against WT and the R175H mutant in some cell lines. This demonstrates that very subtle changes in the sequences of the siRNA significantly affects the specificity and makes a marked difference in specificity between different sequences, and highlights that one cannot intuitively predict the effects of the various sequences. Collectively, these results show that it is possible to generate siRNAs reproducibly that are highly specific and selective for single nucleotide changes, with extensive screening. Based on these analyses, si-2 (for R175H mutant); si-4 (for R248W mutant); si-5 and si-6 for (R249S mutant) and si-8 (for R273H mutant) were shortlisted for further in-depth characterization. Thus, in one example, the nucleic acid sequence disclosed herein comprises one of the sequences of SEQ ID NO. 9, SEQ ID NO. 13, SEQ ID NO. 16, SEQ ID NO. 17, or SEQ ID NO. 21.

Figure 3:
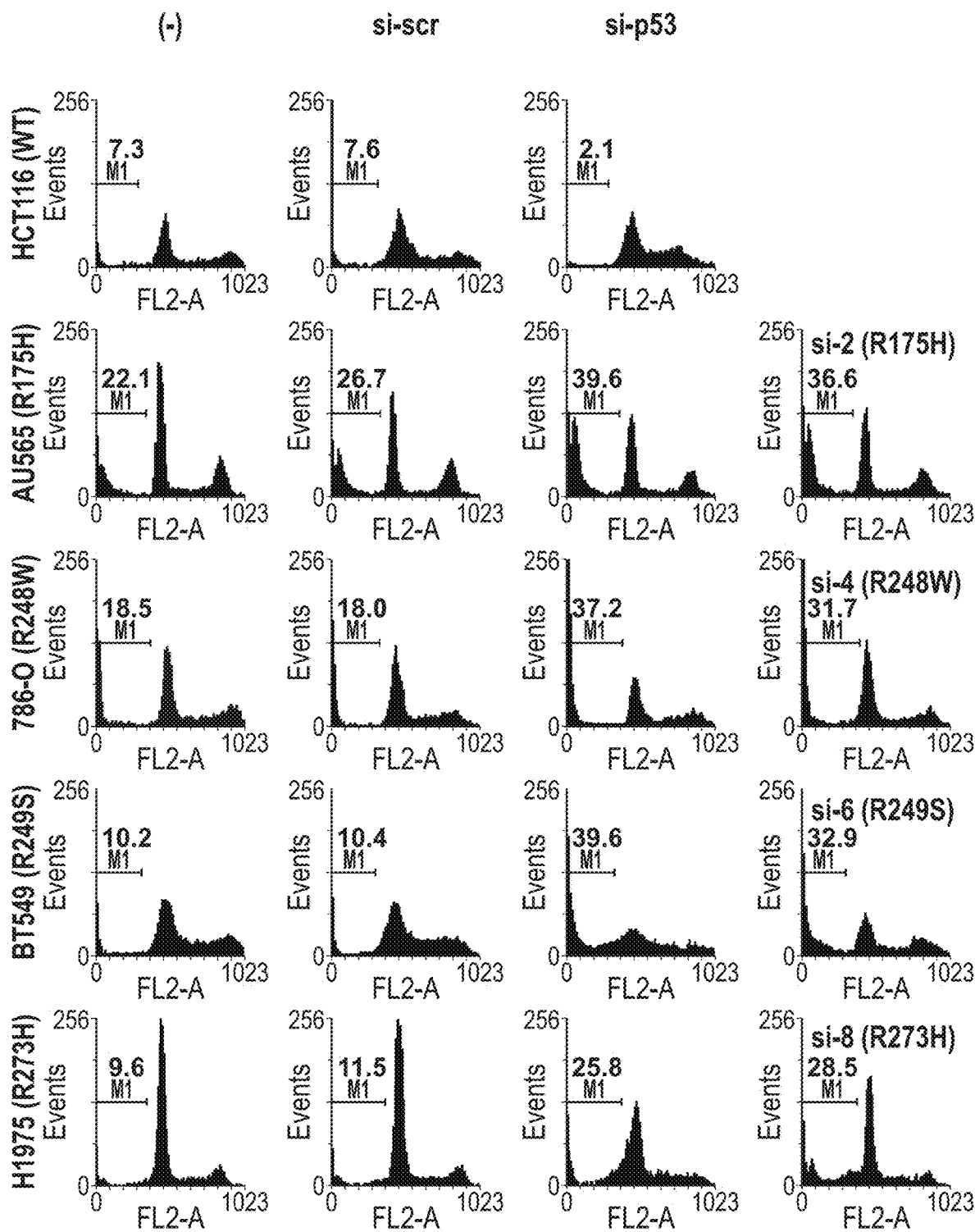
FIG. 3 presents flow cytometry graphs showing that allele-specific silencing of mutant p53 expression leads to cell death. Flow cytometric analysis of the sub-G1 DNA content (indicative of apoptosis) in cells were quantified 72 hours post-transfection of the indicated siRNAs in the indicated cell lines. Representative histograms are shown from one experiment out of at least three independent repeats. % sub-G1 cells are indicated in the histogram (M1).
Figure 9:
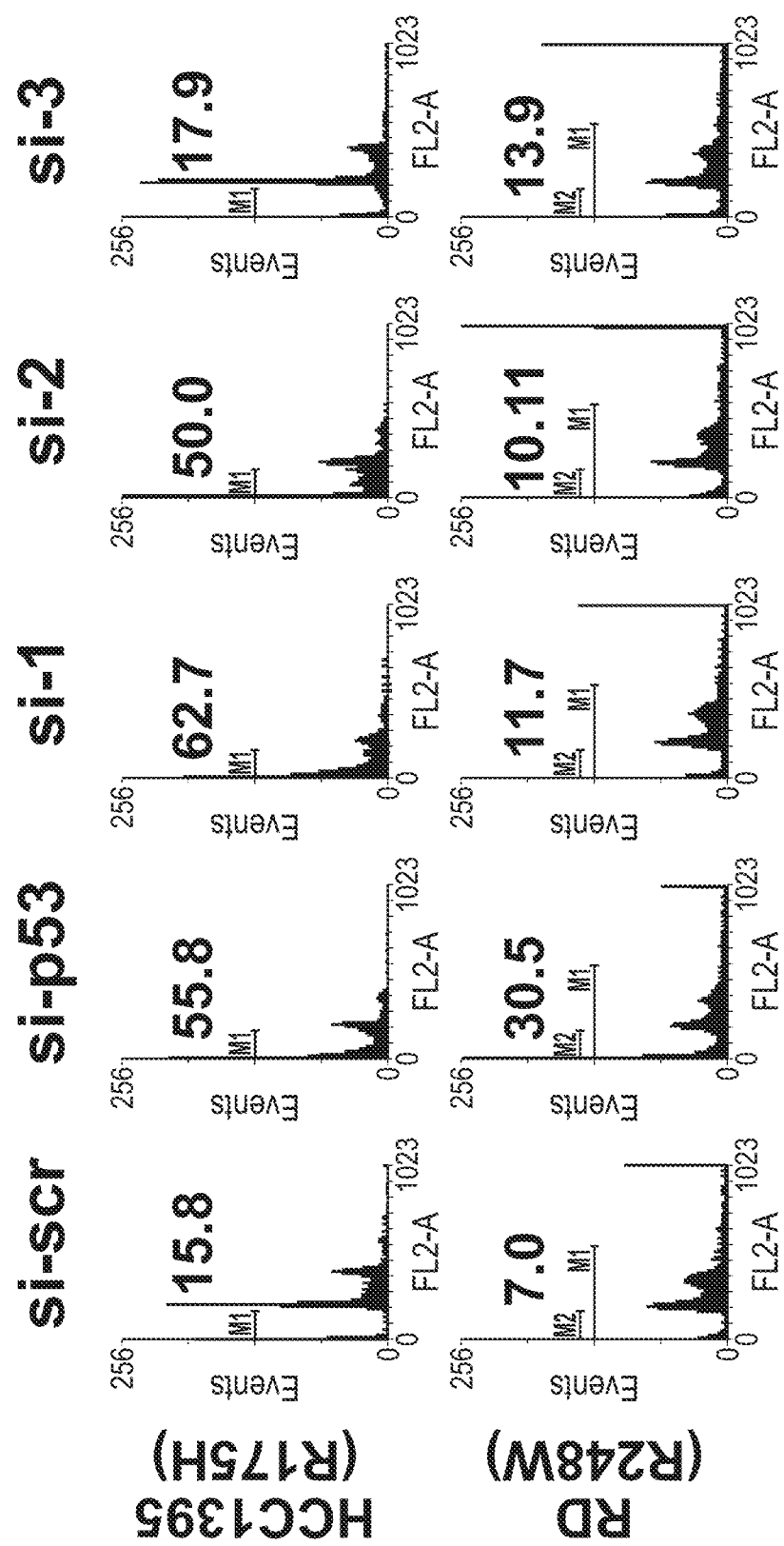
FIG. 9 shows further flow cytometric results of the evaluation of effects of mutant-specific siRNAs on cell death in cell lines expressing various mutant p53. Flow cytometric analysis of the sub-G1 DNA content (indicative of apoptosis) in cells were quantified 72 hours post-transfection of the indicated siRNAs (as described herein) in the indicated cell lines. Representative histograms are shown. % sub-G1 cells are indicted in the histogram (M1 for the HCC1395 cells and M2 for all the other cell lines).
Figure 9:
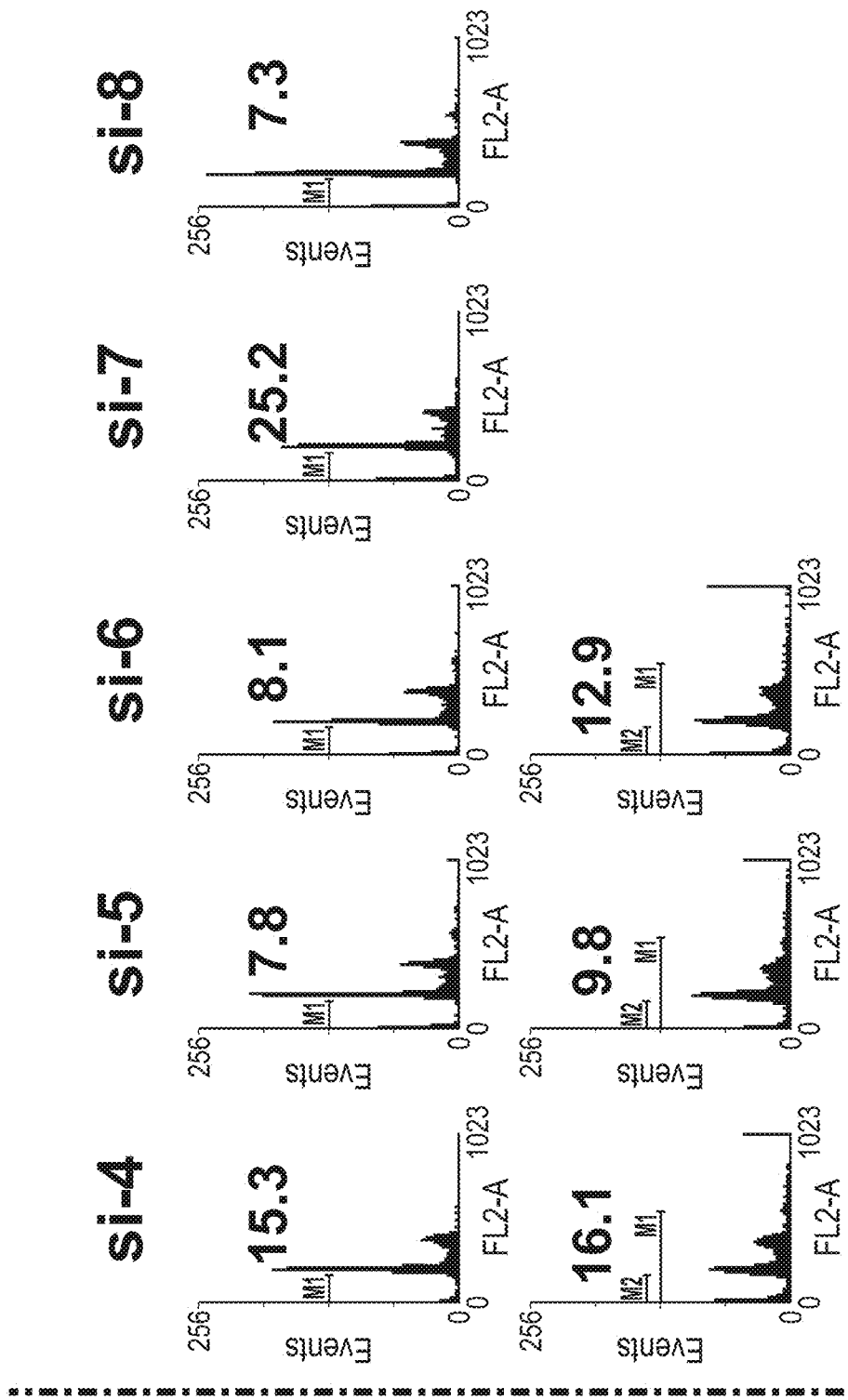
Figure 9:
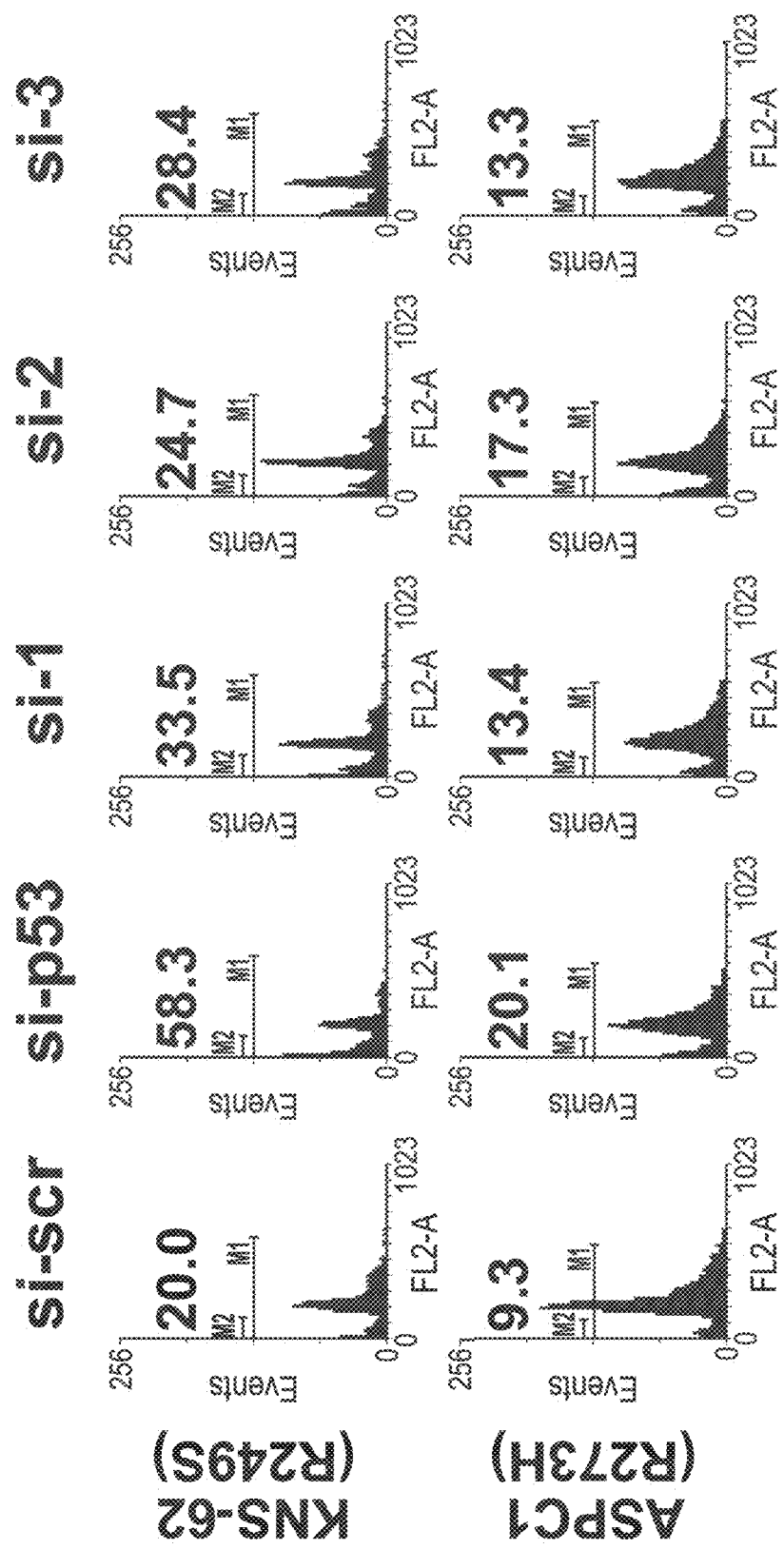
Figure 9:
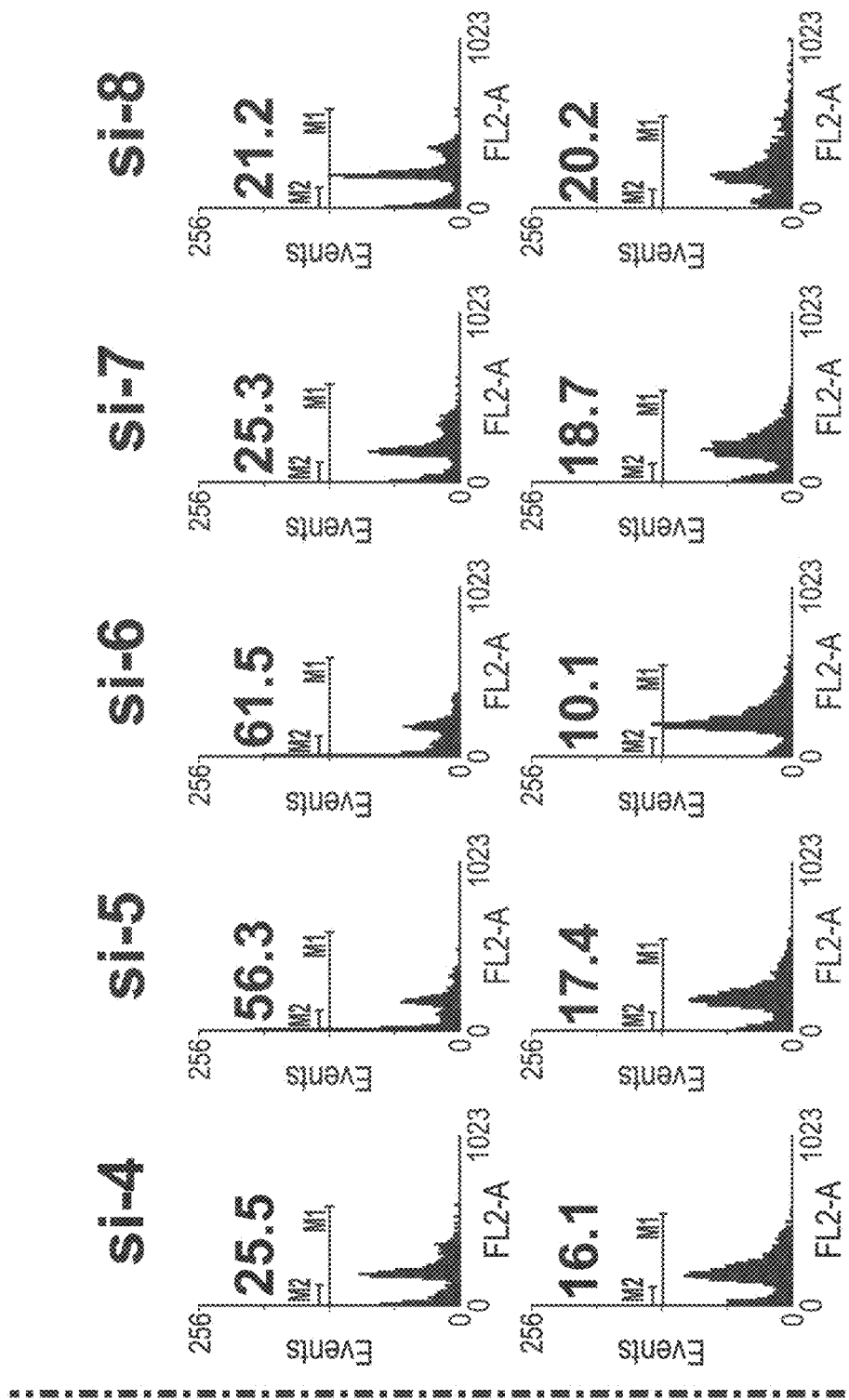
Figure 10:
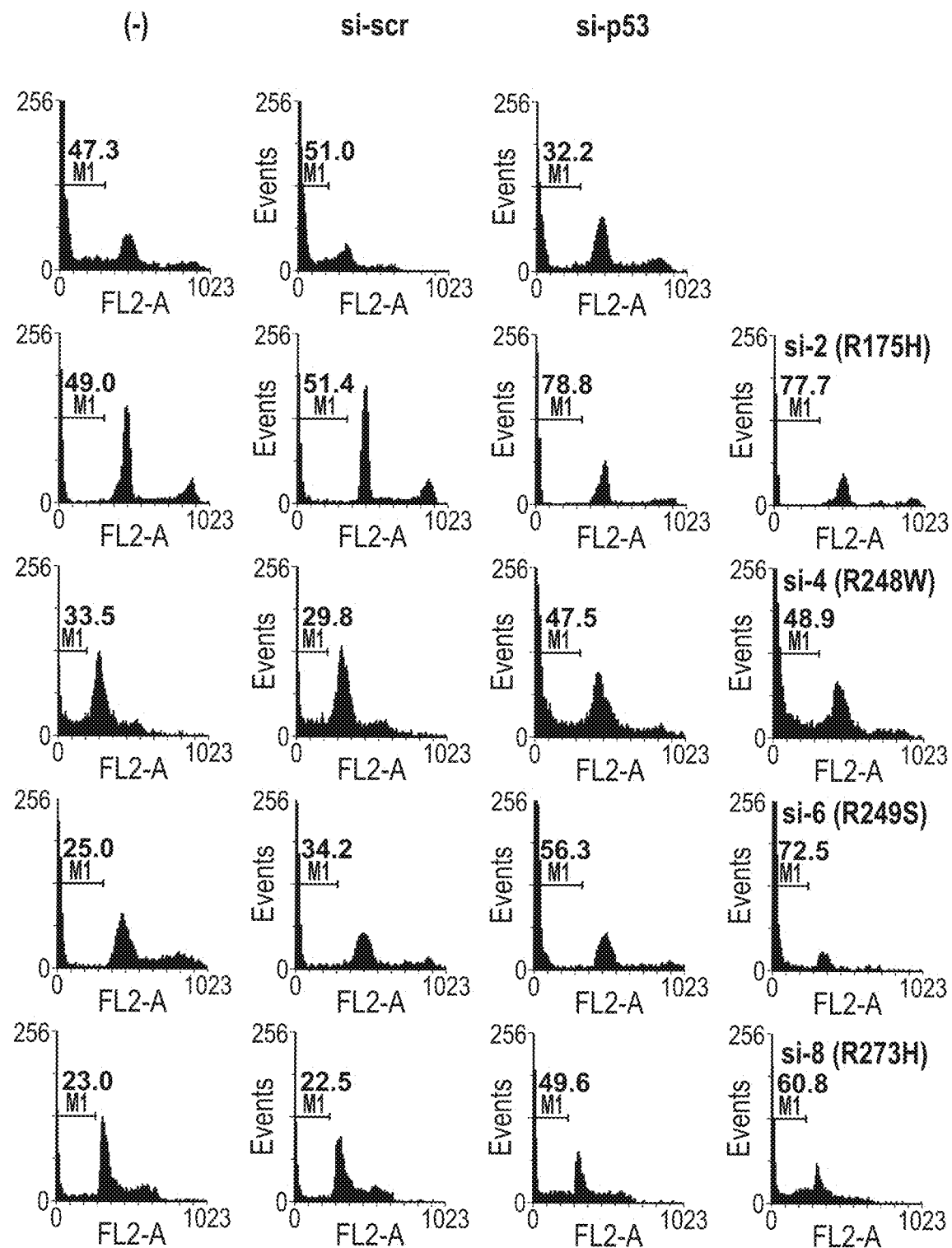
FIG. 10 shows further flow cytometric data pertaining to cisplatin treatment potentiates cell death upon mutant p53 silencing. Flow cytometric analysis of the sub-G1 DNA content (indicative of apoptosis) was performed in HCT116, AU565, 786-0, BT549 and H1975 cells. These cells were transfected with the indicated siRNAs and treated with cisplatin 48 hours post-transfection, for another 24 hours. Representative histograms are shown from one experiment out of at least three independent repeats. Percentage (%) of sub-G1 cells are indicted in the histogram (M1).

Allele-Specific Knock-Down of Mutant p53 Expression Promotes Apoptosis and Induces p53-Target Gene Expression As tumour cells expressing mutant p53 have been shown to be addicted to its presence for survival, it was first evaluated if the mutation-specific siRNAs will be able to alleviate this phenomenon and induce cell death in the respective mutant-expressing cancer cell lines. Transfection of the specific siRNAs in the respective mutant p53-expressing cell lines universally led to increased apoptosis, as determined by the percentage of sub-G1 population (FIG. 3). While untransfected and scrambled siRNA transfected cells gave basal death, transfection of either the pan-p53 siRNA, or the specific mutant p53 siRNAs led to increased cell death in the cell lines expressing the respective mutant p53 (% sub-G1 population in si-scr vs. si-p53 vs. si-mutant p53→AU565: 26.7 vs. 39.6 vs. 36.6; 786-O: 18.0 vs. 37.2 vs. 31.7; BT549: 10.4 vs. 39.6 vs. 32.9; H1975: 11.5 vs. 25.8 vs. 28.5) (FIG. 3A). Importantly, si-p53 reduced cell death in WT p53-expressing HCT116 cells (si-scr vs. si-p53: 7.6 vs. 2.1), confirming that silencing of mutant p53 expression by a generic p53 siRNA or the mutation-specific siRNA leads to enhanced cell death only in mutant p53-expressing cancer cell lines. Cross evaluation of the siRNAs on cancer cells expressing other p53 mutants also confirmed their specificity in silencing only the intended mutants, but not others (FIG. 9). Concurrent treatment of these cells with the chemotherapeutic agent cisplatin (CDDP) potentiated the cell death induced by the mutation-specific siRNA only in mutant p53-expressing cancer cell lines, but not in WT p53-expressing HCT116 cells (FIG. 10). Together, these data indicate that cell death induced by silencing mutant p53 further synergizes with cytotoxic drug treatment.

Figure 4A:
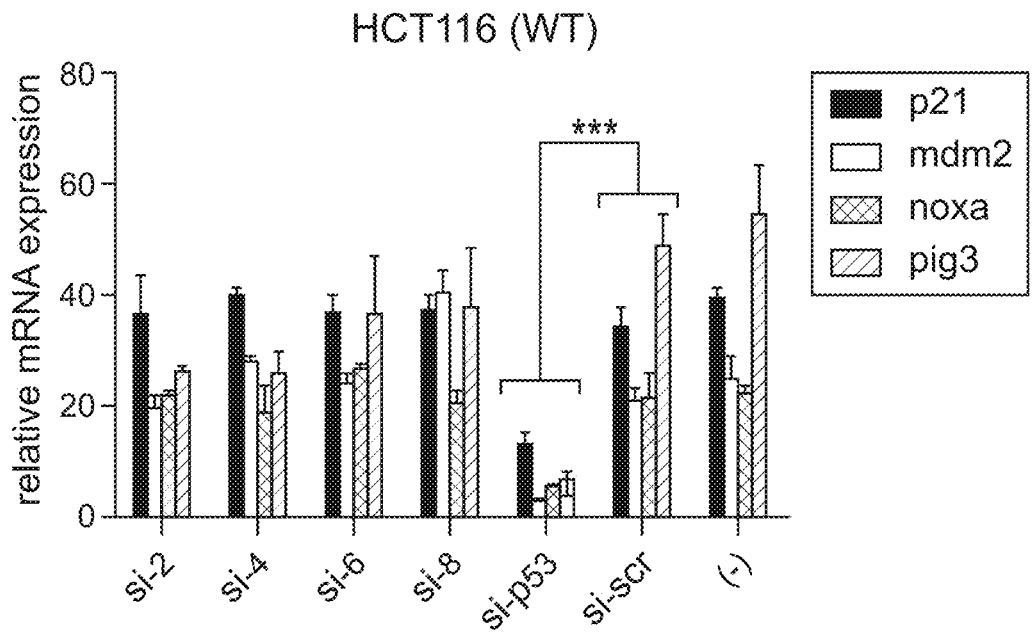
FIG. 4 provides histograms illustrating that mutant p53-specific silencing leads to activation of p53 canonical target genes in mutant p53 expressing cells. (A) shows HCT116 cells expressing WT p53 were transiently transfected with siRNAs targeting the four hot-spot p53 mutants or the control scrambled siRNA or p53-specific siRNA. Cells were collected 72 hours later for mRNA analysis of the indicated target genes by quantitative real time PCR. (B) shows AU565, 786-O, BT549 and ASPC1 cell lines expressing the indicated p53 mutants were similarly transfected and analysed. Relative expression of the target genes is shown. All experiments were normalized to GAPDH and carried out in triplicates. Bar diagrams show the mean±standard deviation of three independent experiments. * indicates p value of <0.05, <0.005; and *<0.001, with n=3 samples per group.
Figure 4B:
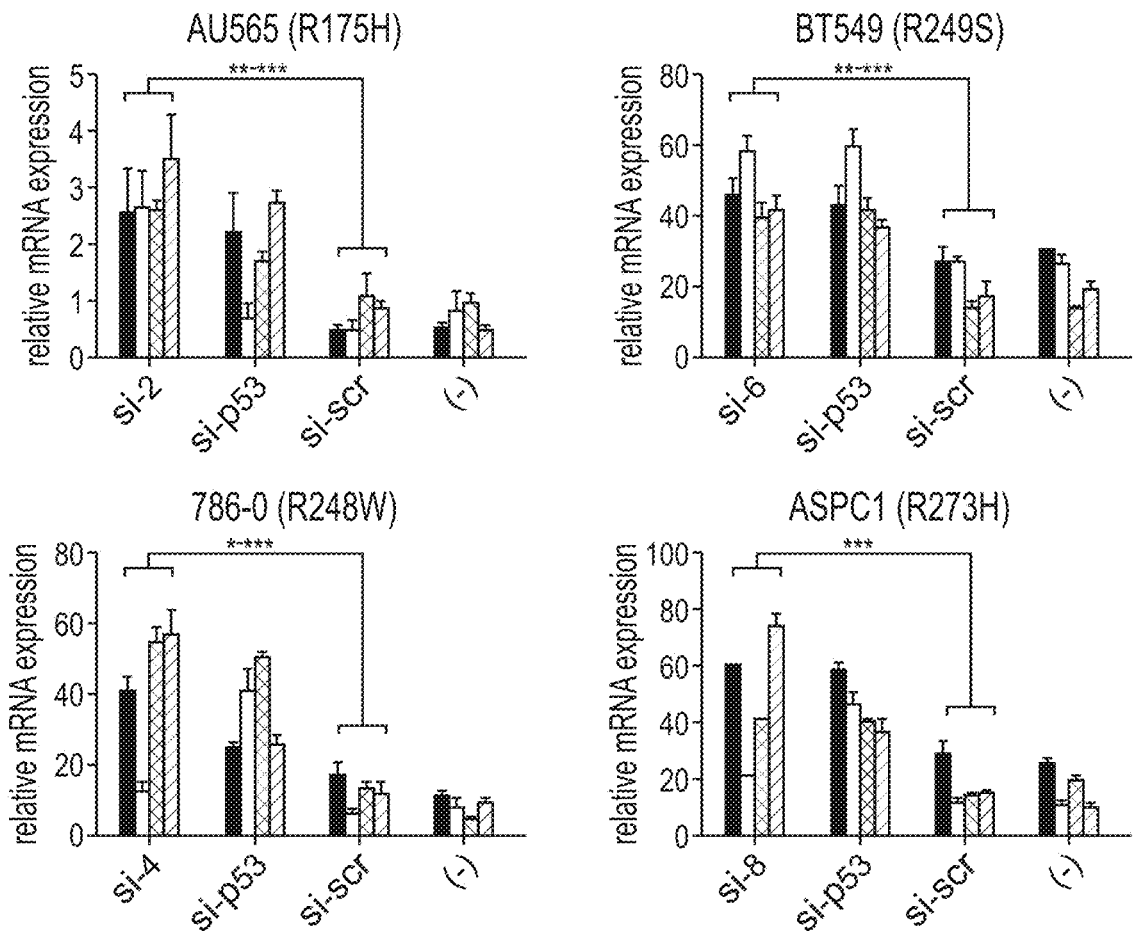
Figure 11:
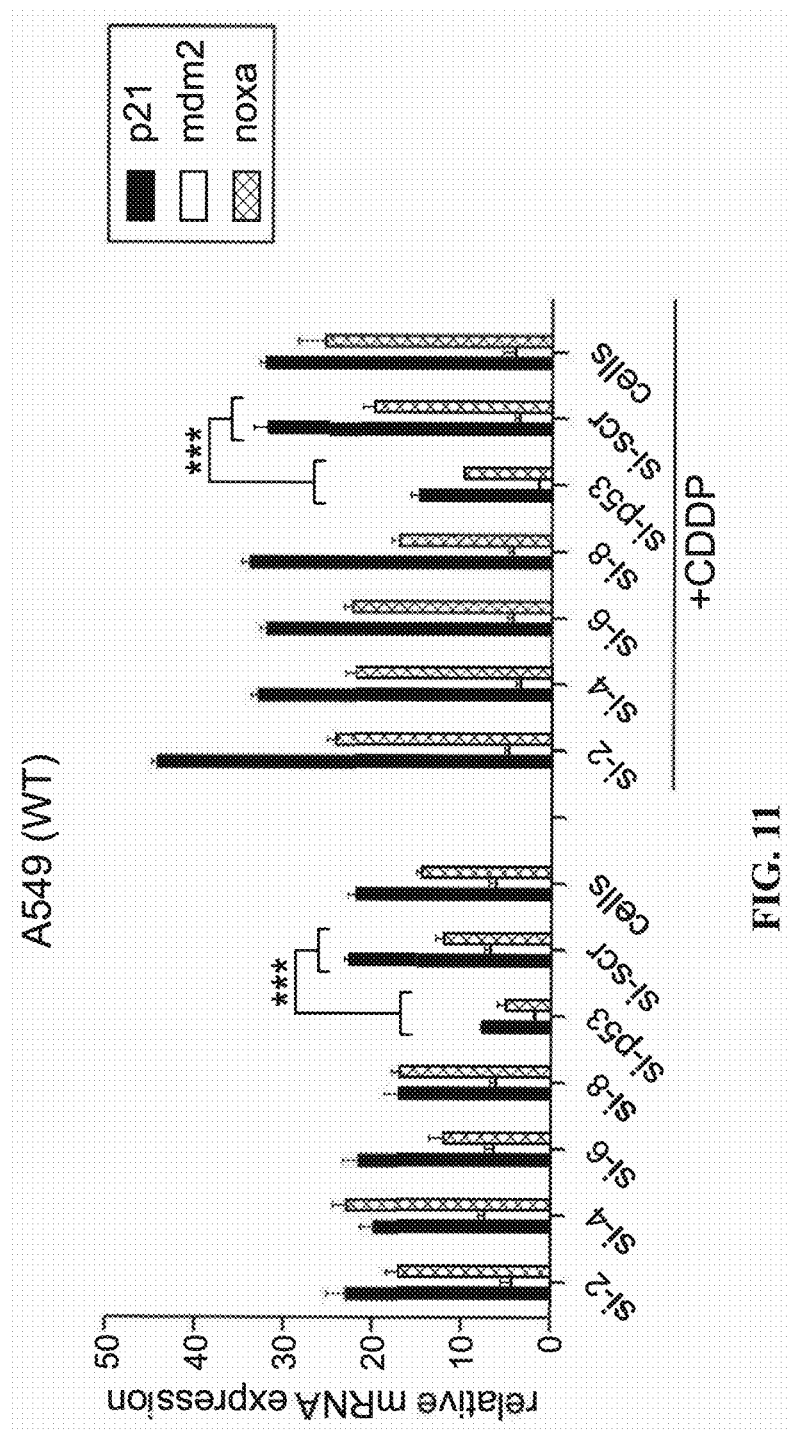
FIG. 11 shows histograms showing real-time PCR data on the depletion of mutant allele expression leads to activation of p53 transcriptional targets. qRT-PCR for p53 target genes such as p21, Mdm2 and Noxa was performed on the indicated cells lines that were transfected with the various siRNA, and subsequently treated without or with cisplatin (CDDP), as described herein. All experiments were normalized to GAPDH and carried out in triplicates, and relative expression of the target genes is shown. Bar diagrams show the mean±standard deviation of three independent experiments. * indicates p value of <0.05; <0.005; and *<0.001, with n=3 samples per group.
Figure 11:
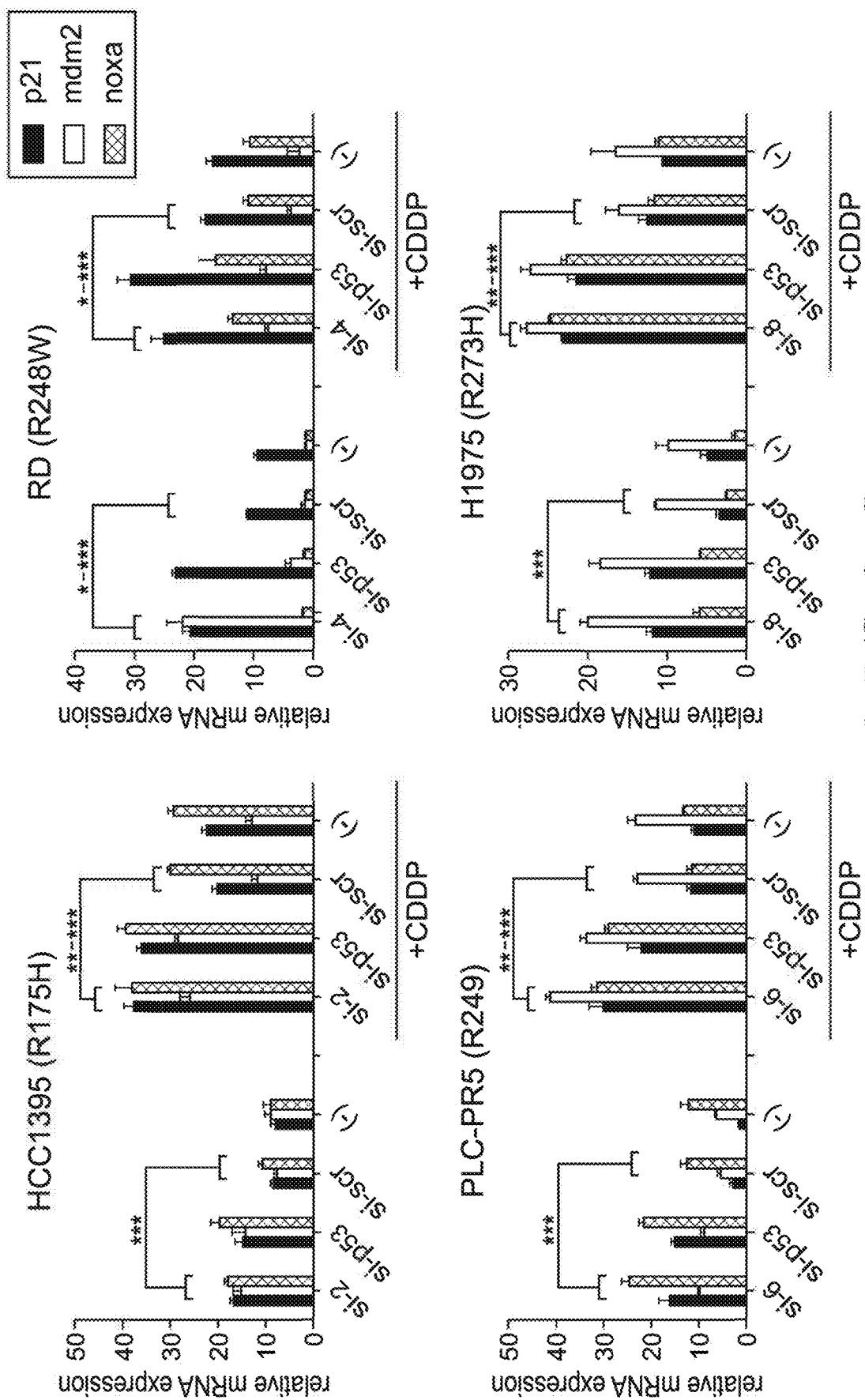

It had been previously shown that silencing of mutant p53 in mutant p53-expressing cell lines led to induction of the expression of canonical p53-target genes, concomitant to the attenuation of the addiction to mutant p53 for survival. It was therefore evaluated if this phenomenon also occurs in the context of mutant p53-specific siRNA treatment. To this end, quantitative RT-PCR (qPCR) was performed for several p53 target genes such as p21, Mdm2, Noxa and Pig3 (FIG. 4). Expression of mRNAs for all the tested p53 target genes was significantly down-regulated following p53 down-regulation in WT p53 expressing HCT116 cells, as expected, but were minimally altered by the mutant-specific siRNAs in these cells (FIG. 4A). By contrast, transfection of the mutant-specific siRNAs (i.e. si-2, si-4, si-6 and si-8) or the general p53 siRNA in mutant p53-expressing cells lines led to a significant up-regulation of almost all the target genes tested (FIG. 4B). Similar results were obtained using the mutant-specific siRNAs on a different set of cell lines expressing the corresponding mutants (FIG. 11). Moreover, as noted with the cell viability experiments, concurrent treatment of cells with mutant p53-specific siRNAs with CDDP led to enhanced induction of p53 target genes, highlighting synergy. Furthermore, inhibition of p53 expression in WT p53 expressing cells treated with CDDP led to the expected reduction in target gene expression, indicating the specificity of the effect of the mutant p53 siRNAs on mutant p53-expressing cell lines.

Figures 5A, 5B:
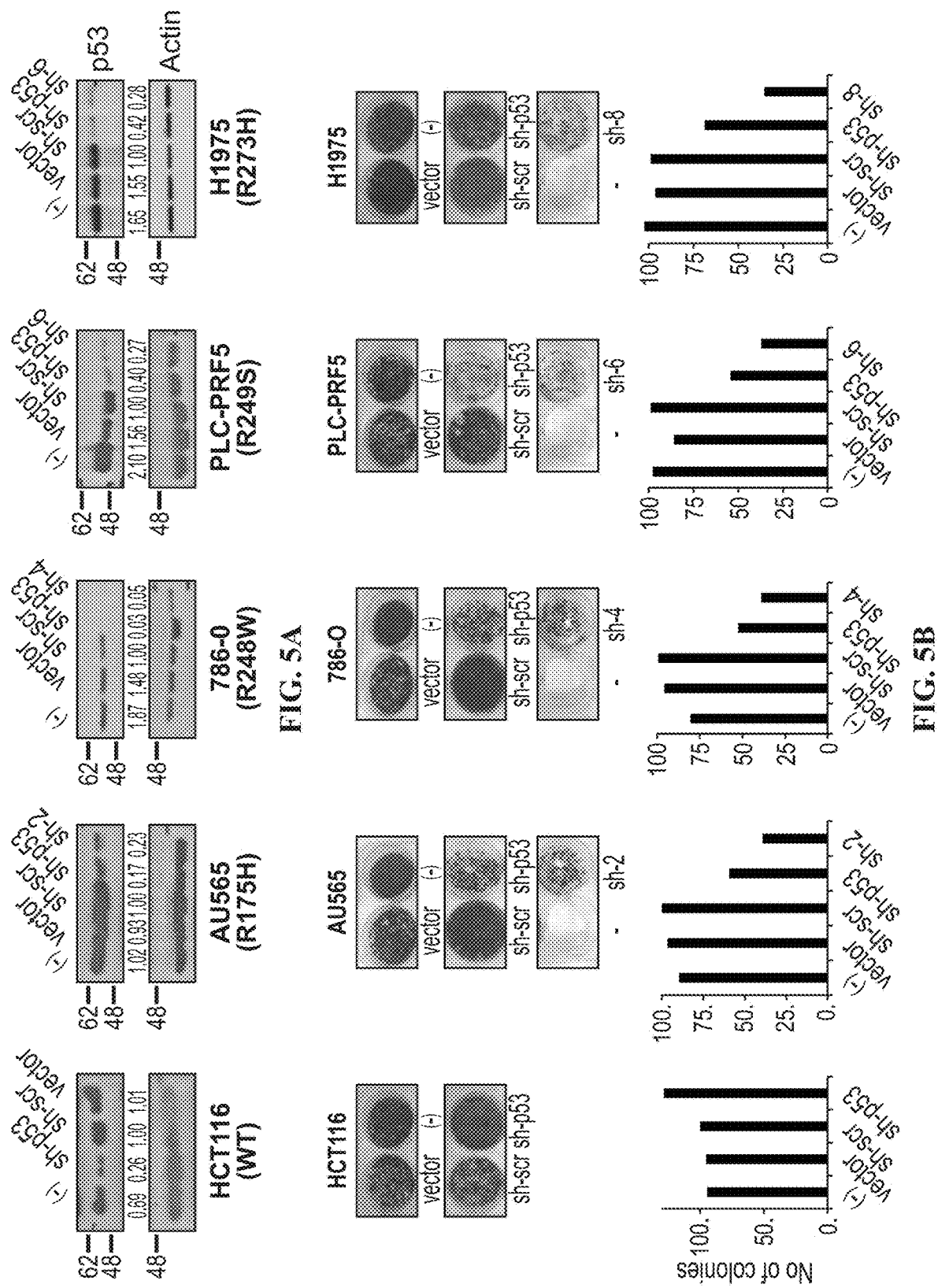
FIG. 5 shows data depicting the growth suppressive effect of mutant p53-specific shRNAs. (A) shows immunoblots of the indicated cell lines, which were transfected with shRNA expressing pan-p53 (sh-p53) shRNA, scrambled control, the respective mutation-specific shRNAs or empty vector (-). The cells were harvested 48 hours later and analysed for efficiency of silencing by immunoblotting. (B) shows images of parallel cultures of cellular colonies which were stained with crystal violet solution 5 days post shRNA transfection and visualized. Representative images are shown from one experiment, out of at least three independent experiments (b), and quantified.
Figure 12A:
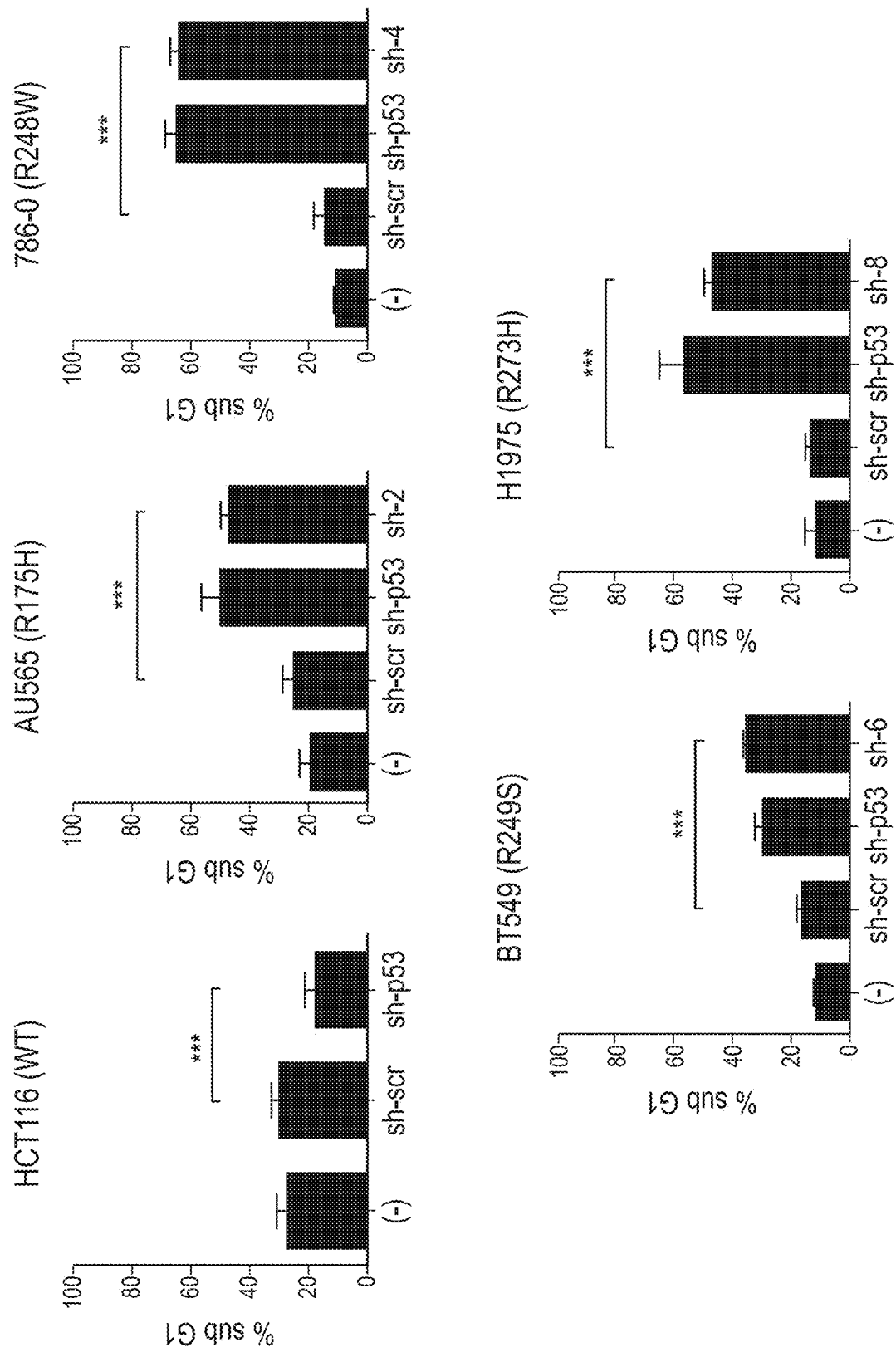
FIG. 12 shows data indicating that allele-specific mutant p53-specific shRNAs induces cell death and are effective on various mutant nucleotides at the same residues. (A) shows histograms with the results of flow cytometric analysis of the sub-G1 DNA content (indicative of apoptosis) in the indicated cell lines, which were transfected with the indicated shRNAs was performed 72 hours post-transfection. Representative histograms show the mean±standard deviation of three independent experiments. (B) to (D) show data from HEC1A cells expressing the R248Q mutant p53, which were transfected with the indicated shRNAs and analysed for mutant p53 expression (B), colony growth (C) and apoptosis in the absence or presence of CDDP treatment (D). Representative results from one of three independent experiments are shown. Bar diagrams show the mean±standard deviation of three independent experiments. sh-4 is the R248 specific siRNA

Inhibition of Mutant p53 Expression Using Mutant p53-Specific shRNA Expression Vectors To evaluate the long-term effects of the mutant p53-specific silencing, short-hairpin RNAs that express the mutant p53 specific sequences from the si-2, si-4, si-6 and si-8 siRNAs, as well as the general p53-specific siRNA, were generated using the pSuper vector. Initial tests evaluating their efficacy in silencing the expression of the specific mutant p53 were performed in the respective mutant p53-expressing cells lines, after transient transfection of the plasmids. Immunoblot analyses indicated that the mutant p53-specific shRNAs were equally potent in suppressing the expression of the intended mutant p53 in the respective cell lines, unlike the control scrambled shRNA (FIG. 5A). Based on this, the effects of suppressing mutant p53 expression on long-term colony growth was evaluated, which again confirmed that cellular growth was significantly inhibited by silencing the respective mutant p53 (FIG. 5B). Similar results were obtained in short-term apoptosis assays (FIG. 12A), indicating that shRNA-based mutant p53 silencing is equally effective in promoting cell death of mutant p53 expressing cancer cells.

It was also evaluated whether the mutation-specific shRNAs are capable of silencing various mutants that occur at the same nucleotide position on p53. To test this hypothesis, the HEC-1A cancer cell line which expresses the R248Q mutation was utilised, and transfected the sh-4 which was initially generated against the R248W mutation. As shown in FIG. 12B-D, sh-4 was capable of silencing the expression of the R248Q p53 mutant, which concomitantly led to increased cell death in short and long-term assays. This data suggests that mutation-specific si/shRNA against a particular mutated nucleotide residue is specific for the residue at that position, but does not necessarily discriminate the substituted residues, and hence, in one example, can be widely used for the many mutations found at a particular nucleotide position, especially in the case of mutant p53.

Figure 6A:
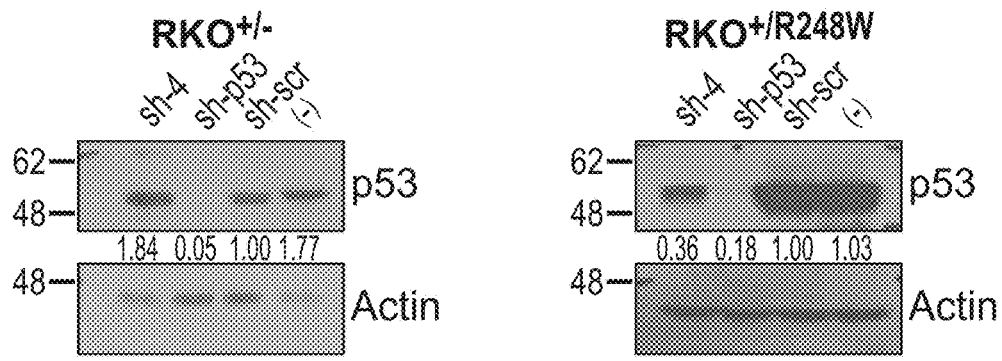
FIG. 6 depicts data showing the relief of dominant-negative effects of mutant p53 by mutant p53-specific silencing. (A) shows immunoblots of RKO$^{+/-}$ and RKO$^{+/248W}$ cells which were transfected with control, pan-p53 (sh-p53) or R248W-specific shRNAs (sh-4), and analysed as described above for efficacy of silencing. Data on colony growth is shown in panel (B), and results of p53 target gene expression analysis are shown in panel (C). Cell death was analysed without (panel D) or with cisplatin (CDDP) treatment (panel E). Percentage (%) of sub-G1 cells are indicated on the histograms (as represented by M1). Representative data are shown from three independent experiments. Bar diagrams show the mean±standard deviation of the three independent experiments.  indicates p value of <0.005; and *<0.001, with n=3 samples per group.
Figure 6B:
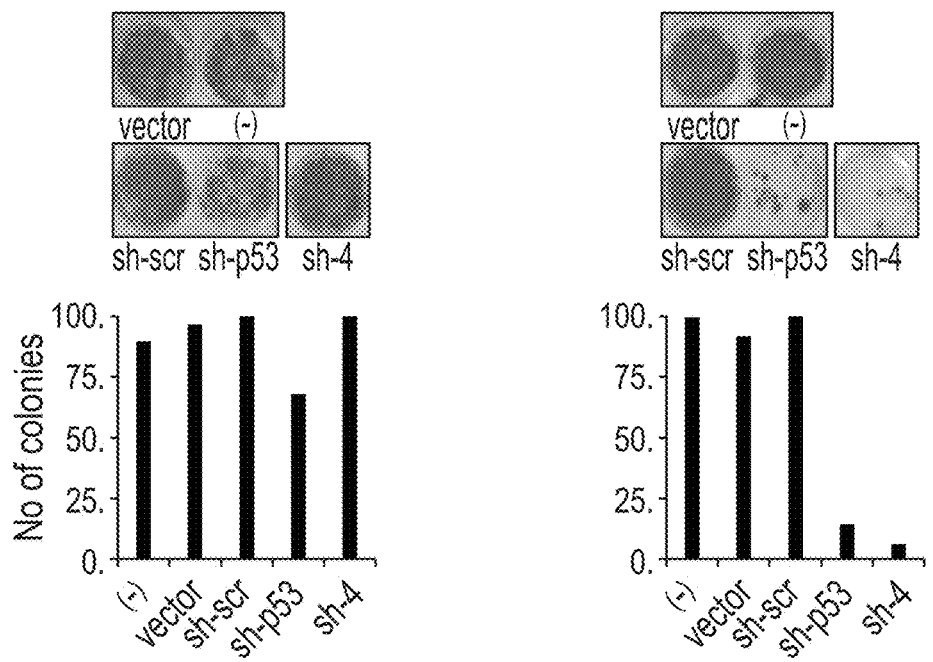
Figure 6C:
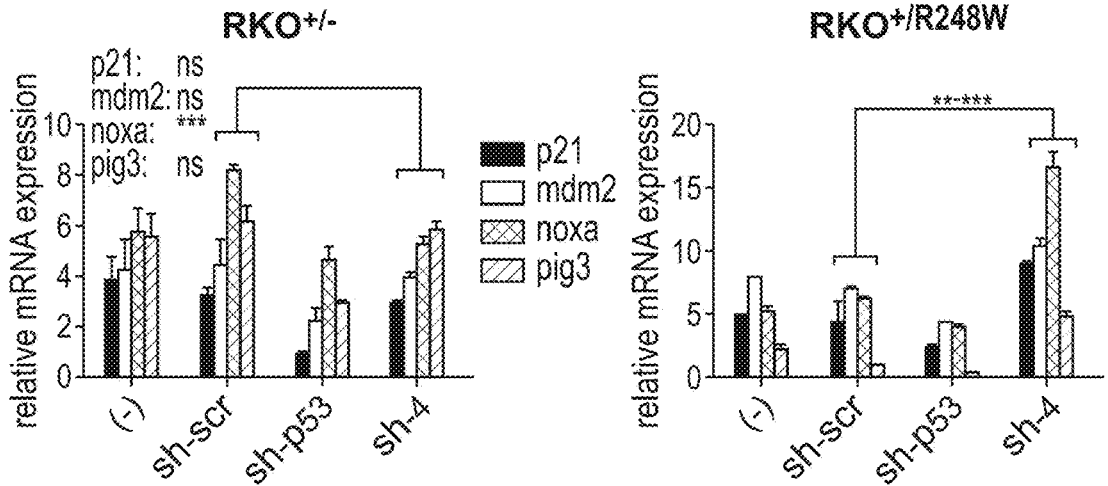
Figure 6D:
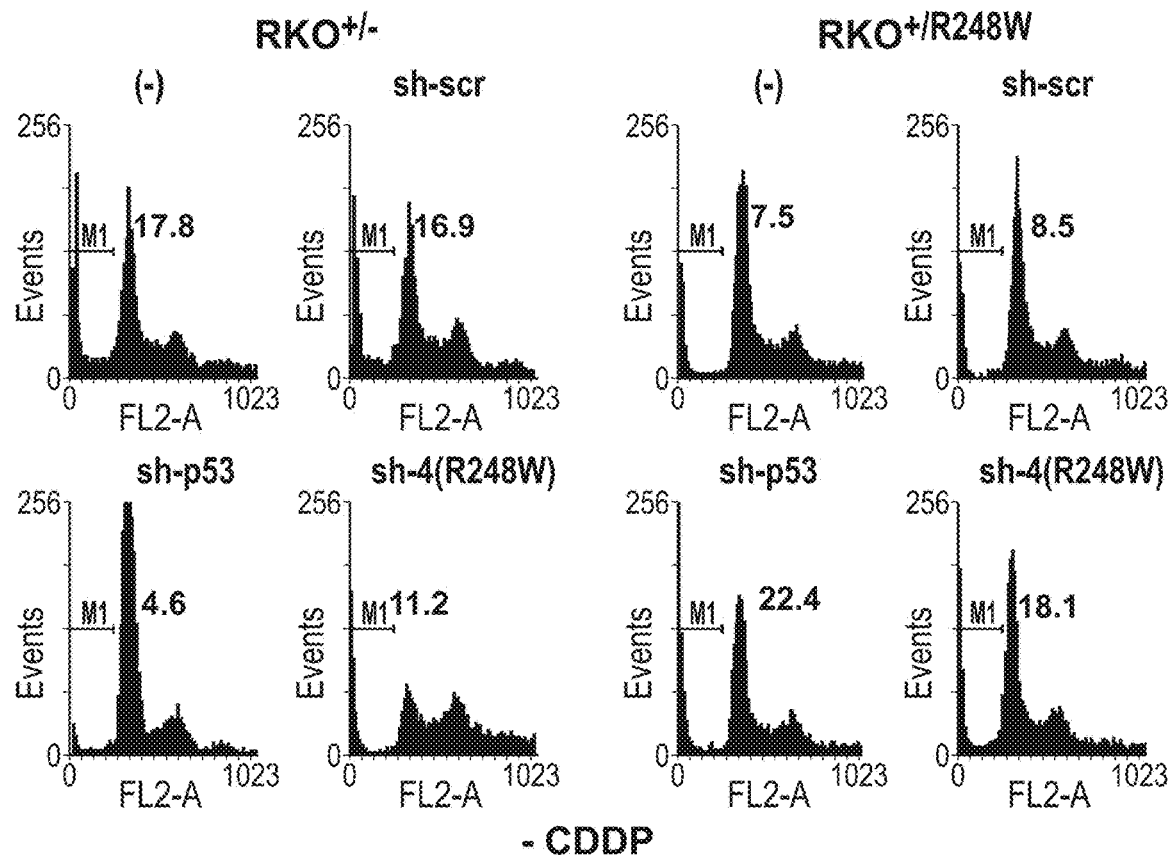
Figure 6E:
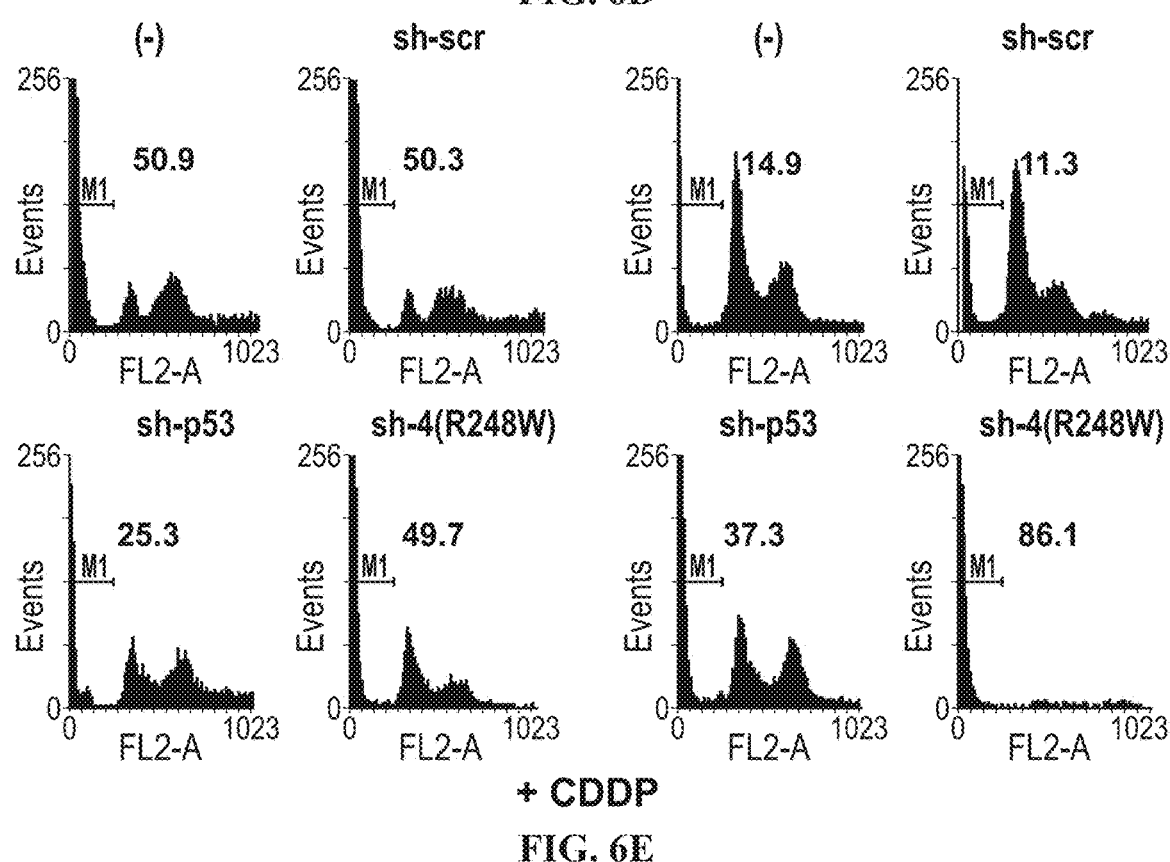
Figure 13A:
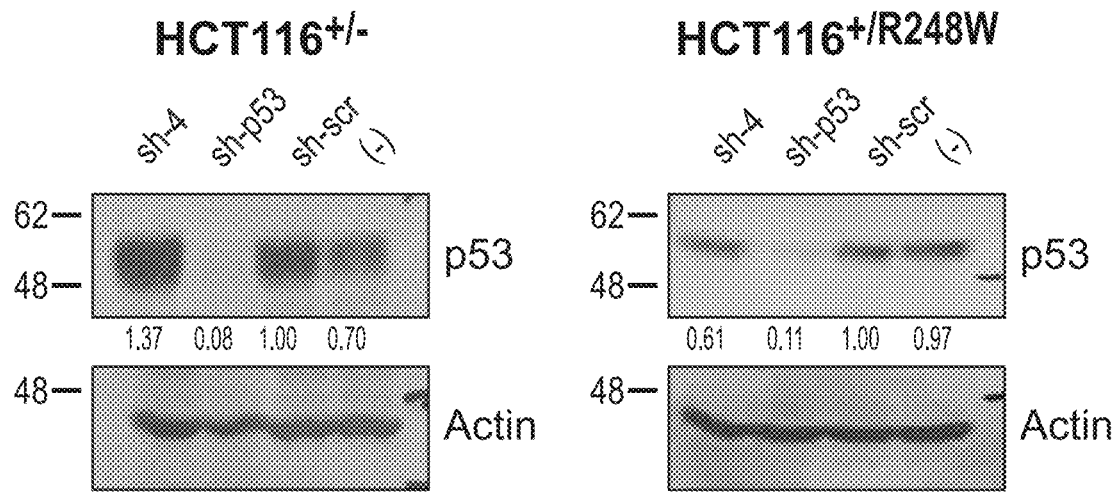
FIG. 13 shows data illustrating the relief of the dominant-negative effects of mutant p53 by mutant p53-specific silencing. HCT116+/− and HCT116+/R248W cells were transfected with control, pan-p53 (sh-p53) or R248W-specific shRNAs (sh-4), and analysed as described for efficacy of silencing (A), colony growth (B), and p53 target gene expression (C). Cell death was analysed without (panel D) or with cisplatin (CDDP) treatment (panel E). Percentage (%) of sub-G1 cells are indicated on the histograms (as represented by M1). Representative data are shown from three independent experiments. Bar diagrams show the mean±standard deviation of the three independent experiments. * indicates p value of <0.05; <0.005; and *<0.001, with n=3 samples per group.
Figure 13B:
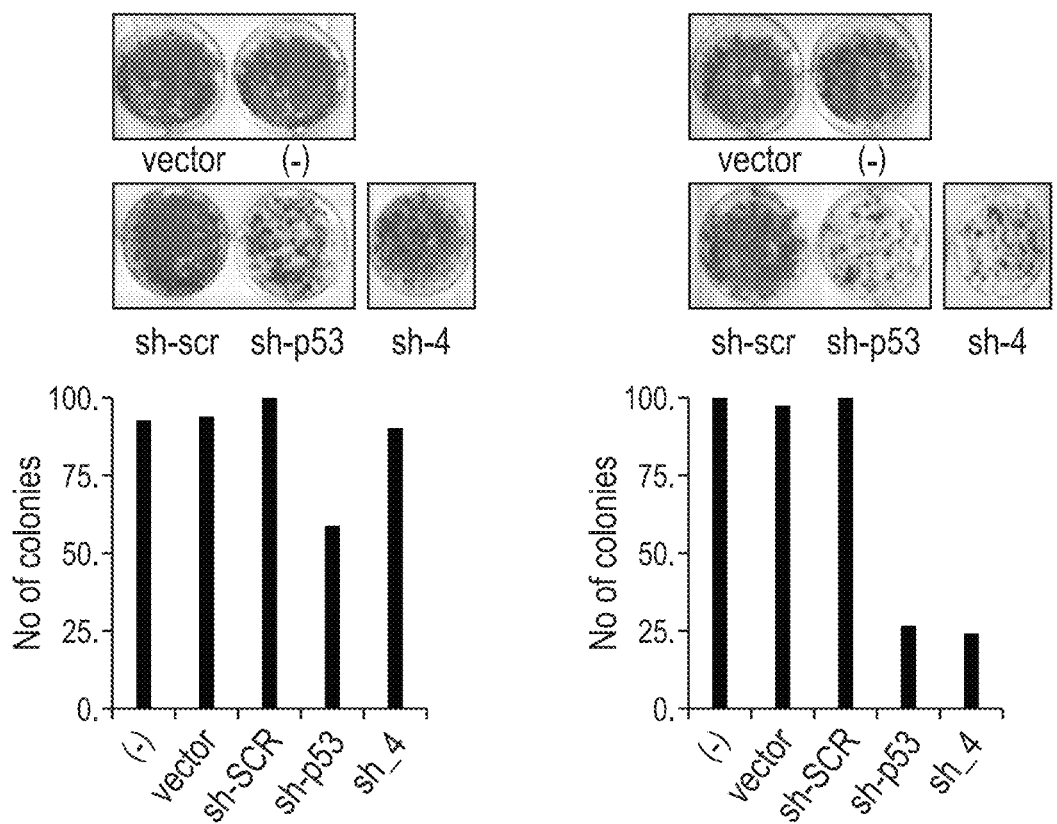
Figure 13C:
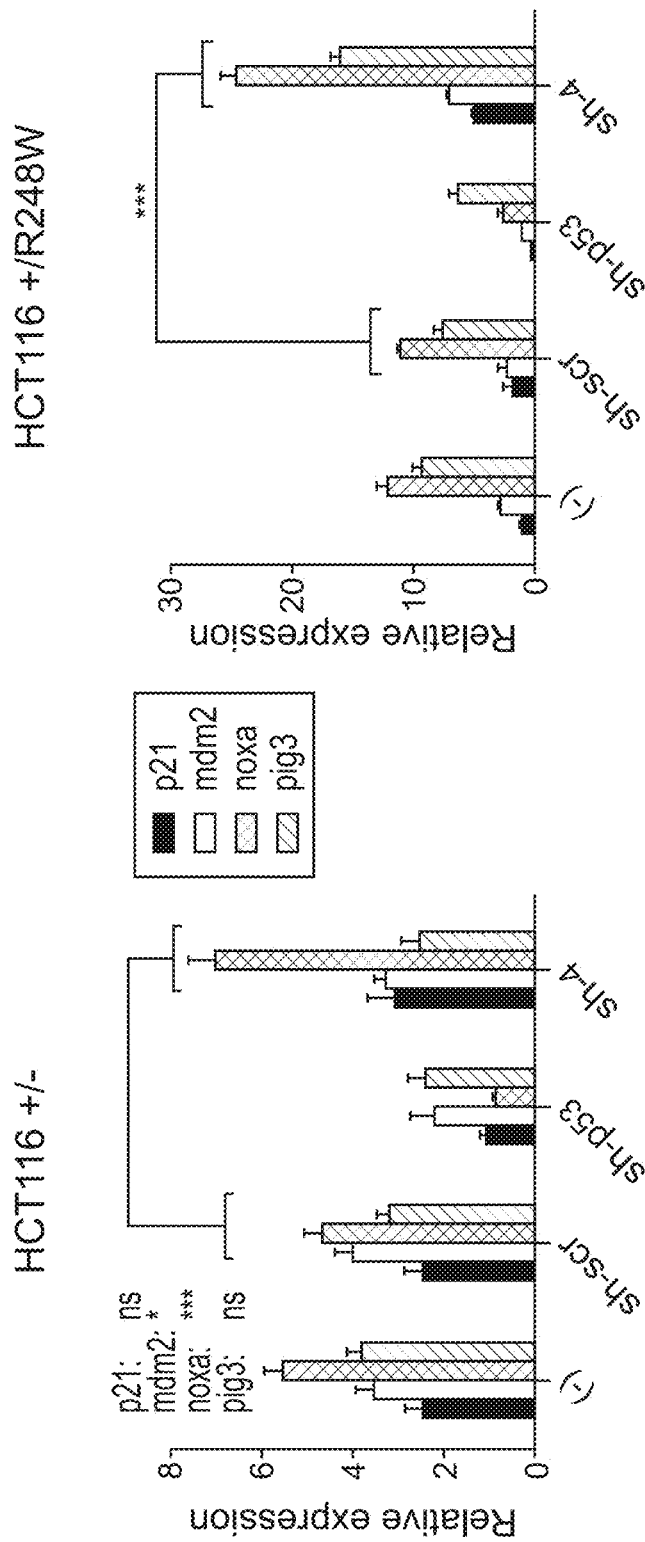
Figure 13D:
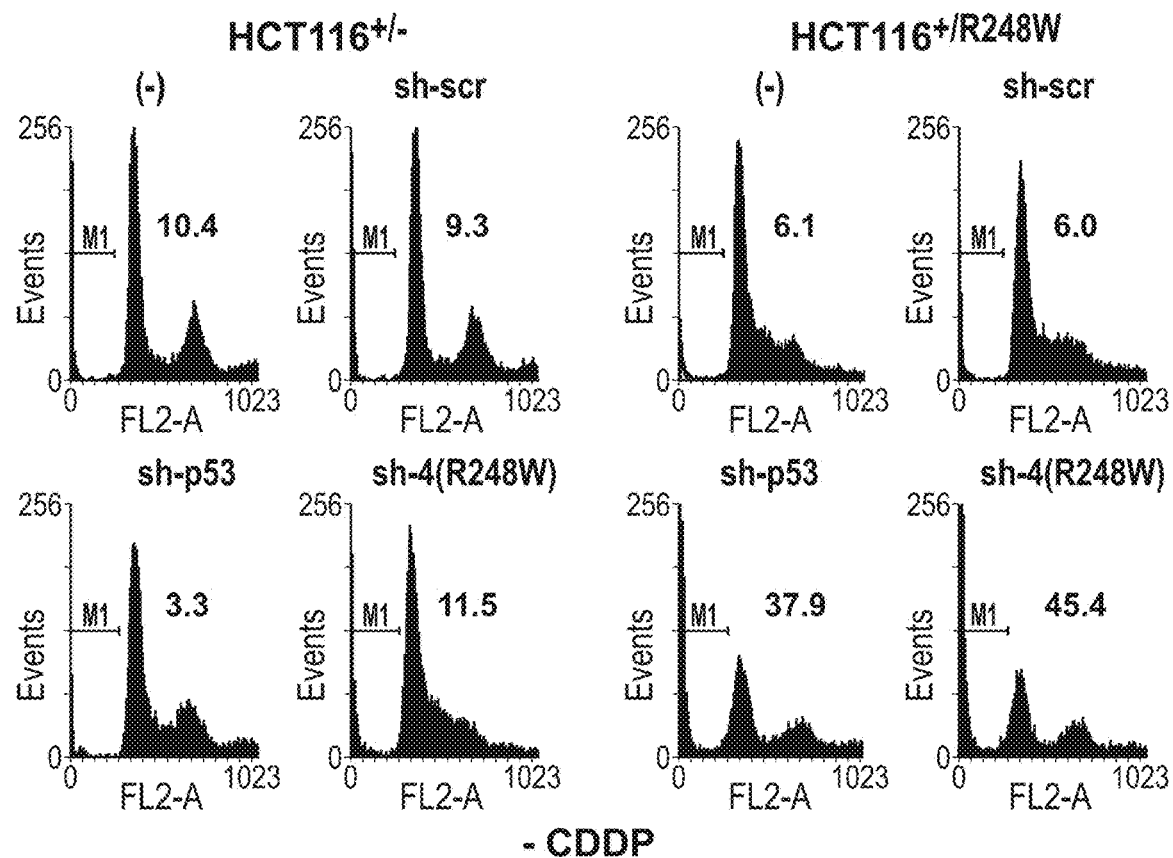

Relief of Dominant-Negative Effect of Mutant p53 and Enhancement of Cell Death Upon Mutant p53 Silencing While expression of mutant p53 alone results in addiction of cancer cells to the mutant protein for survival, co-expression of both WT and mutant p53 in the heterozygous state leads to a dominant-negative (DN) effect of the mutant protein over the WT protein, leading to amelioration of the latter's functions in target gene activation and apoptosis induction. It had been previously shown that reducing the mutant p53 levels in this heterozygous context leads to restoration of WT p53 function, and sensitizes cells to chemotherapeutic agents and irradiation. Hence, the mutant p53-specific shRNAs were evaluated for their use in reducing mutant p53 levels in mutant heterozygous cells, to improve therapeutic response. To this end, two sets of isogenic colorectal cells lines (RKO and HCT116), which are heterozygous for p53 (p53+/−) or heterozygous for mutant p53 (p53+/R248W), were utilised. Transfection of sh-4 which is specific for the R248W mutant led to a significant decrease of total p53 in the p53+/R248W cells but not in p53+/− HCT and RKO cells, indicating specificity (FIG. 6A and FIG. 13A). Concomitant analysis of long-term survival revealed that the sh-4 transfected p53+/R248W cells were more prone to growth inhibition compared to the p53+/− cells (FIG. 6B and FIG. 13B). Moreover, p53 target gene induction was significantly induced only in the p53+/R248W cells compared to the p53+/− cells when sh-4 was transfected (FIG. 6C and FIG. 13C), collectively indicating that suppression of mutant p53 relieves the DN effect, and leads to elevated cell death in mutant p53-expressing cells.

Figure 13E:
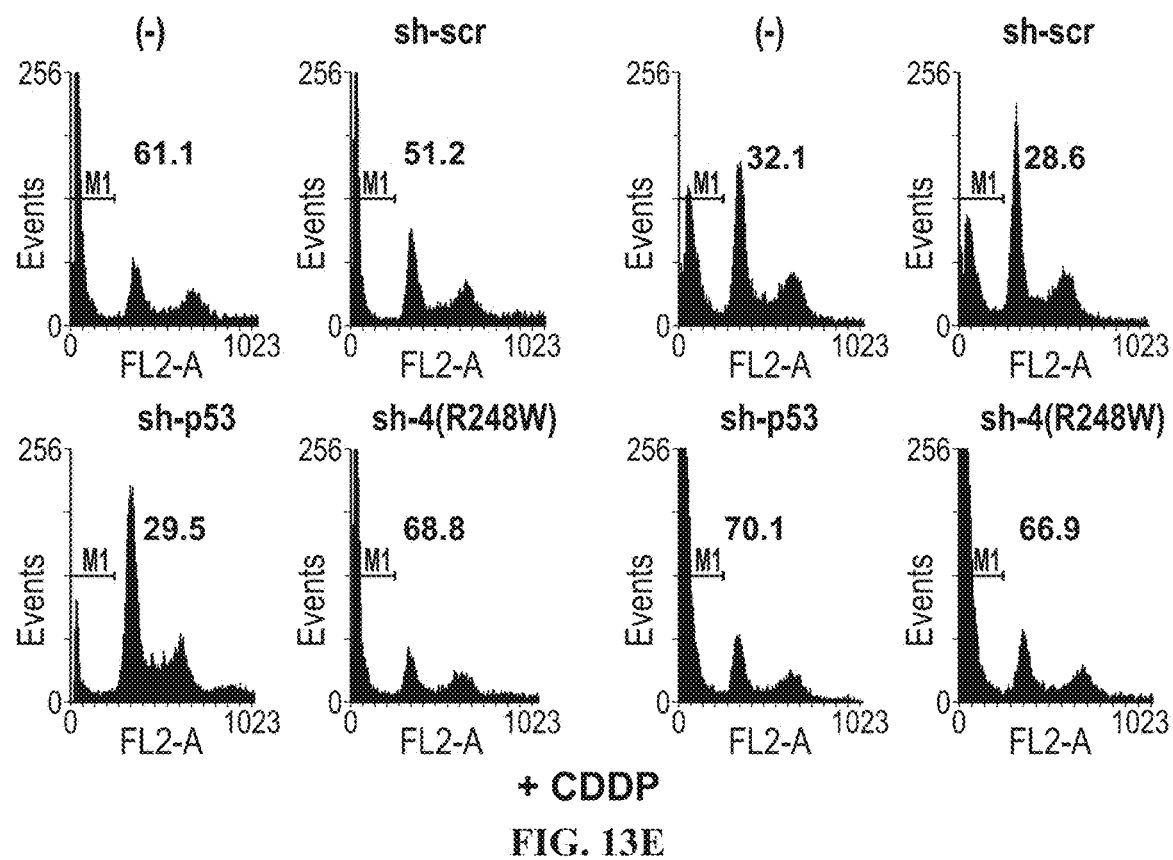
Figure 14B:
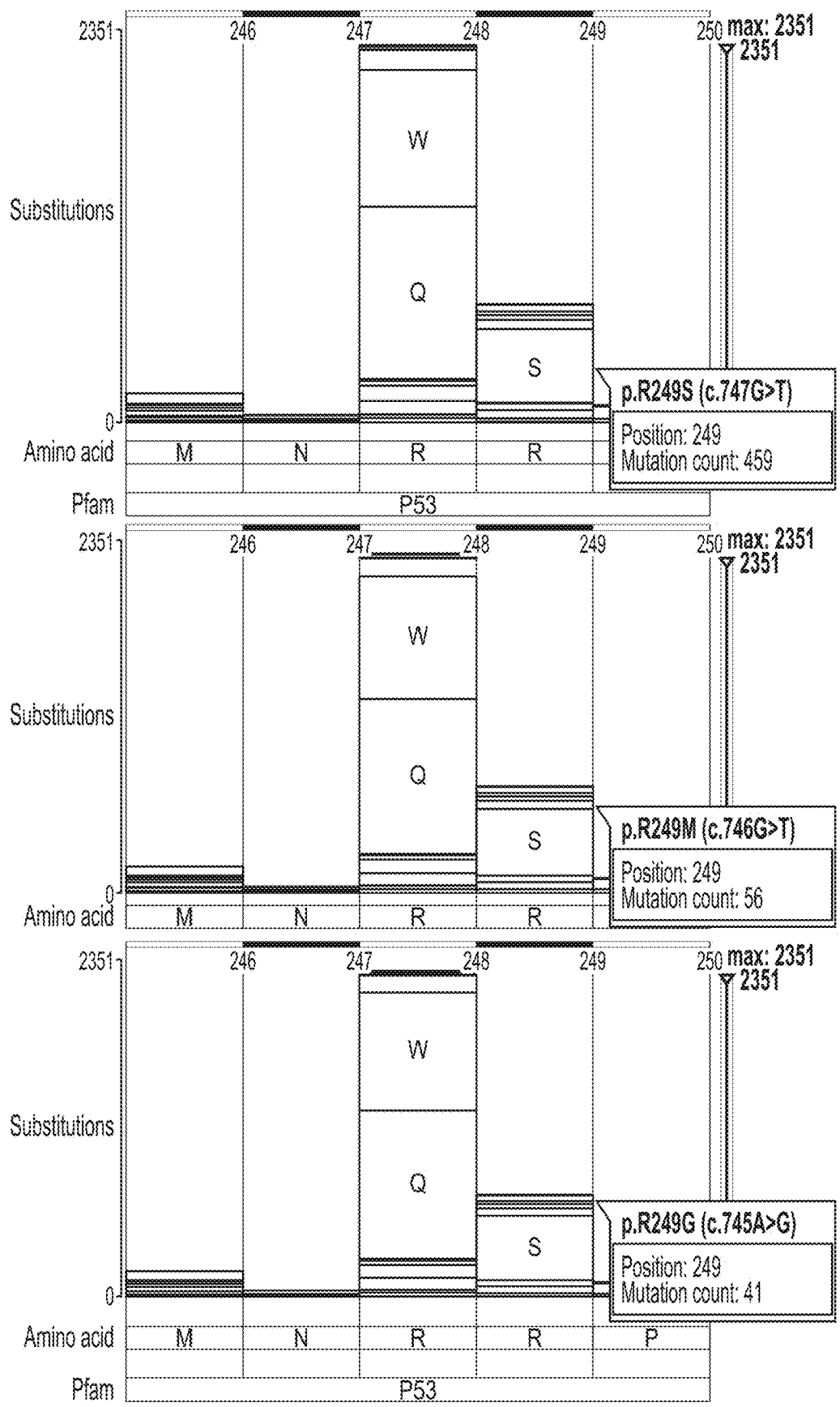
FIG. 14 shows data depicting the efficacy of siRNA-6 on the various R249 mutants. (A) shows a table showing the various possible mutations found at position R249 of p53 in human cancers, and the nucleotide sequences for each amino acid possibility. R249 can therefore be mutated to R249S, R249G and R249M. (B) shows various histograms showing the frequency of the various R249 mutations in human cancers, as mutation counts. (C) shows results of immunoblotting analysis. si-6 and the control sip53 and si-scr siRNAs were transfected into H1299 cell lines that were co-transfected 24 hours later with the various R249 mutant cDNA constructs or the WT p53 construct. The cell lysate was then analysed for p53 expression by immunoblotting, 72 hours post-siRNA transfection, using anti-p53 antibody (DO-1). One representative blot of at least two independent experiments is shown. Actin is shown as loading control, and (-) represent cells only without any siRNA transfection.
Figure 14C:
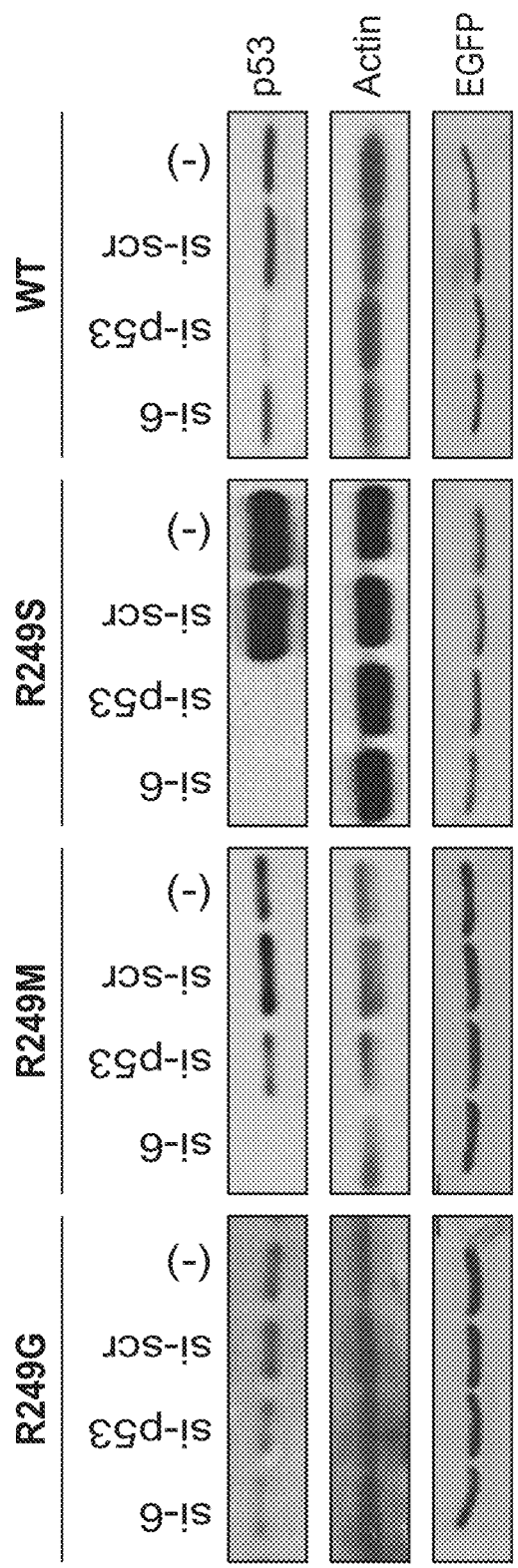
Figure 15C:
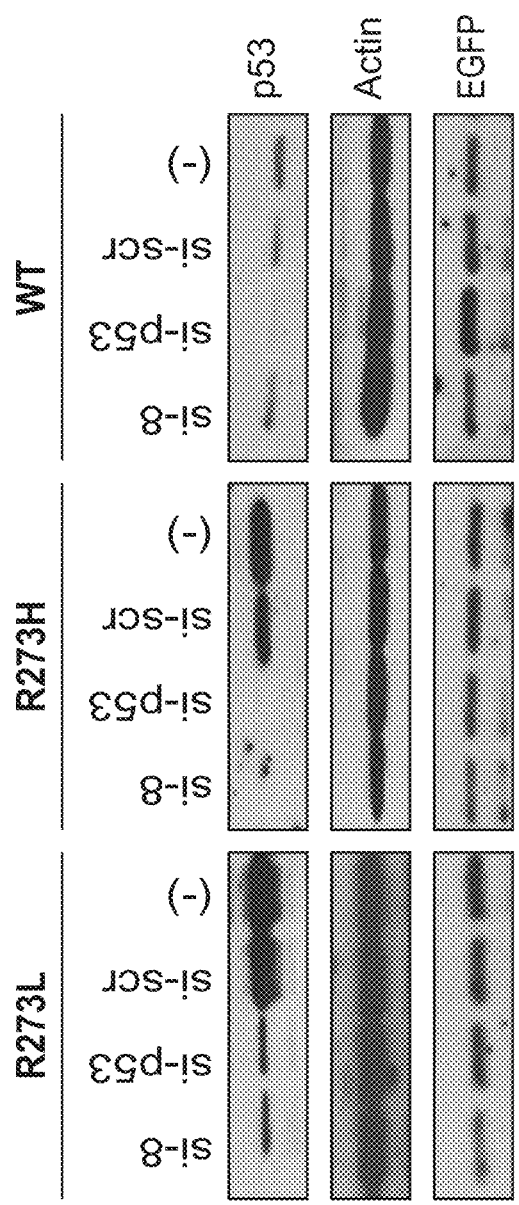
FIG. 15 shows data depicting the efficacy of siRNA-8 on the various R273 mutants. (A) is a table showing the various possible mutations found at position R273 of p53 in human cancers, and the nucleotide sequences for each amino acid possibility. R273 can therefore be mutated to R273H and R273L. (B) shows various histogram showing the frequency of the various R273 mutations in human cancers, as mutation counts. (C) shows results of immunoblotting analysis. si-8 and the control sip53 and si-scr siRNAs were transfected into H1299 cell lines that were co-transfected 24 hours later with the various R273 mutant cDNA constructs or the WT p53 construct. The cell lysate was then analysed for p53 expression by immunoblotting, 72 hours post-siRNA transfection, using anti-p53 antibody (DO-1). One representative blot of at least two independent experiments is shown. Actin is shown as loading control, and (-) represent cells only without any siRNA transfection.
Figures 16A, 16B, 16C:
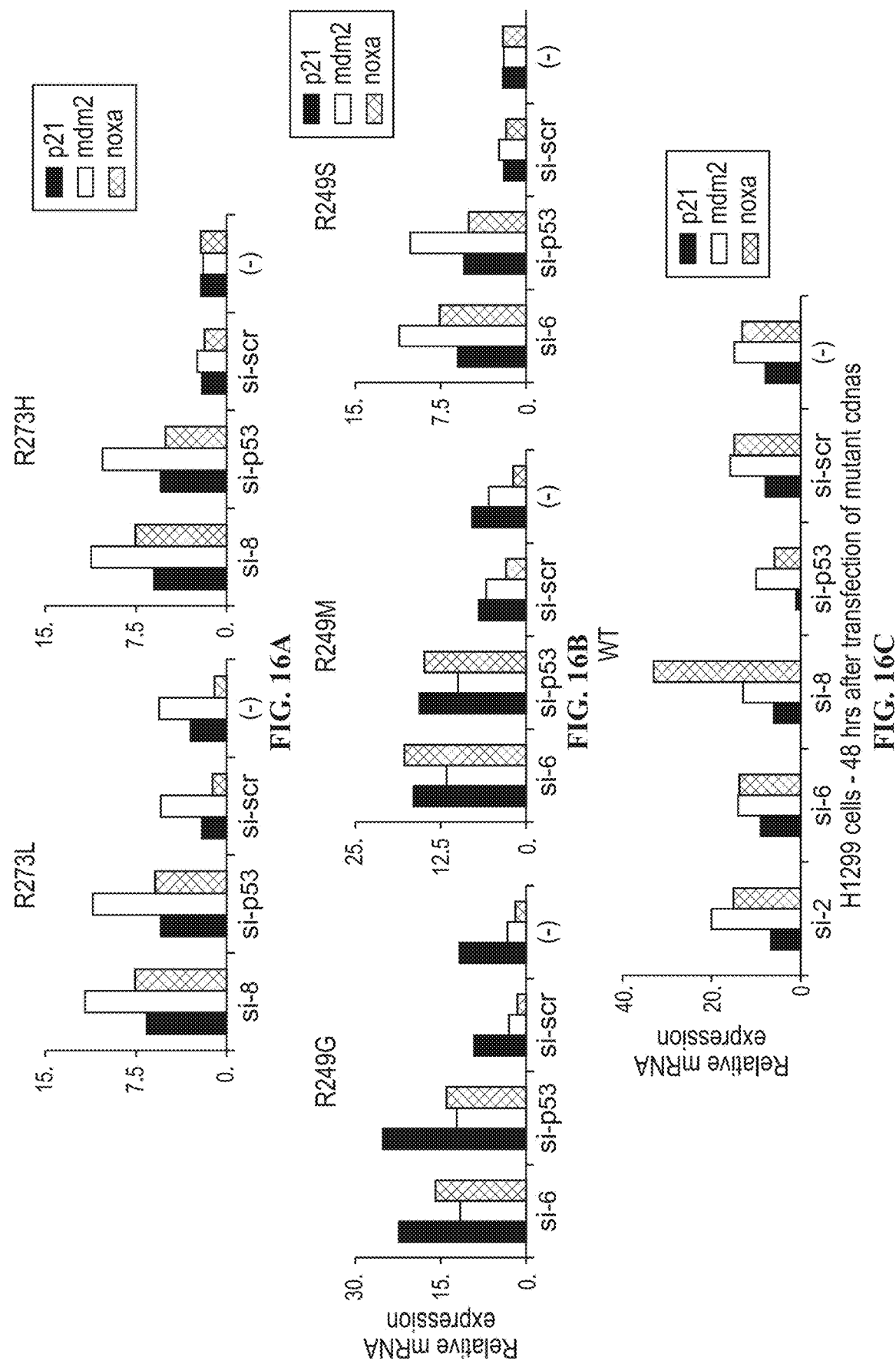
FIG. 16 provides histograms illustrating that mutant p53-specific silencing leads to activation of p53 canonical target genes in mutant p53 expressing cells. (A) shows histograms of H1299 cells transfected with the R273L and R273H p53 mutant cDNAs 24 hours after transfection of the si-8 and the control scrambled siRNA or p53-specific siRNA control siRNAs. Cells were collected 72 hours post-siRNA transfection for mRNA analysis of the indicated target genes by quantitative real time PCR. (B) similarly shows histograms of H1299 cells transfected with the R249G, R249M or R249S p53 mutant cDNAs along with the si-6 and the control scrambled siRNA or p53-specific siRNA control siRNAs. Cells were collected 72 hours post-siRNA transfection for mRNA analysis of the indicated target genes by quantitative real time PCR. (C) shows histograms of H1299 cells transfected with WT p53 cDNA along with si-2, si-4, si-6, si-8 and the control scrambled siRNA or p53-specific siRNAs. Cells were collected 72 hours post-siRNA transfection for mRNA analysis of the indicated target genes by quantitative real time PCR. Relative expression of the target genes is shown. All experiments were normalized to GAPDH and carried out in triplicates.

The effects of these siRNAs on cell death upon cisplatin (CDDP) treatment was also analysed, which indicated that the presence of mutant p53 reduced cell death (% sub-G1 cells in RKO p53+/− vs. p53+/R248W cells in untransfected and scrambled shRNA transfected: 50.9 and 50.3 vs. 14.9 and 11.3; in HCT cells: 61.1 and 51.2 vs. 32.1 and 28.6), highlighting the DN effects (FIGS. 6D-E and FIGS. 13D-E). By contrast, transfection of mutant-specific sh-4 led to a significant increase in cell death particularly in the p53+/R248W cells compared to the p53+/− cells (% sub-G1 cells in RKO p53+/− cells, untransfected vs. sh-4 shRNA: 50.9 vs. 49.7; in RKO p53+/R248W cells: 14.9 vs. 86.1; in HCT p53+/− cells: 61.1 vs. 68.8; in HCT p53+/R248W cells: 32.1 vs. 66.9; FIG. 13E). This data together demonstrates that silencing mutant p53 specifically without impacting WT p53 expression leads to relief of DN effects and sensitizes mutant-p53 expressing cells to death, which is enhanced by chemotherapeutic drug treatment.

Therapeutic Targeting of Mutant p53 Retards Tumour Growth In Vivo

Finally, it was evaluated whether the mutant p53-specific si/shRNAs would be effective in retarding tumour growth in vivo, by using the cell-based xenograft model to monitor the growth of cancer cell lines (RD, PLC-PR5 and H1975) expressing the scrambled or the respective mutant-specific shRNAs. Cancer cells which express the various p53 mutants and transiently infected with viral particles expressing the scrambled shRNA grew to a large volume over time, whereas the cells expressing the respective mutant p53-specific shRNAs were markedly retarded in growth in vivo (FIG. 7A). Histological analysis of tumours at sacrifice revealed that the mutant-specific shRNA expressing tumours had significantly reduced p53 staining, indicating that the specific shRNAs are effective in silencing the expression of the respective mutant p53 in vivo during tumour growth (FIG. 7B). This data establishes that mutant p53-specific siRNAs are effective in retarding tumour cell growth in vivo.

In addition, it was examined if the growth of R249S mutant expressing, patient-derived triple-negative breast cancer xenograft tumours (PDX) could be influenced by the siRNAs utilized in a therapeutic treatment protocol. In essence, PDX tumours were grown orthotopically, and when they reached 170 mm$^3$, mice were treated twice weekly with scrambled siRNA or mutant p53-specific siRNA that was delivered intravenously in nano-liposomes, which have been shown to effectively deliver to tumours. Treatment with si-6 (against R249S) twice weekly led to growth retardation of the tumours when compared to scrambled siRNA treated mice, which developed to full blown tumours by 29 days post-treatment (data not shown). Immunohistochemical staining for p53 indicated that the expression of mutant p53 was significantly reduced in the si-6 treated tumours (data not shown). Further analysis of multiple organs at sacrifice from siRNA treated mice did not show any abnormalities, excluding any side effects due to this treatment regimen (data not shown). Taken together, this data establishes that mutant p53-specific siRNAs can be used therapeutically to retard tumour growth in vivo.

TABLES

TABLE 1

Human tumour cell lines used

| CELL LINES USED IN STUDY | P53 STATUS | ORIGIN OF CELL LINE |
| --- | --- | --- |
| A549 | WILD-TYPE | LUNG CARCINOMA |
| A375 | WILD-TYPE | MALIGNANT MELANOMA |
| HCT116 | WILD-TYPE | COLON CARCINOMA |
| RKO | WILD-TYPE | COLON CARCINOMA |
| AU565 | R175H | BREAST CARCINOMA |
| SKBR3 | R175H | BREAST CARCINOMA |
| HCC1395 | R175H | BREAST CARCINOMA |
| HEC-1A | R248Q | ENDOMETRIAL ADENOCARCINOMA |
| RD | R248W | RHABDOMYOSARCOMA |
| 786-O | R248W | KIDNEY ADENOCARCINOMA |
| COLO-320DM | R248W | COLON ADENOCARCINOMA |
| PLC-PRF/5 | R249S | HEPETOCELLULAR CARCINOMA |

TABLE 1-continued

Human tumour cell lines used

| CELL LINES USED IN STUDY | P53 STATUS | ORIGIN OF CELL LINE |
|---|---|---|
| KNS-62 | R249S | BRONCHIAL SQUAMOUS CANCER |
| BT549 | R249S | BREAST CARCINOMA |
| ASPC1 | R273H | PANCREATIC ADENOCARCINOMA |
| WIDR1 | R273H | COLON ADENOCARCINOMA |
| H1975 | R273H | LUNG CARCINOMA |

SEQUENCES

A wildtype p53 polypeptide may comprise or consist of the amino acid sequence of UniProtKB—P04637 (P53_HUMAN):

```
                                                (SEQ ID NO: 1)
MEEPQSDPSVEPPLSQETFSDLWKLLPENNVLSPLPSQAMDDLMLSPDDIE

QWFTEDPGPDEAPRMPEAAPPVAPAPAAPTPAAPAPAPSWPLSSSVPSQKT

YQGSYGFRLGFLHSGTAKSVTCTYSPALNKMFCQLAKTCPVQLWVDSTPPP

GTRVRAMAIYKQSQHMTEVVRRCPHHERCSDSDGLAPPQHLIRVEGNLRVE

YLDDRNTFRHSVVVPYEPPEVGSDCTTIHYNYMCNSSCMGGMNRRPILTII

TLEDSSGNLLGRNSFEVRVCACPGRDRRTEEENLRKKGEPHHELPPGSTKR

ALPNNTSSSPQPKKKPLDGEYFTLQIRGRERFEMFRELNEALELKDAQAGK

EPGGSRAHSSHLKSKKGQSTSRHKKLMFKTEGPDSD
```

| SEQ ID NO: | Mutation | Sequence (mutated residue relative to wildtype p53 shown bold, underlined) |
|---|---|---|
| 2 | R175H | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRHCPHHERCSDSDGLAPP QHLIRVEGNLRVEYLDDRNTFRHSVVVPYEPPEVGSDCTTIHYNYMCNS SCMGGMNRRPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 3 | R248W | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNWRPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 4 | R273H | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNRRPILTIITLEDSSGNLLGRNSFEVHVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 5 | R249S | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNRSPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 36 | R249M | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNRMPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 37 | R249G | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS |

-continued

| SEQ ID NO: | Mutation | Sequence (mutated residue relative to wildtype p53 shown bold, underlined) |
|---|---|---|
| | | SCMGGMNRGPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 38 | R273L | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNRRPILTIITLEDSSGNLLGRNSFEVLVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |
| 39 | R248Q | MEEPQSDPSVEPPLSQETFSDLWKLLPENNVLSPLPSQAMDDLMLSPD DIEQWFTEDPGPDEAPRMPEAAPPVAPAPAAPTPAAPAPAPSWPLSSS VPSQKTYQGSYGFRLGFLHSGTAKSVTCTYSPALNKMFCQLAKTCPVQ LWVDSTPPPGTRVRAMAIYKQSQHMTEVVRRCPHHERCSDSDGLAPP QHLIRVEGNLRVEYLDDRNTFRHSVVVPYEPPEVGSDCTTIHYNYMCNS SCMGGMNQRPILTIITLEDSSGNLLGRNSFEVRVCACPGRDRRTEEENL RKKGEPHHELPPGSTKRALPNNTSSSPQPKKKPLDGEYFTLQIRGRERF EMFRELNEALELKDAQAGKEPGGSRAHSSHLKSKKGQSTSRHKKLMFK TEGPDSD |

| SEQ ID NO: | Sequence | Name/comment |
|---|---|---|
| 6 | 5' AUG ACG GAG GUU GUG AGG CgC UGC CCC CAC CAU GAG 3' | R175H P53 WT |
| 7 | 5' AUG ACG GAG GUU GUG AGG CaC UGC CCC CAC CAU GAG 3' | R175H P53 MUT-R175H |
| 8 | 5' UG ACG GAG GUU GUG AGG CaC U 3' | R175H Si-1-R175H |
| 9 | 5' AGG CaC UGC CCC CAC CAU GA 3' | R175H Si-2-R175H |
| 10 | 5' UGC AUG GGC GGC AUG AAC cGG AGG CCC AUC CUC 3' | R248W P53 WT |
| 11 | 5' UGC AUG GGC GGC AUG AAC uGG AGG CCC AUC CUC 3' | R248W P53 MUT-R248W |
| 44 | 5' UGC AUG GGC GGC AUG AAC CaG AGG CCC AUC CUC 3' | R248Q P53 MUT-R248Q |
| 12 | 5' GC AUG AAC uGG AGG CCC AU 3' | R248W/Q Si-3-R248W/R248Q |
| 13 | 5' GC GGC AUG AAC uGG AGG CCC 3' | R248W/Q Si-4-R248W/R248Q |
| 14 | 5' UGC AUG GGC GGC AUG AAC CGG AGg CCC AUC CUC ACC 3' | R249S P53 WT |
| 15 | 5' UGC AUG GGC GGC AUG AAC CGG AGu CCC AUC CUC ACC 3' | R249S P53 MUT-R249S |
| 45 | 5' UGC AUG GGC GGC AUG AAC CGG AuG CCC AUC CUC ACC 3' | R249M P53 MUT-R249M |
| 46 | 5' UGC AUG GGC GGC AUG AAC CGG gGG CCC AUC CUC ACC 3' | R249G P53 MUT-R249G |
| 16 | 5' G AAC CGG AGu CCC AUC CUC 3' | R249S/M/G Si-5-R249S/ R249M/R249G |
| 17 | 5' AAC CGG AGu CCC AUC CUC A 3' | R249S/M/G Si-6-R249S/ R249M/R249G |
| 18 | 5' AGC UUU GAG GUG CgU GUU UGU GCC UGU CCU 3' | R273H P53 WT |

| SEQ ID NO: | Sequence | Name/comment |
|---|---|---|
| 19 | 5' AGC UUU GAG GUG CaU GUU UGU GCC UGU CCU 3' | R273H P53 MUT-R273H |
| 47 | 5' AGC UUU GAG GUG CuU GUU UGU GCC UGU CCU 3' | R273L P53 MUT-R273L |
| 20 | 5' AG GUG CaU GUU UGU GCC UGU 3' | R273H/L Si-7-R273H/R273L |
| 21 | 5' GAG GUG CaU GUU UGU GCC UGU 3' | R273H/L Si-8-R273H/R273L |
| 22 | 5' CAC UGC CCC CAC CAU GAG CG 3' | General p53; si-p53 |
| 23 | 5' UUC UCC GAA CGT GUC ACG U 3' | General scrambled controls |
| 24; 40; 41 | 5'-AAGCTTTN$_{(19-29)}$ (sense sequence)TTCAAGAGAN$_{(19-29)}$ (antisense sequence)TTTTTTA-3' | Exemplary shRNA upper oligonucleotide, whereby (other than the siRNA sequence which is referred to as N$_{(19-29)}$) the nucleotides indicated at the front and end of each oligonucleotide are for the restriction enzyme cutting site. The middle sequence in each case is for the formation of stem loop. |
| 25; 42; 43 | 5'-AGCTTAAAAAAN$_{(19-29)}$ (sense sequence)TCTCTTGAAN$_{(19-29)}$ (antisense sequence)GGG-3' | Exemplary shRNA lower oligonucleotide, whereby (other than the siRNA sequence which is referred to as N$_{(19-29)}$) the nucleotides indicated at the front and end of each oligonucleotide are for the restriction enzyme cutting site. The middle sequence in each case is for the formation of stem loop. |
| 26 | Forward 5'-AAGCTTAGGCaCTGCCCCCACCATGATTCAAGAGATCATGGTGGGGGCAGtGCCTTTTTA-3' | shRNA vs R175H (sh-2) forward |
| 27 | Reverse 3'-GAATCCGTGACGGGGGTGGTACTAAGTTCTCTAGTACCACCCCCGTCACGGAAAAATTCGA-5' | shRNA vs R175H (sh-2) reverse |
| 28 | Forward 5'-AAGCTTGCGGCATGAACtGGAGGCCCTTCAAGAGAGGGCCTCCAGTTCATGCCGCTTTTTA-3' | shRNA vs R248W/R248Q (sh-4) forward |
| 29 | Reverse 3'-GAACGCCGTACTTGACCTCCGGGAAGTTCTCTCCCGGAGGTCAAGTACGGCGAAAAATTCGA-5' | shRNA vs R248W/R248Q (sh-4) reverse |
| 30 | Forward 5'-AAGCTTAACCGGAGtCCCATCCTCATTCAAGAGATGAGGATGGGACTCCGGTTTTTTA-3' | shRNA vs R249S/R249M/R249G (sh-6) forward |
| 31 | Reverse 3'-GAATTGGCCTCAGGGTAGGAGTAAGTTCTCTACTCCTACCCTGAGGCCAAAAAATTCGA-5' | shRNA vs R249S/R249M/R249G (sh-6) reverse |

| SEQ ID NO: | Sequence | Name/comment |
|---|---|---|
| 32 | Forward<br>5'-<br>AAGCTTGAGGTGCaTGTTTGTGCCTGTT<br>CAAGAGAACAGGCACAAACAtGCACCT<br>CTTTTA-3' | shRNA vs R273H/R273L (sh-8) forward |
| 33 | Reverse<br>3'-<br>GAACTCCACGTACAAACACGGACAAA<br>GTTCTCTTGTCCGTGTTTGTACGTGGA<br>GAAAATTCGA-5' | shRNA vs R273H/R273L (sh-8) reverse |
| 34 | Forward<br>5'-<br>AAGCTTTTCTCCGAACGTGTCACGTTT<br>CAAGAGAACGTGACACGTTCGGAGAA<br>TTTTTA-3' | shRNA vs scramble (sh-scr) forward |
| 35 | Reverse<br>3'-<br>GAAAAGAGGCTTGCACAGTGCAAAGT<br>TCTCTTGCACTGTGCAAGCCTCTTAAA<br>AATTCGA-5' | shRNA vs scramble (sh-scr) reverse |

The invention claimed is:

1. A nucleic acid sequence for targeting a point mutation within the p53 tumour suppressor gene wherein the site of the point mutation is selected from the group consisting of R249 (p53), R248 (p53) and R273 (p53) and wherein the nucleic acid sequence is:
 (a) an siRNA sequence selected from SEQ ID NOs 17, 13, 16, and 21; or
 (b) an shRNA sequence having an siRNA sequence selected from SEQ ID NOs 17, 13, 16, and 21.

2. The nucleic acid sequence of claim 1, wherein the shRNA sequence comprises stems with the length of between 19 to 30 base pairs.

3. A method of treating cancer in a subject, the method comprising administering to the subject one or more nucleic acid sequence(s) according to claim 1, wherein the one or more nucleic acid sequence(s) target one or more point mutation site(s) within the p53 tumour suppressor gene.

4. The method of claim 3, wherein the cancer is selected from the group consisting of oesophagus, upper respiratory tract, skin, epithelial, central nervous system, ovarian, breast, gastro-intestinal, large intestines, small intestines, colorectal, liver, adenocarcinoma, adrenal adenocarcinoma, thyroid, lung, pancreas, kidney, endometrial, hematopoietic, muscles, connective tissue, bone, soft tissue, lymphoid tissue, lymph and the immune system.

5. The method of claim 3, wherein the cancer is selected from the group consisting of melanomas, myelomas, carcinomas, sarcomas, lymphomas, blastomas and germ cell tumours.

6. The method of claim 3, wherein the cancer is selected from the group consisting of lung carcinoma, malignant melanoma, colon carcinoma, breast carcinoma, endometrial adenocarcinoma, rhabdomyosarcoma, kidney adenocarcinoma, colon adenocarcinoma, hepatocellular carcinoma, bronchial squamous cancer, ovarian carcinoma and pancreatic adenocarcinoma.

7. The method of claim 3, wherein administration of the one or more of the nucleic acid sequence(s) results in one or more of the following effects selected from the group consisting of cell death, abrogation of addiction, activation of any one or more p53 target genes, relief of a dominant negative effect, increased sensitivity to one or more anti-cancer agents, and retardation or halting of tumour growth.

8. The method of claim 3, further comprising administering a therapeutic agent.

9. The method of claim 8, wherein the therapeutic agent is an anti-cancer agent.

10. A method of treating a subject susceptible to treatment, wherein the method comprises
 identifying one or more point mutation(s) within the p53 tumour suppressor gene wherein the site of the one or more point mutation(s) is selected from the group consisting of R249 (p53), R248 (p53), and R273 (p53) wherein the presence of the one or more point mutation(s) in the target gene indicate that the subject is susceptible to treatment; and
 administering to a susceptible subject one or more nucleic acid sequence(s) according to claim 1, wherein the nucleic acid sequence(s) target one or more point mutations site(s) within the p53 gene.

11. A nucleic acid sequence which encodes an shRNA sequence according to claim 1.

12. The nucleic acid sequence of claim 11 comprising:
SEQ ID NOs 24, 40 and 41;
SEQ ID NOs 25, 42 and 43; or
SEQ ID NO: 28, 29, 30, 31, 32, or 33.

13. The method of claim 3 wherein:
(a) the subject has a point mutation in the p53 tumour suppressor gene at R249 (p53) and the one or more nucleic acid sequence(s) is/are selected from an siRNA sequence of SEQ ID NO: 17 or 16 and an shRNA sequence having an siRNA sequence of SEQ ID NO: 17 or 16; and/or
(b) the subject has a point mutation in the p53 tumour suppressor gene at R248 (p53) and the one or more nucleic acid sequence(s) is/are selected from an siRNA sequence of SEQ ID NO: 13 and an shRNA sequence having an siRNA sequence of SEQ ID NO: 13; and/or
(c) the subject has a point mutation in the p53 tumour suppressor gene at R273 (p53) and the one or more nucleic acid sequence(s) is/are selected from an siRNA sequence of SEQ ID NO: 21 and an shRNA sequence having an siRNA sequence of SEQ ID NO: 21.

14. The method of claim 13 wherein:
(a) the point mutation at R249 (p53) is selected from the group consisting of R249S (p53), R249G (p53) and R249M (p53); and/or
(b) the point mutation at R248 (p53) is selected from the group consisting of R248W (p53) and R248Q (p53); and/or
(c) the point mutation at R273 (p53) is selected from R273H (p53) and R273L (p53).

* * * * *

SEQUENCE LISTING

<160> NUMBER OF SEQ ID NOS: 47

<210> SEQ ID NO 1
<211> LENGTH: 393
<212> TYPE: PRT
<213> ORGANISM: Artificial sequence
<220> FEATURE:
<223> OTHER INFORMATION: Amino acid sequence of UniProtKB - P04637
      (P53_HUMAN)

<400> SEQUENCE: 1

```
Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45

Asp Ile Glu Gln Trp Phe Thr Glu Asp Pro Gly Pro Asp Glu Ala Pro
    50                  55                  60

Arg Met Pro Glu Ala Ala Pro Pro Val Ala Pro Ala Pro Ala Ala Pro
65                  70                  75                  80

Thr Pro Ala Ala Pro Ala Pro Ala Pro Ser Trp Pro Leu Ser Ser Ser
                85                  90                  95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
        115                 120                 125

Ala Leu Asn Lys Met Phe Cys Gln Leu Ala Lys Thr Cys Pro Val Gln
    130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Arg Cys
                165                 170                 175
```

```
                              -continued

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Arg Arg Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Gly Gln Ser Thr Ser Arg His Lys Lys Leu Met
    370                 375                 380

Phe Lys Thr Glu Gly Pro Asp Ser Asp
385                 390

<210> SEQ ID NO 2
<211> LENGTH: 393
<212> TYPE: PRT
<213> ORGANISM: Artificial sequence
<220> FEATURE:
<223> OTHER INFORMATION: R175H mutation

<400> SEQUENCE: 2

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45

Asp Ile Glu Gln Trp Phe Thr Glu Asp Pro Gly Pro Asp Glu Ala Pro
    50                  55                  60

Arg Met Pro Glu Ala Ala Pro Pro Val Ala Pro Ala Pro Ala Ala Pro
65                  70                  75                  80

Thr Pro Ala Ala Pro Ala Pro Ala Pro Ser Trp Pro Leu Ser Ser Ser
                85                  90                  95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
        115                 120                 125

Ala Leu Asn Lys Met Phe Cys Gln Leu Ala Lys Thr Cys Pro Val Gln
    130                 135                 140
```

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg His Cys
            165                 170                 175

Pro His His Glu Arg Cys Ser Asp Ser Asp Gly Leu Ala Pro Pro Gln
        180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Arg Arg Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 3
<211> LENGTH: 393
<212> TYPE: PRT
<213> ORGANISM: Artificial sequence
<220> FEATURE:
<223> OTHER INFORMATION: R248W mutation

<400> SEQUENCE: 3

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45

Asp Ile Glu Gln Trp Phe Thr Glu Asp Pro Gly Pro Asp Glu Ala Pro
    50                  55                  60

Arg Met Pro Glu Ala Ala Pro Pro Val Ala Pro Ala Pro Ala Ala Pro
65                  70                  75                  80

Thr Pro Ala Ala Pro Ala Pro Ala Pro Ser Trp Pro Leu Ser Ser Ser
                85                  90                  95

Val Pro Ser Gln Lys Thr Tyr Gln Gly Ser Tyr Gly Phe Arg Leu Gly
            100                 105                 110

-continued

```
Phe Leu His Ser Gly Thr Ala Lys Ser Val Thr Cys Thr Tyr Ser Pro
            115                 120                 125
Ala Leu Asn Lys Met Phe Cys Gln Leu Ala Lys Thr Cys Pro Val Gln
        130                 135                 140
Leu Trp Val Asp Ser Thr Pro Pro Gly Thr Arg Val Arg Ala Met
145                 150                 155                 160
Ala Ile Tyr Lys Gln Ser Gln His Met Thr Glu Val Val Arg Cys
                165                 170                 175
Pro His His Glu Arg Cys Ser Asp Ser Asp Gly Leu Ala Pro Pro Gln
            180                 185                 190
His Leu Ile Arg Val Glu Gly Asn Leu Arg Val Glu Tyr Leu Asp Asp
            195                 200                 205
Arg Asn Thr Phe Arg His Ser Val Val Val Pro Tyr Glu Pro Pro Glu
        210                 215                 220
Val Gly Ser Asp Cys Thr Thr Ile His Tyr Asn Tyr Met Cys Asn Ser
225                 230                 235                 240
Ser Cys Met Gly Gly Met Asn Trp Arg Pro Ile Leu Thr Ile Ile Thr
                245                 250                 255
Leu Glu Asp Ser Ser Gly Asn Leu Leu Gly Arg Asn Ser Phe Glu Val
            260                 265                 270
Arg Val Cys Ala Cys Pro Gly Arg Asp Arg Arg Thr Glu Glu Glu Asn
        275                 280                 285
Leu Arg Lys Lys Gly Glu Pro His His Glu Leu Pro Pro Gly Ser Thr
        290                 295                 300
Lys Arg Ala Leu Pro Asn Asn Thr Ser Ser Ser Pro Gln Pro Lys Lys
305                 310                 315                 320
Lys Pro Leu Asp Gly Glu Tyr Phe Thr Leu Gln Ile Arg Gly Arg Glu
                325                 330                 335
Arg Phe Glu Met Phe Arg Glu Leu Asn Glu Ala Leu Glu Leu Lys Asp
            340                 345                 350
Ala Gln Ala Gly Lys Glu Pro Gly Gly Ser Arg Ala His Ser Ser His
        355                 360                 365
Leu Lys Ser Lys Lys Gly Gln Ser Thr Ser Arg His Lys Lys Leu Met
        370                 375                 380
Phe Lys Thr Glu Gly Pro Asp Ser Asp
385                 390

<210> SEQ ID NO 4
<211> LENGTH: 393
<212> TYPE: PRT
<213> ORGANISM: Artificial sequence
<220> FEATURE:
<223> OTHER INFORMATION: R273H mutation

<400> SEQUENCE: 4

Met Glu Glu Pro Gln Ser Asp Pro Ser Val Glu Pro Pro Leu Ser Gln
1               5                   10                  15
Glu Thr Phe Ser Asp Leu Trp Lys Leu Leu Pro Glu Asn Asn Val Leu
                20                  25                  30
Ser Pro Leu Pro Ser Gln Ala Met Asp Asp Leu Met Leu Ser Pro Asp
            35                  40                  45
Asp Ile Glu Gln Trp Phe Thr Glu Asp Pro Gly Pro Asp Glu Ala Pro
        50                  55                  60
Arg Met Pro Glu Ala Ala Pro Pro Val Ala Pro Ala Pro Ala Ala Pro
65                  70                  75                  80
```

```
Thr Pro Ala Ala Pro Ala Pro Ser Trp Pro Leu Ser Ser Ser
                85              90              95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
            115                 120                 125

Ala Leu Asn Lys Met Phe Cys Gln Leu Ala Lys Thr Cys Pro Val Gln
130             135                 140

Leu Trp Val Asp Ser Thr Pro Pro Gly Thr Arg Val Arg Ala Met
145             150                 155                 160

Ala Ile Tyr Lys Gln Ser Gln His Met Thr Glu Val Val Arg Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
            195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225             230                 235                 240

Ser Cys Met Gly Gly Met Asn Arg Arg Pro Ile Leu Thr Ile Ile Thr
                245                 250                 255

Leu Glu Asp Ser Ser Gly Asn Leu Leu Gly Arg Asn Ser Phe Glu Val
                260                 265                 270

His Val Cys Ala Cys Pro Gly Arg Asp Arg Arg Thr Glu Glu Glu Asn
            275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
            355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 5
<211> LENGTH: 393
<212> TYPE: PRT
<213> ORGANISM: Artificial sequence
<220> FEATURE:
<223> OTHER INFORMATION: R249S mutation

<400> SEQUENCE: 5

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45
```

-continued

Asp Ile Glu Gln Trp Phe Thr Glu Asp Pro Gly Pro Asp Glu Ala Pro
 50                  55                  60

Arg Met Pro Glu Ala Ala Pro Pro Val Ala Pro Ala Pro Ala Ala Pro
 65                  70                  75                  80

Thr Pro Ala Ala Pro Ala Pro Ala Pro Ser Trp Pro Leu Ser Ser Ser
                 85                  90                  95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
        115                 120                 125

Ala Leu Asn Lys Met Phe Cys Gln Leu Ala Lys Thr Cys Pro Val Gln
130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
210                 215                 220

Val Gly Ser Asp Cys Thr Thr Ile His Tyr Asn Tyr Met Cys Asn Ser
225                 230                 235                 240

Ser Cys Met Gly Gly Met Asn Arg Ser Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
370                 375                 380

Phe Lys Thr Glu Gly Pro Asp Ser Asp
385                 390

<210> SEQ ID NO 6
<211> LENGTH: 36
<212> TYPE: RNA
<213> ORGANISM: Artificial sequence
<220> FEATURE:
<223> OTHER INFORMATION: R175H P53 WT

<400> SEQUENCE: 6
augacggagg uugugaggcg cugcccccac caugag                        36

```
<210> SEQ ID NO 7
<211> LENGTH: 36
<212> TYPE: RNA
<213> ORGANISM: Artificial sequence
<220> FEATURE:
<223> OTHER INFORMATION: R175H P53 MUT-R175H

<400> SEQUENCE: 7
augacggagg uugugaggca cugcccccac caugag                         36

<210> SEQ ID NO 8
<211> LENGTH: 21
<212> TYPE: RNA
<213> ORGANISM: Artificial sequence
<220> FEATURE:
<223> OTHER INFORMATION: R175H Si-1-R175H

<400> SEQUENCE: 8
ugacggaggu ugugaggcac u                                         21

<210> SEQ ID NO 9
<211> LENGTH: 20
<212> TYPE: RNA
<213> ORGANISM: Artificial sequence
<220> FEATURE:
<223> OTHER INFORMATION: R175H Si-2-R175H

<400> SEQUENCE: 9
aggcacugcc cccaccauga                                           20

<210> SEQ ID NO 10
<211> LENGTH: 33
<212> TYPE: RNA
<213> ORGANISM: Artificial sequence
<220> FEATURE:
<223> OTHER INFORMATION: R248W P53 WT

<400> SEQUENCE: 10
ugcaugggcg gcaugaaccg gaggcccauc cuc                            33

<210> SEQ ID NO 11
<211> LENGTH: 33
<212> TYPE: RNA
<213> ORGANISM: Artificial sequence
<220> FEATURE:
<223> OTHER INFORMATION: R248W P53 MUT-R248W

<400> SEQUENCE: 11
ugcaugggcg gcaugaacug gaggcccauc cuc                            33

<210> SEQ ID NO 12
<211> LENGTH: 19
<212> TYPE: RNA
<213> ORGANISM: Artificial sequence
<220> FEATURE:
<223> OTHER INFORMATION: R248W/Q Si-3-R248W/R248Q

<400> SEQUENCE: 12
gcaugaacug gaggcccau                                            19

<210> SEQ ID NO 13
<211> LENGTH: 20
<212> TYPE: RNA
<213> ORGANISM: Artificial sequence
<220> FEATURE:
<223> OTHER INFORMATION: R248W/Q Si-4-R248W/R248Q
```

```
<400> SEQUENCE: 13
gcggcaugaa cuggaggccc                                              20

<210> SEQ ID NO 14
<211> LENGTH: 36
<212> TYPE: RNA
<213> ORGANISM: Artificial sequence
<220> FEATURE:
<223> OTHER INFORMATION: R249S P53 WT

<400> SEQUENCE: 14
ugcaugggcg gcaugaaccg gaggcccauc cucacc                             36

<210> SEQ ID NO 15
<211> LENGTH: 36
<212> TYPE: RNA
<213> ORGANISM: Artificial sequence
<220> FEATURE:
<223> OTHER INFORMATION: R249S P53 MUT-R249S

<400> SEQUENCE: 15
ugcaugggcg gcaugaaccg gagucccauc cucacc                             36

<210> SEQ ID NO 16
<211> LENGTH: 19
<212> TYPE: RNA
<213> ORGANISM: Artificial sequence
<220> FEATURE:
<223> OTHER INFORMATION: R249S/M/G Si-5-R249S/ R249M/R249G

<400> SEQUENCE: 16
gaaccggagu cccauccuc                                                19

<210> SEQ ID NO 17
<211> LENGTH: 19
<212> TYPE: RNA
<213> ORGANISM: Artificial sequence
<220> FEATURE:
<223> OTHER INFORMATION: R249S/M/G Si-6-R249S/ R249M/R249G

<400> SEQUENCE: 17
aaccggaguc ccauccuca                                                19

<210> SEQ ID NO 18
<211> LENGTH: 30
<212> TYPE: RNA
<213> ORGANISM: Artificial sequence
<220> FEATURE:
<223> OTHER INFORMATION: R273H P53 WT

<400> SEQUENCE: 18
agcuuugagg ugcguguuug ugccuguccu                                    30

<210> SEQ ID NO 19
<211> LENGTH: 30
<212> TYPE: RNA
<213> ORGANISM: Artificial sequence
<220> FEATURE:
<223> OTHER INFORMATION: R273H P53 MUT-R273H

<400> SEQUENCE: 19
agcuuugagg ugcauguuug ugccuguccu                                    30

<210> SEQ ID NO 20
<211> LENGTH: 20
```

```
<212> TYPE: RNA
<213> ORGANISM: Artificial sequence
<220> FEATURE:
<223> OTHER INFORMATION: R273H/L Si-7-R273H/R273L

<400> SEQUENCE: 20
aggugcaugu uugugccugu                                              20

<210> SEQ ID NO 21
<211> LENGTH: 21
<212> TYPE: RNA
<213> ORGANISM: Artificial sequence
<220> FEATURE:
<223> OTHER INFORMATION: R273H/L Si-8-R273H/R273L

<400> SEQUENCE: 21
gaggugcaug uuugugccug u                                            21

<210> SEQ ID NO 22
<211> LENGTH: 20
<212> TYPE: RNA
<213> ORGANISM: Artificial sequence
<220> FEATURE:
<223> OTHER INFORMATION: General p53; si-p53

<400> SEQUENCE: 22
cacugccccc accaugagcg                                              20

<210> SEQ ID NO 23
<211> LENGTH: 19
<212> TYPE: DNA
<213> ORGANISM: Artificial sequence
<220> FEATURE:
<223> OTHER INFORMATION: General scrambled controls

<400> SEQUENCE: 23
uucuccgaac gtgucacgu                                               19

<210> SEQ ID NO 24
<211> LENGTH: 7
<212> TYPE: DNA
<213> ORGANISM: Artificial sequence
<220> FEATURE:
<223> OTHER INFORMATION: Part 1 of 3 of an exemplary shRNA upper
      oligonucleotide

<400> SEQUENCE: 24 aagcttt                                                             7

<210> SEQ ID NO 25
<211> LENGTH: 10
<212> TYPE: DNA
<213> ORGANISM: Artificial sequence
<220> FEATURE:
<223> OTHER INFORMATION: Part 1 of 3 of an exemplary shRNA lower
      oligonucleotide

<400> SEQUENCE: 25
agcttaaaaa                                                         10

<210> SEQ ID NO 26
<211> LENGTH: 60
<212> TYPE: DNA
<213> ORGANISM: Artificial sequence
<220> FEATURE:
<223> OTHER INFORMATION: shRNA vs R175H (sh-2) forward
```

-continued

<400> SEQUENCE: 26
aagcttaggc actgccccca ccatgattca agagatcatg gtgggggcag tgcctttta    60

<210> SEQ ID NO 27
<211> LENGTH: 61
<212> TYPE: DNA
<213> ORGANISM: Artificial sequence
<220> FEATURE:
<223> OTHER INFORMATION: shRNA vs R175H (sh-2) reverse; in 3' to 5'
      orientation

<400> SEQUENCE: 27
gaatccgtga cgggggtggt actaagttct ctagtaccac cccgtcacg gaaaaattcg    60
a                                                                    61

<210> SEQ ID NO 28
<211> LENGTH: 61
<212> TYPE: DNA
<213> ORGANISM: Artificial sequence
<220> FEATURE:
<223> OTHER INFORMATION: shRNA vs R248W/R248Q (sh-4) forward

<400> SEQUENCE: 28
aagcttgcgg catgaactgg aggcccttca agagagggcc tccagttcat gccgcttttt    60
a                                                                    61

<210> SEQ ID NO 29
<211> LENGTH: 62
<212> TYPE: DNA
<213> ORGANISM: Artificial sequence
<220> FEATURE:
<223> OTHER INFORMATION: shRNA vs R248W/R248Q (sh-4) reverse; in 3' to
      5' orientation

<400> SEQUENCE: 29
gaacgccgta cttgacctcc gggaagttct ctcccggagg tcaagtacgg cgaaaaattc    60
ga                                                                   62

<210> SEQ ID NO 30
<211> LENGTH: 58
<212> TYPE: DNA
<213> ORGANISM: Artificial sequence
<220> FEATURE:
<223> OTHER INFORMATION: shRNA vs R249S/R249M/R249G (sh-6) forward

<400> SEQUENCE: 30
aagcttaacc ggagtcccat cctcattcaa gagatgagga tgggactccg gttttta       58

<210> SEQ ID NO 31
<211> LENGTH: 59
<212> TYPE: DNA
<213> ORGANISM: Artificial sequence
<220> FEATURE:
<223> OTHER INFORMATION: shRNA vs R249S/R249M/R249G (sh-6) reverse; in
      3' to 5' orientation

<400> SEQUENCE: 31
gaattggcct cagggtagga gtaagttctc tactcctacc ctgaggccaa aaattcga      59

<210> SEQ ID NO 32
<211> LENGTH: 61
<212> TYPE: DNA
<213> ORGANISM: Artificial sequence
<220> FEATURE:

<223> OTHER INFORMATION: shRNA vs R273H/ R273L (sh-8) forward

<400> SEQUENCE: 32
aagcttgagg tgcatgttg tgcctgttca agagaacagg cacaaacatg cacctctttt    60
a                                                                   61

<210> SEQ ID NO 33
<211> LENGTH: 63
<212> TYPE: DNA
<213> ORGANISM: Artificial sequence
<220> FEATURE:
<223> OTHER INFORMATION: shRNA vs R273H/ R273L (sh-8) reverse; in 3' to
      5' orientation

<400> SEQUENCE: 33
gaactccacg tacaaacacg gacaaagttc tcttgtccgt gtttgtacgt ggagaaaatt    60
cga                                                                 63

<210> SEQ ID NO 34
<211> LENGTH: 59
<212> TYPE: DNA
<213> ORGANISM: Artificial sequence
<220> FEATURE:
<223> OTHER INFORMATION: shRNA vs scramble (sh-scr) forward

<400> SEQUENCE: 34
aagcttttct ccgaacgtgt cacgtttcaa gagaacgtga cacgttcgga gattttta     59

<210> SEQ ID NO 35
<211> LENGTH: 60
<212> TYPE: DNA
<213> ORGANISM: Artificial sequence
<220> FEATURE:
<223> OTHER INFORMATION: shRNA vs scramble (sh-scr) reverse; in 3' to 5'
      orientation

<400> SEQUENCE: 35
gaaaagaggc ttgcacagtg caaagttctc ttgcactgtg caagcctctt aaaaattcga    60

<210> SEQ ID NO 36
<211> LENGTH: 393
<212> TYPE: PRT
<213> ORGANISM: Artificial sequence
<220> FEATURE:
<223> OTHER INFORMATION: R249M mutation

<400> SEQUENCE: 36

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45

Asp Ile Glu Gln Trp Phe Thr Glu Asp Pro Gly Pro Asp Glu Ala Pro
    50                  55                  60

Arg Met Pro Glu Ala Ala Pro Pro Val Ala Pro Ala Pro Ala Ala Pro
65                  70                  75                  80

Thr Pro Ala Ala Pro Ala Pro Ala Pro Ser Trp Pro Leu Ser Ser Ser
                85                  90                  95

Val Pro Ser Gln Lys Thr Tyr Gln Gly Ser Tyr Gly Phe Arg Leu Gly
            100                 105                 110

```
Phe Leu His Ser Gly Thr Ala Lys Ser Val Thr Cys Thr Tyr Ser Pro
            115                 120                 125

Ala Leu Asn Lys Met Phe Cys Gln Leu Ala Lys Thr Cys Pro Val Gln
        130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Arg Met Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 37
<211> LENGTH: 393
<212> TYPE: PRT
<213> ORGANISM: Artificial sequence
<220> FEATURE:
<223> OTHER INFORMATION: R249G mutation

<400> SEQUENCE: 37

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
                20                  25                  30

Ser Pro Leu Pro Ser Gln Ala Met Asp Asp Leu Met Leu Ser Pro Asp
            35                  40                  45

Asp Ile Glu Gln Trp Phe Thr Glu Asp Pro Gly Pro Asp Glu Ala Pro
        50                  55                  60

Arg Met Pro Glu Ala Ala Pro Pro Val Ala Pro Ala Pro Ala Ala Pro
65                  70                  75                  80
```

Thr Pro Ala Ala Pro Ala Pro Ser Trp Pro Leu Ser Ser Ser
                85              90              95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
            115                 120                 125

Ala Leu Asn Lys Met Phe Cys Gln Leu Ala Lys Thr Cys Pro Val Gln
        130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Arg Gly Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 38
<211> LENGTH: 393
<212> TYPE: PRT
<213> ORGANISM: Artificial sequence
<220> FEATURE:
<223> OTHER INFORMATION: R273L mutation

<400> SEQUENCE: 38

Met Glu Glu Pro Gln Ser Asp Pro Ser Val Glu Pro Pro Leu Ser Gln
1               5                   10                  15

Glu Thr Phe Ser Asp Leu Trp Lys Leu Leu Pro Glu Asn Asn Val Leu
            20                  25                  30

Ser Pro Leu Pro Ser Gln Ala Met Asp Asp Leu Met Leu Ser Pro Asp
        35                  40                  45

```
Asp Ile Glu Gln Trp Phe Thr Glu Asp Pro Gly Pro Asp Glu Ala Pro
 50                  55                  60

Arg Met Pro Glu Ala Ala Pro Pro Val Ala Pro Ala Pro Ala Ala Pro
 65                  70                  75                  80

Thr Pro Ala Ala Pro Ala Pro Ala Pro Ser Trp Pro Leu Ser Ser Ser
                 85                  90                  95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
        115                 120                 125

Ala Leu Asn Lys Met Phe Cys Gln Leu Ala Lys Thr Cys Pro Val Gln
    130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Arg Arg Pro Ile Leu Thr Ile Ile Thr
                245                 250                 255

Leu Glu Asp Ser Ser Gly Asn Leu Leu Gly Arg Asn Ser Phe Glu Val
            260                 265                 270

Leu Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 39
<211> LENGTH: 393
<212> TYPE: PRT
<213> ORGANISM: Artificial sequence
<220> FEATURE:
<223> OTHER INFORMATION: R248Q mutation

<400> SEQUENCE: 39

Met Glu Glu Pro Gln Ser Asp Pro Ser Val Glu Pro Pro Leu Ser Gln
1               5                   10                  15
```

```
Glu Thr Phe Ser Asp Leu Trp Lys Leu Leu Pro Glu Asn Asn Val Leu
                20                  25                  30

Ser Pro Leu Pro Ser Gln Ala Met Asp Leu Met Leu Ser Pro Asp
            35                  40                  45

Asp Ile Glu Gln Trp Phe Thr Glu Asp Pro Gly Pro Asp Glu Ala Pro
 50                  55                  60

Arg Met Pro Glu Ala Ala Pro Pro Val Ala Pro Ala Pro Ala Ala Pro
 65                  70                  75                  80

Thr Pro Ala Ala Pro Ala Pro Ala Pro Ser Trp Pro Leu Ser Ser Ser
                85                  90                  95

Val Pro Ser Gln Lys Thr Tyr Gln Gly Ser Tyr Gly Phe Arg Leu Gly
            100                 105                 110

Phe Leu His Ser Gly Thr Ala Lys Ser Val Thr Cys Thr Tyr Ser Pro
        115                 120                 125

Ala Leu Asn Lys Met Phe Cys Gln Leu Ala Lys Thr Cys Pro Val Gln
    130                 135                 140

Leu Trp Val Asp Ser Thr Pro Pro Gly Thr Arg Val Arg Ala Met
145                 150                 155                 160

Ala Ile Tyr Lys Gln Ser Gln His Met Thr Glu Val Val Arg Arg Cys
                165                 170                 175

Pro His His Glu Arg Cys Ser Asp Ser Asp Gly Leu Ala Pro Pro Gln
            180                 185                 190

His Leu Ile Arg Val Glu Gly Asn Leu Arg Val Glu Tyr Leu Asp Asp
        195                 200                 205

Arg Asn Thr Phe Arg His Ser Val Val Val Pro Tyr Glu Pro Pro Glu
    210                 215                 220

Val Gly Ser Asp Cys Thr Thr Ile His Tyr Asn Tyr Met Cys Asn Ser
225                 230                 235                 240

Ser Cys Met Gly Gly Met Asn Gln Arg Pro Ile Leu Thr Ile Ile Thr
                245                 250                 255

Leu Glu Asp Ser Ser Gly Asn Leu Leu Gly Arg Asn Ser Phe Glu Val
            260                 265                 270

Arg Val Cys Ala Cys Pro Gly Arg Asp Arg Arg Thr Glu Glu Glu Asn
        275                 280                 285

Leu Arg Lys Lys Gly Glu Pro His His Glu Leu Pro Pro Gly Ser Thr
    290                 295                 300

Lys Arg Ala Leu Pro Asn Asn Thr Ser Ser Ser Pro Gln Pro Lys Lys
305                 310                 315                 320

Lys Pro Leu Asp Gly Glu Tyr Phe Thr Leu Gln Ile Arg Gly Arg Glu
                325                 330                 335

Arg Phe Glu Met Phe Arg Glu Leu Asn Glu Ala Leu Glu Leu Lys Asp
            340                 345                 350

Ala Gln Ala Gly Lys Glu Pro Gly Gly Ser Arg Ala His Ser Ser His
        355                 360                 365

Leu Lys Ser Lys Lys Gly Gln Ser Thr Ser Arg His Lys Lys Leu Met
    370                 375                 380

Phe Lys Thr Glu Gly Pro Asp Ser Asp
385                 390

<210> SEQ ID NO 40
<211> LENGTH: 9
<212> TYPE: DNA
<213> ORGANISM: Artificial sequence
<220> FEATURE:
<223> OTHER INFORMATION: Part 2 of 3 of an exemplary shRNA upper
```

```
                        oligonucleotide

<400> SEQUENCE: 40 ttcaagaga                                                                9

<210> SEQ ID NO 41
<211> LENGTH: 7
<212> TYPE: DNA
<213> ORGANISM: Artificial sequence
<220> FEATURE:
<223> OTHER INFORMATION: Part 3 of 3 of an exemplary shRNA upper
      oligonucleotide

<400> SEQUENCE: 41 tttttta                                                                  7

<210> SEQ ID NO 42
<211> LENGTH: 9
<212> TYPE: DNA
<213> ORGANISM: Artificial sequence
<220> FEATURE:
<223> OTHER INFORMATION: Part 2 of 3 of an exemplary shRNA lower
      oligonucleotide

<400> SEQUENCE: 42 tctcttgaa                                                                9

<210> SEQ ID NO 43
<211> LENGTH: 3
<212> TYPE: RNA
<213> ORGANISM: Artificial sequence
<220> FEATURE:
<223> OTHER INFORMATION: Part 3 of 3 of an exemplary shRNA lower
      oligonucleotide

<400> SEQUENCE: 43 ggg                                                                      3

<210> SEQ ID NO 44
<211> LENGTH: 33
<212> TYPE: RNA
<213> ORGANISM: Artificial sequence
<220> FEATURE:
<223> OTHER INFORMATION: R248Q P53 MUT-R248Q

<400> SEQUENCE: 44
ugcaugggcg gcaugaacca gaggcccauc cuc                                    33

<210> SEQ ID NO 45
<211> LENGTH: 36
<212> TYPE: RNA
<213> ORGANISM: Artificial sequence
<220> FEATURE:
<223> OTHER INFORMATION: R249M P53 MUT-R249M

<400> SEQUENCE: 45
ugcaugggcg gcaugaaccg gaugcccauc cucacc                                 36

<210> SEQ ID NO 46
<211> LENGTH: 36
<212> TYPE: RNA
<213> ORGANISM: Artificial sequence
<220> FEATURE:
<223> OTHER INFORMATION: R249G P53 MUT-R249G

<400> SEQUENCE: 46
```

-continued

```
ugcaugggcg gcaugaaccg ggggcccauc cucacc                    36

<210> SEQ ID NO 47
<211> LENGTH: 30
<212> TYPE: RNA
<213> ORGANISM: Artificial sequence
<220> FEATURE:
<223> OTHER INFORMATION: R273L P53 MUT-R273L

<400> SEQUENCE: 47
agcuuugagg ugcuuguuug ugccuguccu                           30
```